United States Patent
Shimizu et al.

(10) Patent No.: US 12,166,958 B2
(45) Date of Patent: Dec. 10, 2024

(54) HEAD MOUNTED DISPLAY AND CROSS REALITY SYSTEM

(71) Applicant: CANON KABUSHIKI KAISHA, Tokyo (JP)

(72) Inventors: Koichi Shimizu, Kanagawa (JP); Satoru Hamasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 17/950,192

(22) Filed: Sep. 22, 2022

(65) Prior Publication Data

US 2023/0097378 A1 Mar. 30, 2023

(30) Foreign Application Priority Data

Sep. 27, 2021 (JP) ................................. 2021-157239

(51) Int. Cl.
*H04N 13/383* (2018.01)
*G02B 27/00* (2006.01)
*G06T 19/00* (2011.01)

(52) U.S. Cl.
CPC ....... *H04N 13/383* (2018.05); *G02B 27/0081* (2013.01); *G02B 27/0093* (2013.01); *G06T 19/006* (2013.01)

(58) Field of Classification Search
CPC .............. H04N 13/383; G02B 27/0081; G02B 27/0093; G02B 2027/0187; G02B 27/0172; G06T 19/006; G06F 3/013
USPC .......................................................... 348/53
See application file for complete search history.

(56) References Cited

U.S. PATENT DOCUMENTS

| | | | |
|---|---|---|---|
| 10,591,735 B2 | 3/2020 | Nishimaki et al. | |
| 11,528,706 B2 * | 12/2022 | Onishi | H04W 72/0453 |
| 11,768,383 B2 * | 9/2023 | Kake | H04N 5/64 |
| | | | 345/8 |
| 2001/0010508 A1 * | 8/2001 | Kakeya | H04N 13/305 |
| | | | 345/9 |
| 2015/0293362 A1 * | 10/2015 | Takahashi | G06F 3/147 |
| | | | 348/47 |
| 2015/0378074 A1 * | 12/2015 | Kollin | G02B 5/3016 |
| | | | 359/485.05 |
| 2016/0240013 A1 * | 8/2016 | Spitzer | G02B 27/0172 |
| 2017/0252216 A1 * | 9/2017 | Maeda | H04N 13/398 |
| 2018/0217380 A1 | 8/2018 | Nishimaki et al. | |
| 2019/0114950 A1 * | 4/2019 | Calm | G09G 3/20 |
| 2019/0320165 A1 * | 10/2019 | French | H04N 13/344 |

(Continued)

FOREIGN PATENT DOCUMENTS

| | | |
|---|---|---|
| JP | H08-223609 A | 8/1996 |
| JP | H09-68670 A | 3/1997 |

(Continued)

*Primary Examiner* — Tung T Vo
(74) *Attorney, Agent, or Firm* — Venable LLP

(57) ABSTRACT

A head mounted display includes a display device having a display surface, an optical system configured to adjust a focal point of an eye of an observer to the display device, a driving mechanism configured to drive the display device, a line-of-sight detector configured to detect a line of sight of the observer, and a controller configured to control, based on an output from the line-of-sight detector, the driving mechanism so that an angle formed by the line of sight and the display surface falls within a preset allowable range with respect to 90° at an intersection point of the line of sight and the display surface.

15 Claims, 39 Drawing Sheets

(56) References Cited

U.S. PATENT DOCUMENTS

2022/0146839 A1* 5/2022 Miller ................ G02B 27/0176
2022/0239172 A1* 7/2022 Konings ................ H02K 3/26

FOREIGN PATENT DOCUMENTS

| JP | 2011-145488 A | 7/2011 |
| WO | 2016-113951 A | 7/2016 |

* cited by examiner

FIG. 25
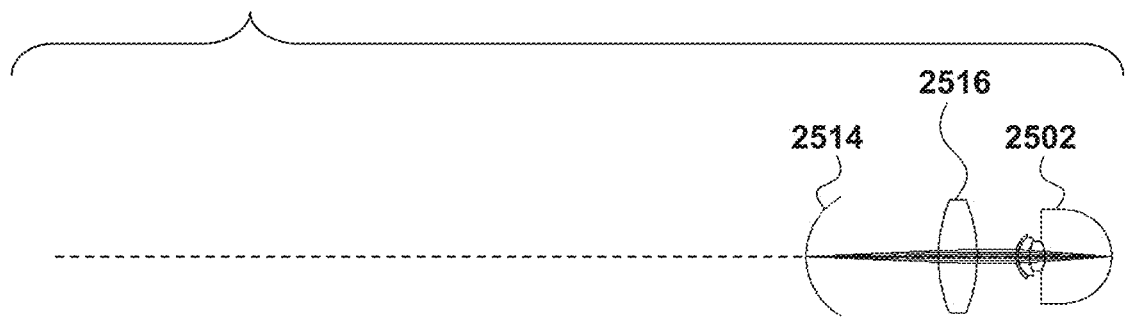
FIG. 26
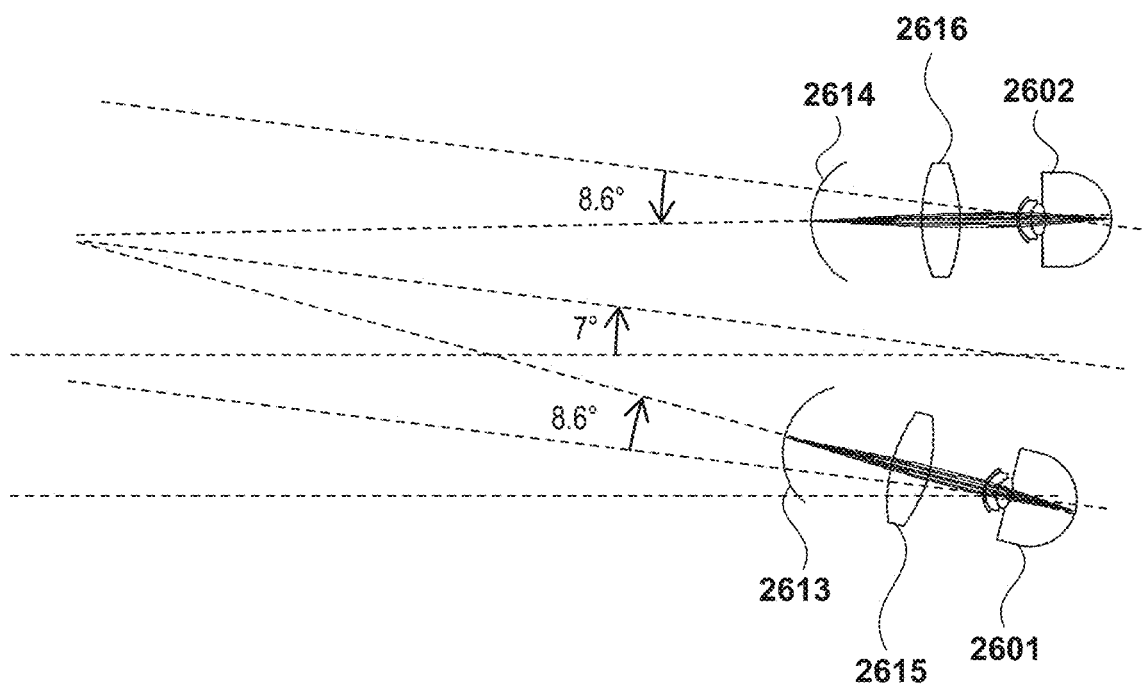

HEAD MOUNTED DISPLAY AND CROSS REALITY SYSTEM

BACKGROUND OF THE INVENTION

Field of the Invention

The present invention relates to a head mounted display and a cross reality system (for example, virtual space technology and space extension technology).

Description of the Related Art

Japanese Patent Laid-Open No. 9-68670 discloses an eye tracking head mounted display that moves a display device to an appropriate position using information obtained by detecting the line of sight of a user.

SUMMARY OF THE INVENTION

The present invention provides a technique advantageous in eliminating or reducing discomfort and eyestrain likely felt by an observer at the time of observation using an HMD.

One of aspects of the present invention provides a head mounted display comprising: a display device having a display surface; an optical system configured to adjust a focal point of an eye of an observer to the display device; a driving mechanism configured to drive the display device; a line-of-sight detector configured to detect a line of sight of the observer; and a controller configured to control, based on an output from the line-of-sight detector, the driving mechanism so that an angle formed by the line of sight and the display surface falls within a preset allowable range with respect to 90° at an intersection point of the line of sight and the display surface.

Further features of the present invention will become apparent from the following description of exemplary embodiments with reference to the attached drawings.

BRIEF DESCRIPTION OF THE DRAWINGS

FIG. 25 is a view for explaining Example 1;
FIG. 26 is a view for explaining Example 1.

DESCRIPTION OF THE EMBODIMENTS

Figure 1:
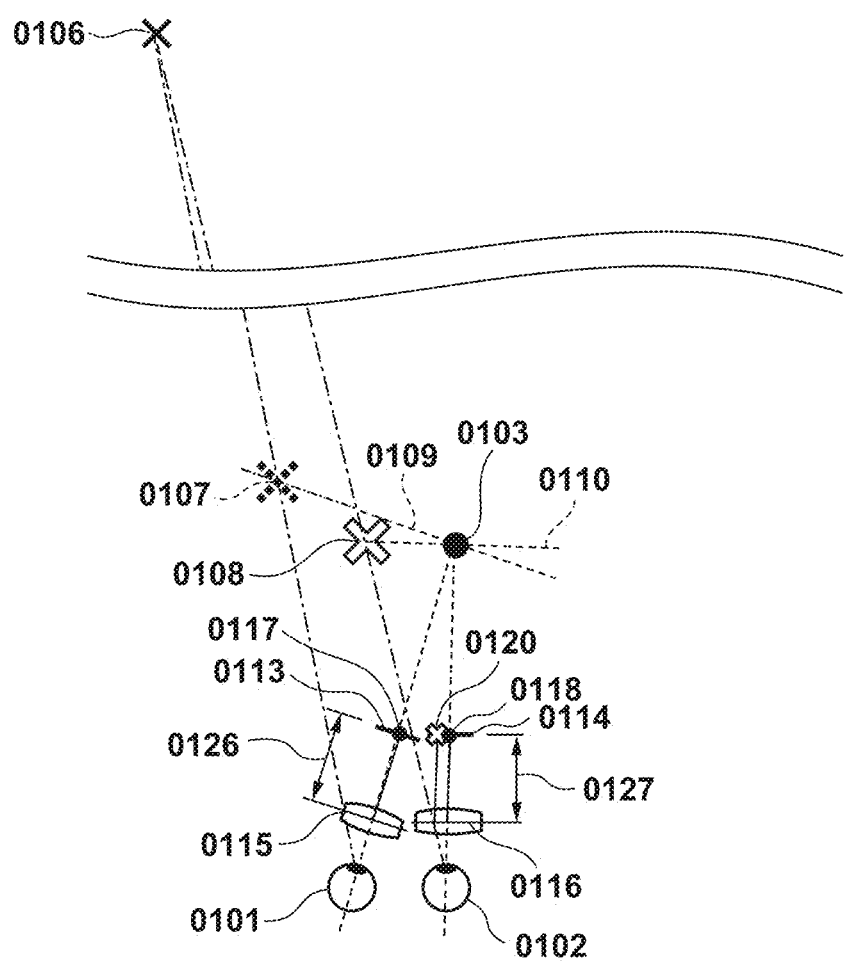
FIG. 1 is a view for explaining the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 39:
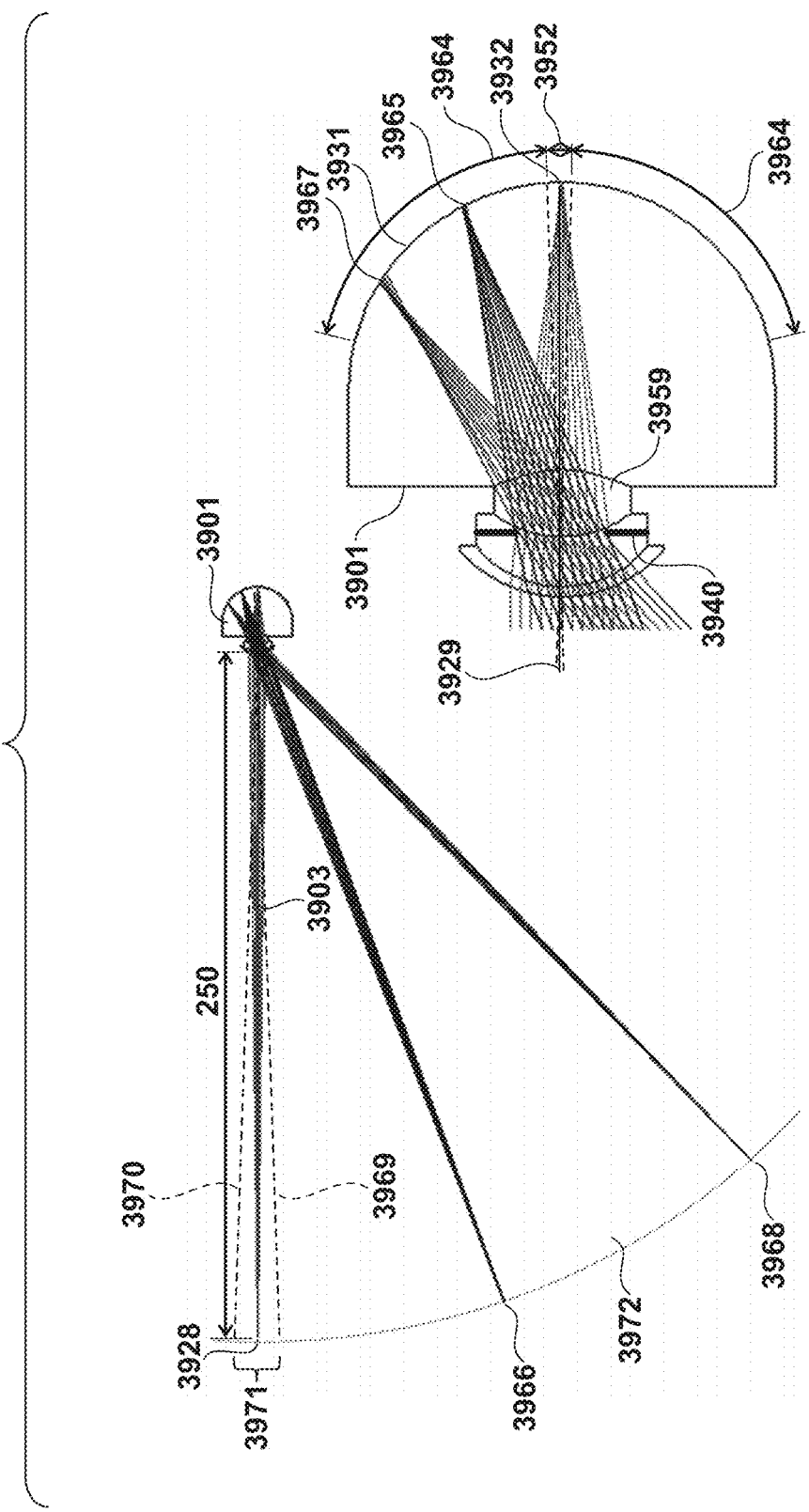
FIG. 39 is a view for explaining a problem.

FIG. 39 shows a state in which an observer sees a point object 3928 existing 250 mm ahead with an eye 3901. A crystalline lens 3959 as the lens of the eye 3901 has an optical axis 3929. The optical axis 3929 corresponds to the line of sight of the eye 3901. The thickness of the crystalline lens 3959 is adjusted such that light beams entering a pupil 3940 of the eye 3901 among light beams exiting from the point object 3928 on the extension of the optical axis 3929 form a focal point 3932 at one point on a retina 3931.

A fovea 3952 on the retina 3931 has an inclination within a range of 1° to 2° with respect to the optical axis 3929, and can fall within a range where light passing through the center of the pupil 3940, for example, light 3969 or 3970 enters. Photoreceptor cells concentrate on the fovea 3952, and the observer can precisely recognize an object falling within a range 3971 around the point object 3928. The focal point 3932 exists at approximately the center of the fovea 3952.

Photoreceptor cells dispersedly exist also in an outer peripheral region 3964 of the fovea 3952. Since the photoreceptor cells are dispersed, it is impossible to precisely discriminate an object that forms a focal point in the outer peripheral region 3964. However, the outer peripheral region 3964 is a portion necessary to determine the color, shape, brightness, and depth perception of an object. For example, a focal point 3965 in the outer peripheral region 3964 is a point at which light entering the pupil 3940 from a point object 3966 forms a focal point. Similarly, a focal point 3967 is a point at which light entering the pupil 3940 from a point object 3968 forms a focal point. The focal point 3965 or 3967 is not a complete focal point because of optical aberrations but is a minute region where light exiting from the point object 3966 or 3968 is condensed.

A set of point objects including the point objects 3928, 3966, and 3968 on the object side, each of which forms the focal point on the retina 3931, forms an approximately spherical surface 3972. The spherical surface 3972 can be understood as a focal plane on the object side when considering the retina 3931 as an image sensing surface.

Light exiting from a point object existing in front of the focal plane 3972, that is, close to the eye 3901 forms a focal point behind the retina 3931. Therefore, an image of the point object is a blurred image on the retina 3931. Conversely, light exiting from a point object existing behind the focal plane 3972, that is, far from the eye 3901 forms a focal point in front of the retina 3931. Therefore, similarly, an image of the point object is a blurred image on the retina 3931.

The degree of blurring of the point object image formed on the retina 3931 is higher as the distance between the focal plane 3972 and the point object is longer. Therefore, the focal plane 3972 serves as a reference for estimating the distance between the eye and the point object. That is, if the degree of blurring of the point object image on the retina 3931 is low, it is determined that the point object exists at the same distance as that of the point object 3928 seen with the eye 3901, that is, close to the focal plane 3972. To the contrary, if the degree of blurring of the point object image is high, it is determined that the point object exists at a distance different from that of the point object 3928, that is, at a position away from the focal plane 3972.

Figure 40:
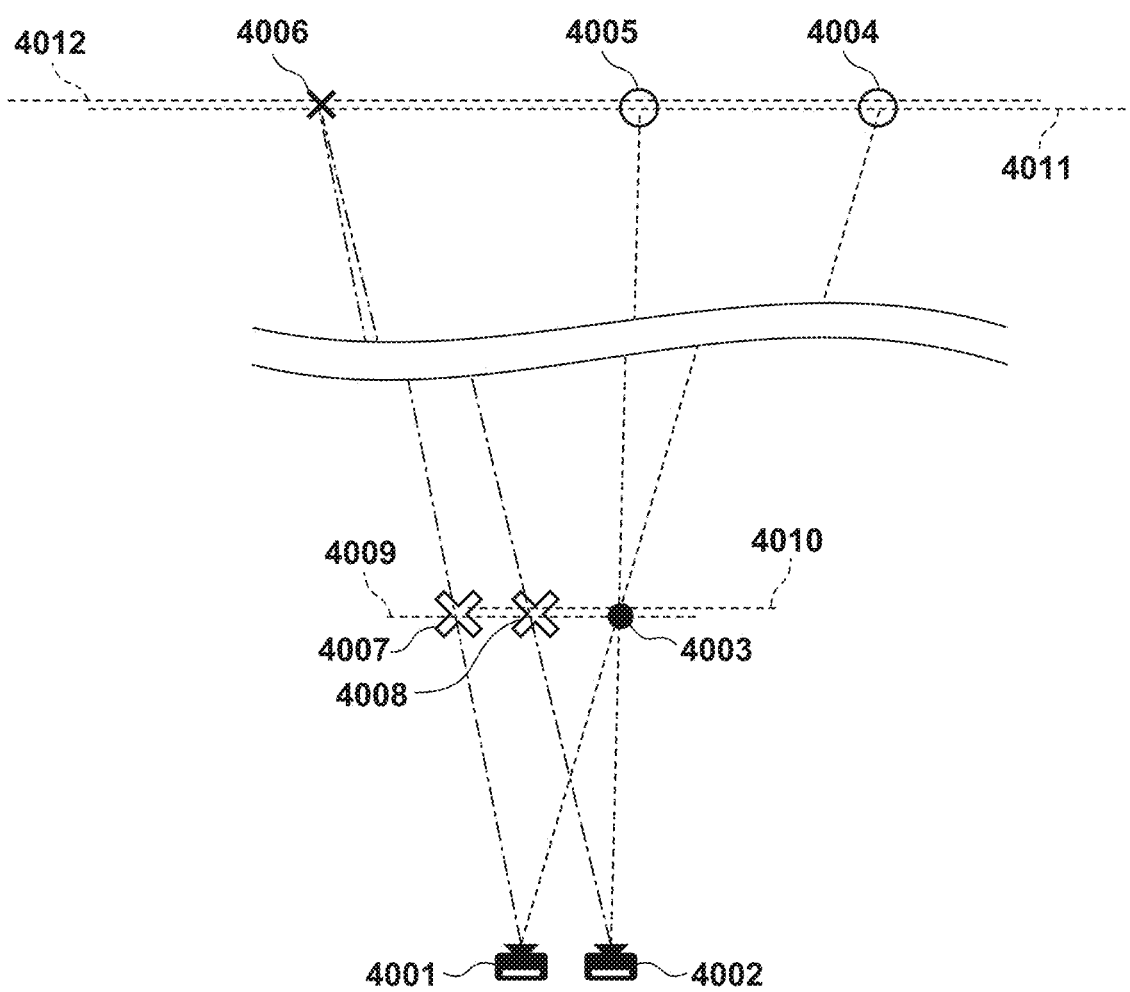
FIG. 40 is a view for explaining a problem.

Japanese Patent Laid-Open No. 9-68670 discloses an eye tracking head mounted display that moves a display device to an appropriate position using information obtained by detecting the line of sight of an observer, as described above. FIG. 40 shows a stereo camera that captures an image to be displayed on the head mounted display described in Japanese Patent Laid-Open No. 9-68670. Reference numeral 4001 denotes a camera that captures an image for the left eye; and 4002, a camera that captures an image for the right eye. Referring to FIG. 40, each camera includes a flat plate image sensor represented by a white line, and a lens is designed so that the focal plane on the image side is set on the image sensor. A broken line 4009 indicates a focal plane on the object side when the left-eye camera 4001 captures an image by focusing on a person of a black circle 4003. A broken line 4010 is a focal plane on the object side when the right-eye camera 4002 captures an image by focusing on the person of the black circle 4003. The focal planes 4009 and 4010 are vertically shifted from each other so as to readily discriminate between them but the actual in-focus position is at the intermediate position between the focal planes.

Similarly, a broken line 4011 indicates a focal plane when the left-eye camera 4001 captures an image by focusing on a tree of a black cross 4006, and a broken line 4012 indicates a focal plane when the right-eye camera 4002 captures an image by focusing on the tree 4006. The broken lines 4011 and 4012 are similarly vertically shifted from each other so as to readily discriminate between them but the actual in-focus position is at the intermediate position between the broken lines.

The black circle 4003 represents a location where the person near the cameras 4001 and 4002 actually exists. A gray circle 4004 represents the position of the person image on the focal plane 4011 when viewed from the left-eye camera 4001, and a gray circle 4005 represents the position of the person image on the focal plane 4012 when viewed from the right-eye camera 4002. The black cross 4006 represents a location where the tree far from the cameras 4001 and 4002 actually exists. A gray cross 4007 represents the position of the tree image on the focal plane 4009 when viewed from the left-eye camera 4001, and a gray cross 4008 represents the position of the tree image on the focal plane 4010 when viewed from the right-eye camera 4002.

Figure 41:
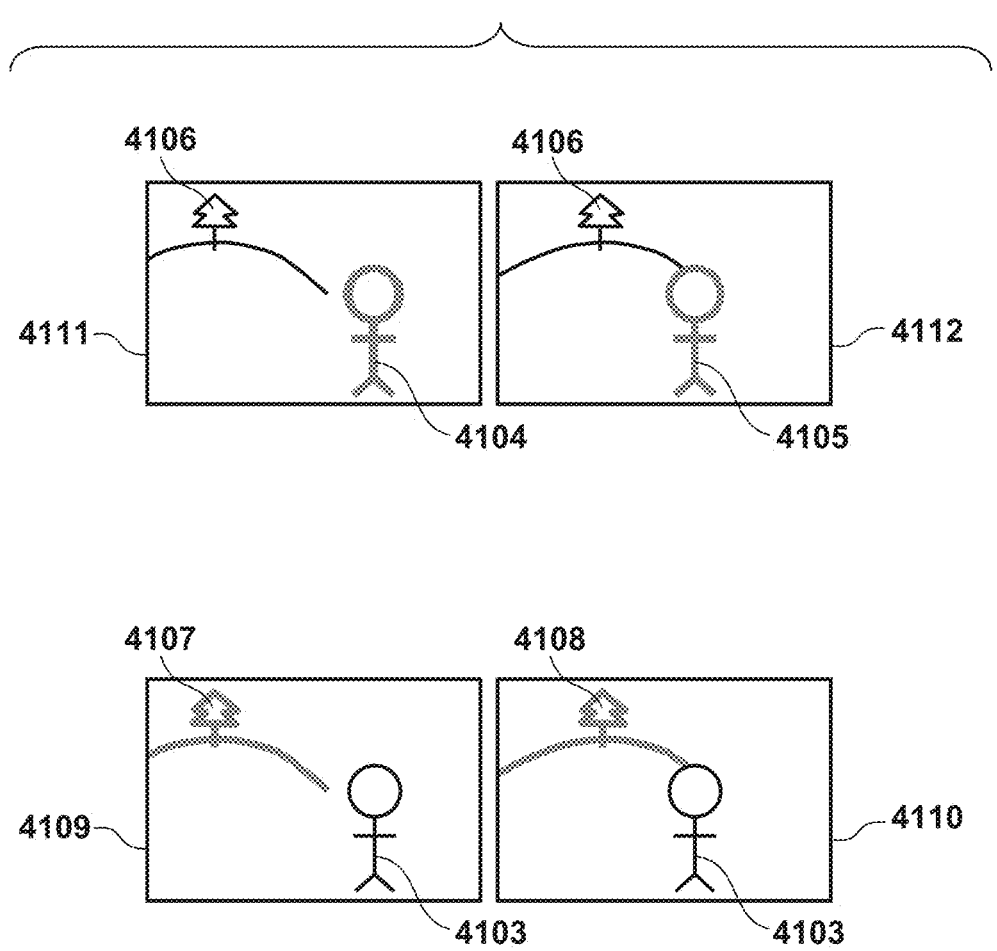
FIG. 41 is a view for explaining a problem.

FIG. 41 shows images obtained by the stereo camera shown in FIG. 40. A frame 4109 shows an image captured by the left-eye camera 4001 by focusing on the person of the black circle 4003. The broken line 4009 indicates the frame 4109 at the in-focus position. A person image 4103 on the center right side in the frame 4109 is an image of the person at the position of the black circle 4003. A tree image 4107 in an upper left portion is an image of the tree of the black cross 4006 at the position of the focal plane 4009. Since the tree actually exists farther than the focal plane 4009, a blurred image is obtained.

Similarly, a frame 4110 shows an image captured by the right-eye camera 4002 by focusing on the person of the black circle 4003. The broken line 4010 indicates the frame 4110 at the in-focus position. The person image 4103 on the center right side in the frame 4110 is the image of the person at the position of the black circle 4003. A tree image 4108 in an upper left portion is an image of the tree of the black cross 4006 at the position of the focal plane 4010. Since the tree actually exists farther than the focal plane 4010, a blurred image is obtained.

Furthermore, frames 4111 and 4112 respectively show images captured by the left-eye camera 4001 and the right-eye camera 4002 by focusing on the tree of the black cross 4006. The broken line 4011 indicates the frame 4111 at the in-focus position, and the broken line 4012 indicates the frame 4112 at the in-focus position. Person images 4104 and 4105 on the center right side in the frames 4111 and 4112 are images of the person of the black circle 4003 at the positions of the focal planes 4011 and 4012, respectively. Since the person actually exists in front of the focal planes 4011 and 4012, blurred images are obtained. A tree image 4106 in an upper left portion is an image of the tree of the black cross 4006.

Figure 42:
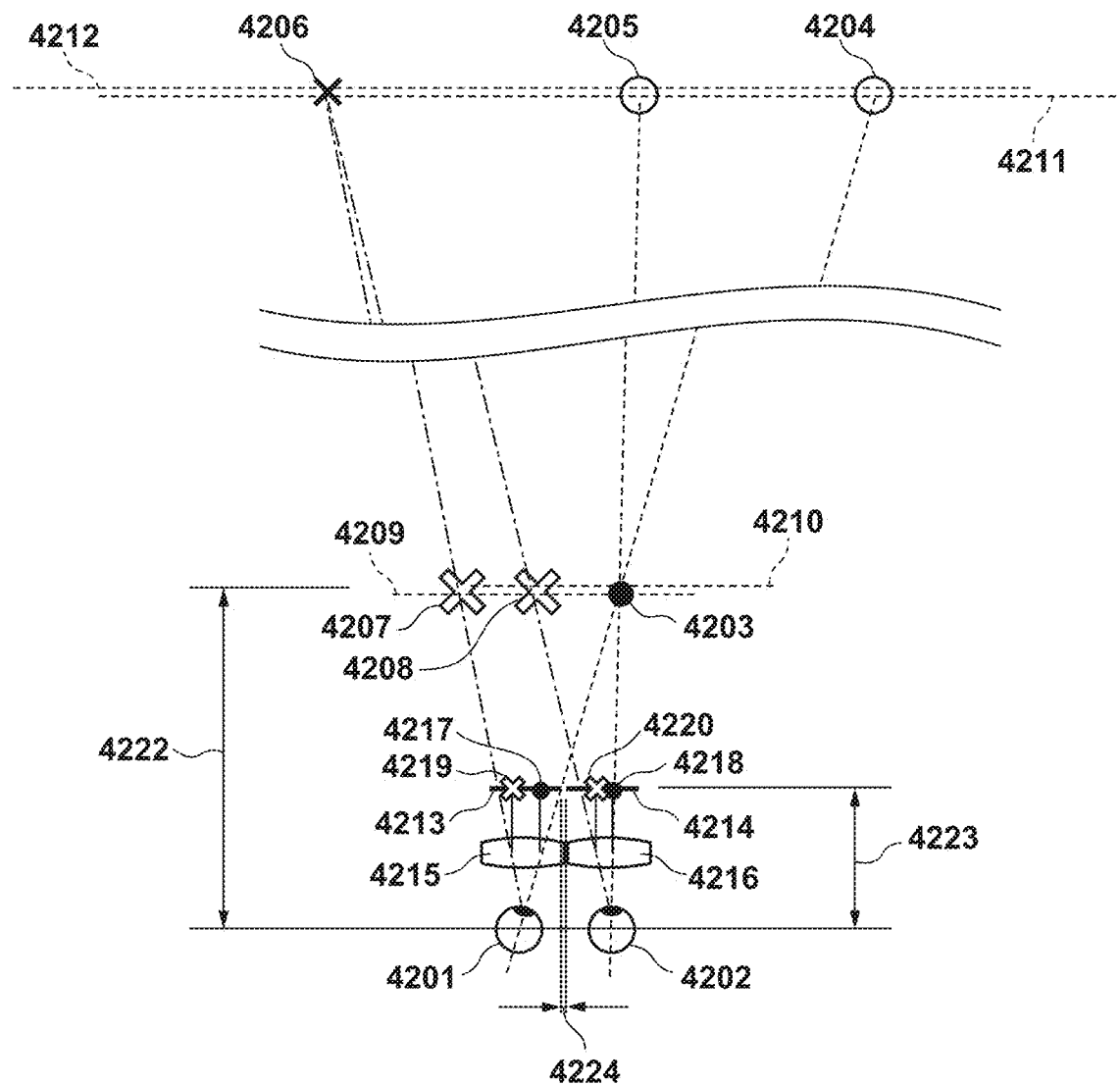
FIG. 42 is a view for explaining a problem.
Figure 43:
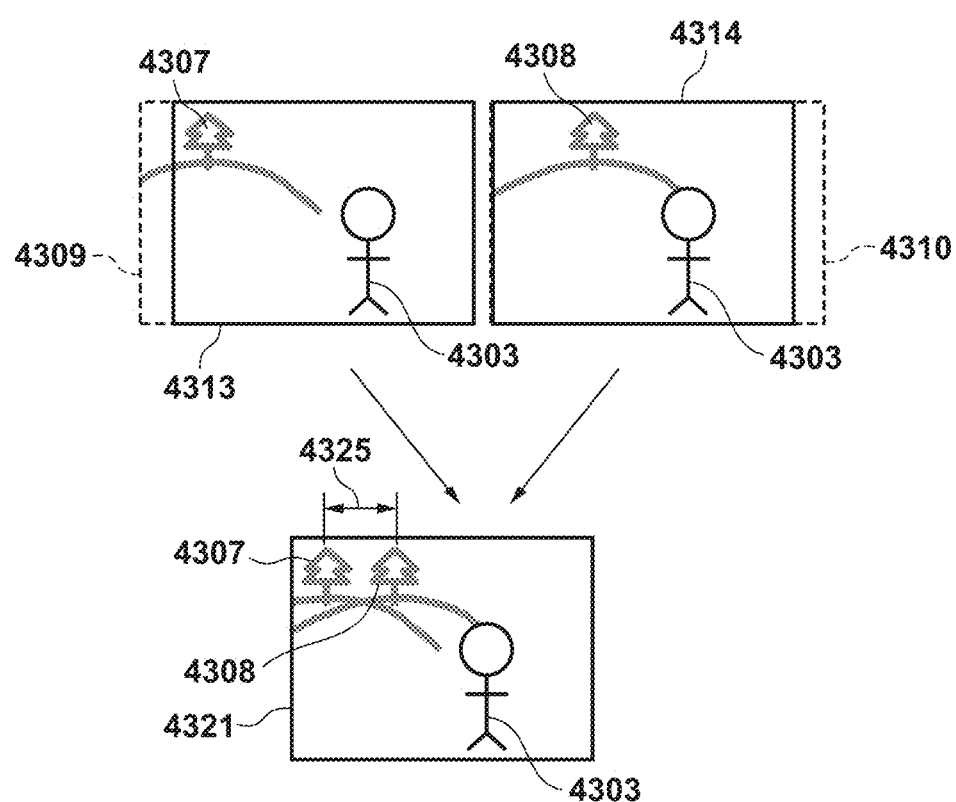
FIG. 43 is a view for explaining a problem.
Figure 44:
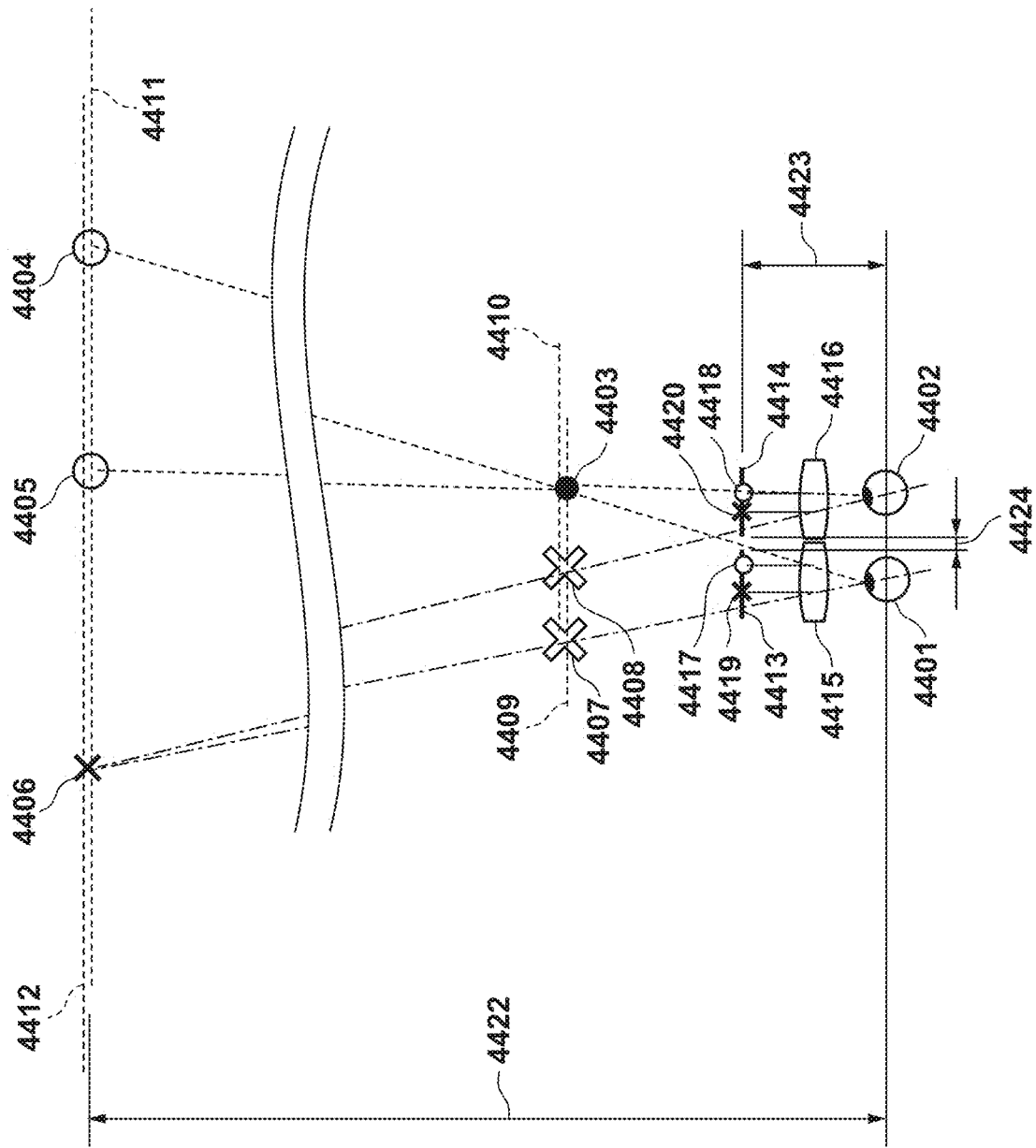
FIG. 44 is a view for explaining a problem.

FIGS. 42, 43, 44, and 45 each show a state in which the images shown in FIG. 41 captured by the stereo camera shown in FIG. 40 are observed using the head mounted display (to be referred to as the HMD hereinafter) disclosed in Japanese Patent Laid-Open No. 9-68670. FIG. 42 shows a state in which the observer views the person in the image. Similarly, FIG. 44 shows a state in which the observer views the tree in the image. Reference numerals 4201 and 4401 each denote a left eye of the observer. Reference numerals 4202 and 4402 each denote a right eye of the observer. Reference numerals 4213 and 4413 each denote a left-eye display device. Reference numerals 4214 and 4414 each denote a right-eye display device. A left-eye lens 4215 or 4415 and a right-eye lens 4216 or 4416 are designed so that the left eye 4201 or 4401 and the right eye 4202 or 4402 of the observer focus on the surfaces of the left-eye display device 4213 or 4413 and the right-eye display device 4214 or 4414, respectively.

FIG. 43 is a view showing images displayed on the display devices of the HMD shown in FIG. 42. A frame 4313 is a frame of the display device 4213. A frame 4309 indicated by a broken line corresponds to the frame 4109 shown in FIG. 41, and is an image range captured by the stereo camera 4001. A rightward portion of the image of the frame 4109 is extracted and displayed on the display device 4213. Similarly, a frame 4314 is a frame of the display device 4214. A frame 4310 indicated by a broken line corresponds to the frame 4110 shown in FIG. 41, and is an image range captured by the stereo camera 4002. A leftward portion of the image of the frame 4110 is extracted and displayed on the display device 4214.

The frames 4313 and 4314 are frames at the same position with reference to persons 4303, and the persons 4303 overlap each other into one person by making the images of the frames 4313 and 4314 overlap each other, as indicated by a frame 4321. Since there is a parallax between the image of the person 4303 of the frame 4313 and that of the person 4303 of the frame 4314, the observer perceives the image of the person 4303 stereoscopically. On the other hand, there are two trees 4307 and 4308 but the left eye 4201 and the right eye 4202 observe the trees, respectively, and thus the observer perceives that the tree exists on the far side due to the stereoscopic effect.

Referring to FIG. 42, a black circle 4217 is a position at which the person is displayed on the display device 4213, and a black circle 4218 is a position at which the person is displayed on the display device 4214. Furthermore, a gray cross 4219 is a position at which the tree is displayed on the display device 4213, and a gray cross 4220 is a position at which the tree is displayed on the display device 4214. At this time, the observer feels as if the person existed at a position of a black circle 4203 as the intersection point of the line of sight of the left eye 4201 and that of the right eye 4202, and the tree existed farther than the person.

Figure 45:
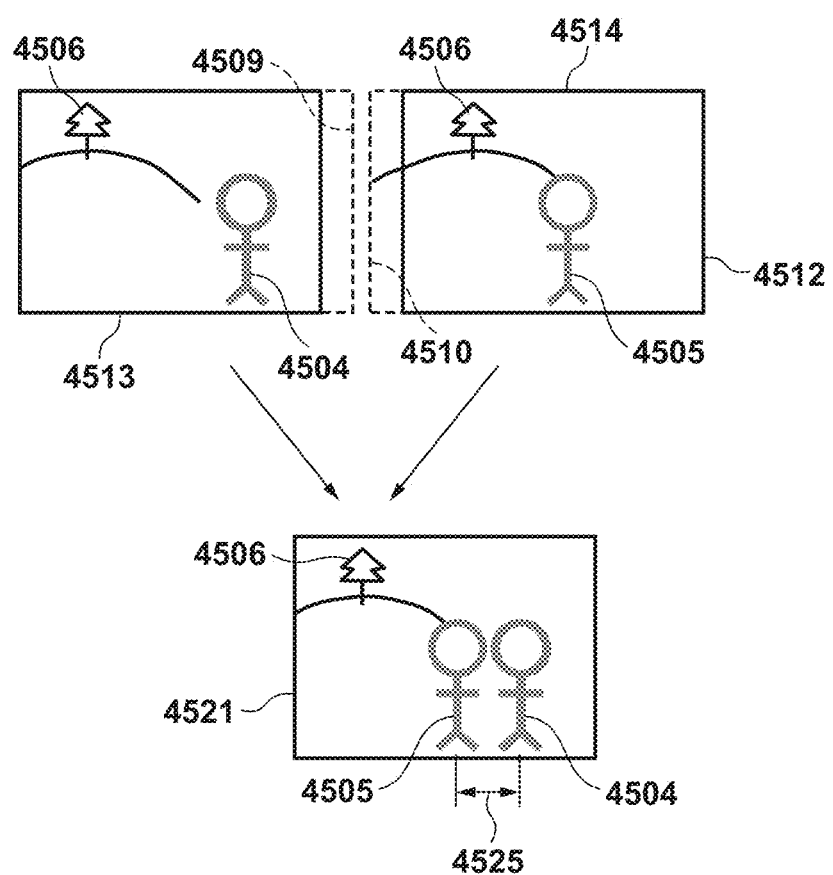
FIG. 45 is a view for explaining a problem.

FIG. 45 is a view showing images displayed on the display devices of the HMD shown in FIG. 44. A frame 4513 is a frame of the display device 4413. A frame 4509 indicated by a broken line corresponds to the frame 4111 shown in FIG. 41, and is an image range captured by the stereo camera 4001. A leftward portion of the image of the frame 4111 is extracted and displayed on the display device 4413. Similarly, a frame 4514 is a frame of the display device 4414. A frame 4510 indicated by a broken line corresponds to the frame 4112 shown in FIG. 41, and is an image range captured by the stereo camera 4002. A rightward portion of the image of the frame 4112 is extracted and displayed on the display device 4414.

The frames 4513 and 4514 are frames at the same position with reference to trees 4506, and the trees 4506 overlap each other into one tree by making the images of the frames 4513 and 4514 overlap each other, as indicated by a frame 4521. On the other hand, there are two persons 4504 and 4505 but the left eye 4401 and the right eye 4402 observe the persons, respectively, and thus the observer perceives that the person exists on the front side due to the stereoscopic effect.

Referring to FIG. 44, a gray circle 4417 is a position at which the person is displayed on the display device 4413, and a gray circle 4418 is a position at which the person is displayed on the display device 4414. Furthermore, a black cross 4419 is a position at which the tree is displayed on the display device 4413, and a black cross 4420 is a position at which the tree is displayed on the display device 4414. At this time, the observer feels as if the tree existed at a black cross 4406 as the intersection point of the line of sight of the left eye 4401 and that of the right eye 4402, and the person existed closer than the tree.

An angle formed by the line of sight of the left eye 4201 and that of the right eye 4202, or an angle formed by the line of sight of the left eye 4401 and that of the right eye 4402 is detected. Then, a distance 4222 or 4422 between the eyes and the object seen with the eyes can be calculated from the angle. Based on the distance 4222 or 4422, the left-eye display device 4213 can be moved rightward and the right-eye display device 4214 can be moved leftward in correspondence with the crossed eyes in the case of near vision, as shown in FIG. 42. This can narrow a gap 4224 between the display devices. In addition, to correspond to the thickness of the crystalline lens in the case of near vision, both the display devices can be moved downward, thereby decreasing a distance 4223 between the eyes and the display devices. To the contrary, the left-eye display device 4413 can be moved leftward and the right-eye display device 4414 can be moved rightward in correspondence with the lines of sight of the eyes becoming close to each other in parallel in the case of far vision, as shown in FIG. 44, thereby increasing a distance 4423 between the eyes and the display devices.

The method shown in FIGS. 42, 43, 44, and 45 of observing the images of FIG. 41 captured by the stereo camera shown in FIG. 40 using the head mounted display (to be referred to as the HMD hereinafter) disclosed in Japanese Patent Laid-Open No. 9-68670 is different from a situation in which the observer actually sees the person and tree on site in terms of the following points. Therefore, there is a problem that the observer feels eyestrain and discomfort.

FIGS. 46, 47, 48, and 49 each show a state in which the observer sees, on site, a view captured by the stereo camera shown in FIG. 40. Reference numerals 4601 and 4801 each denote a left eye of the observer. Reference numerals 4602 and 4802 each denote a right eye of the observer. The left eyes 4601 and 4801 exist at the same position as that of the left-eye camera 4001 shown in FIG. 40. Similarly, the right eyes 4602 and 4802 exist at the same position as that of the right-eye camera 4002 shown in FIG. 40.

Figure 46:
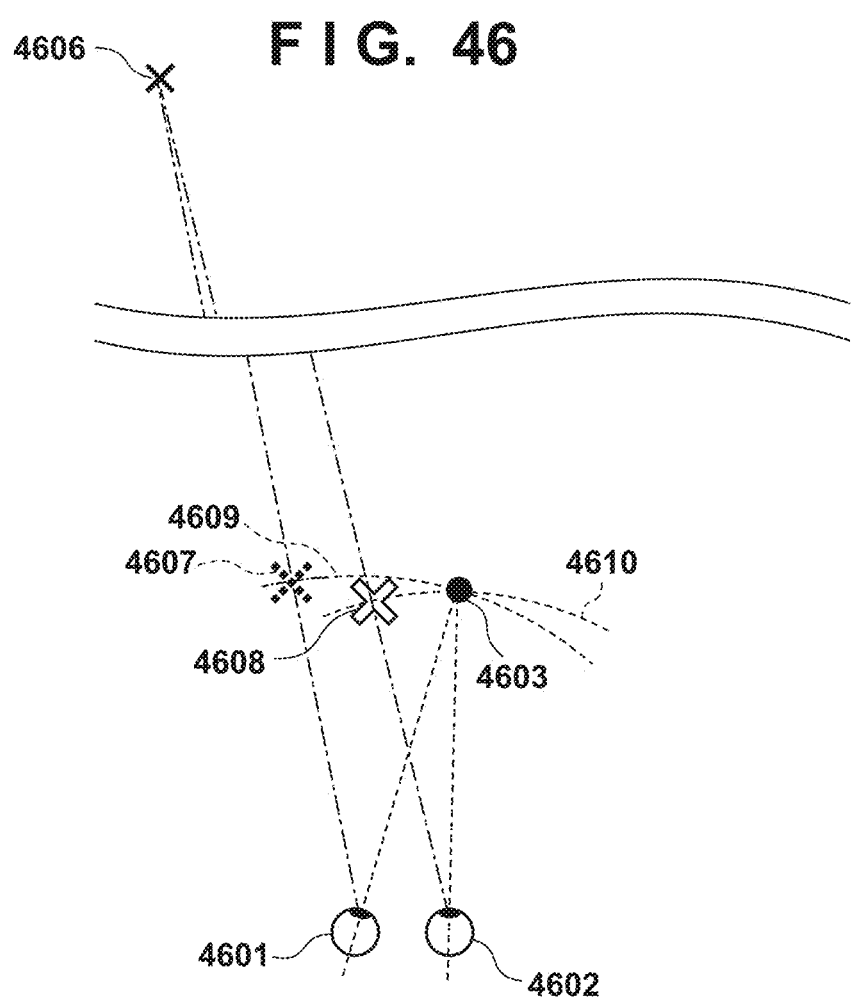
FIG. 46 is a view for explaining a problem.
Figure 47:
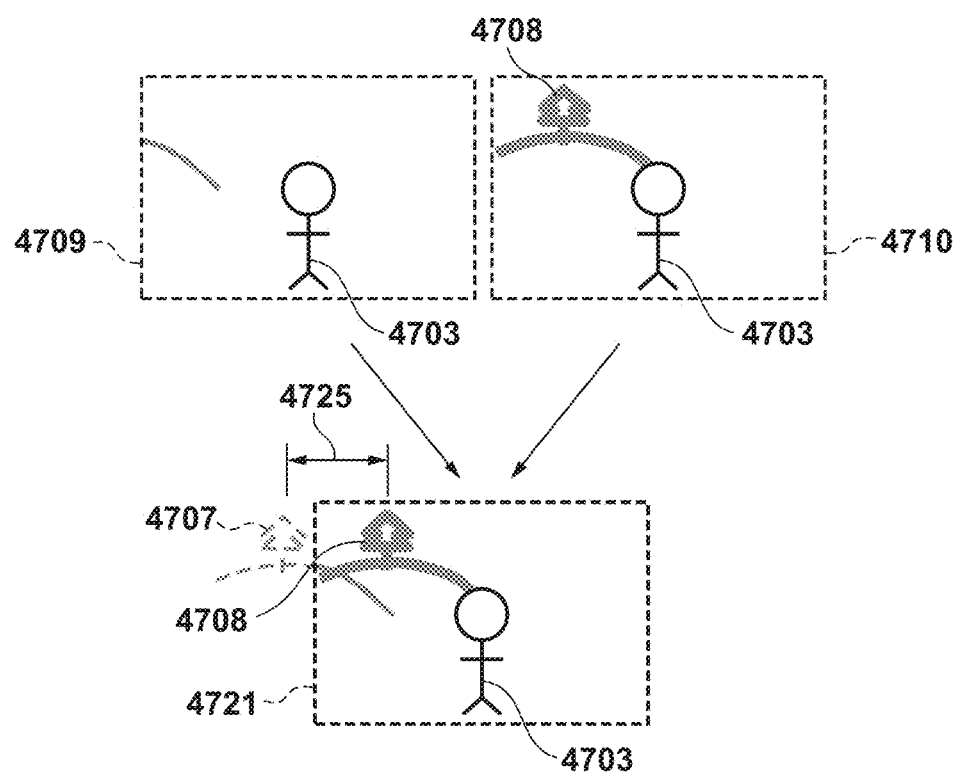
FIG. 47 is a view for explaining a problem.

FIGS. 46 and 47 each show a state in which the observer sees a person on the front side. The line of sight of the left eye 4601 and that of the right eye 4602 intersect each other at a position of a black circle 4603 where the person exists. An arc-shaped broken line 4609 corresponds to the arc-shaped focal plane of the eye described with reference to FIG. 39, and the focal plane of the left eye 4601. Therefore, the line of sight of the left eye 4601 intersects the arc-shaped focal plane 4609 at the right angle. Similarly, an arc-shaped broken line 4610 corresponds to the focal plane of the right eye 4602, and the line of sight of the right eye 4602 intersects the arc-shaped focal plane 4610 at the right angle.

The first different point of the method shown in FIG. 42 from the situation shown in FIG. 46 is that a focal plane 4209 is not orthogonal to the line of sight of the left eye 4201. This causes an imbalance that it is easy to focus on, on the left side of the line of sight, an object on the front side close to the left eye 4201 and it is easy to focus on, on the right side of the line of sight, an object on the far side from the left eye 4201. Similarly, since a focal plane 4210 is not orthogonal to the line of sight of the right eye 4202, this causes an imbalance that it is easy to focus on, on the left side of the line of sight, an object on the front side close to the right eye 4202 and it is easy to focus on, on the right side of the line of sight, an object on the far side from the right eye 4202.

To the contrary, since the focal plane 4609 is orthogonal to the line of sight in FIG. 46, it is easy to equally focus on the objects on the left and right sides of the line of sight with respect to the distance from the left eye 4601. This difference causes discomfort and eyestrain of the observer.

The second different point of the method shown in FIG. 42 from the situation shown in FIG. 46 depends on the shape difference of the focal plane. The focal plane 4210 shown in FIG. 42 is approximately orthogonal to the line of sight of the right eye 4202. However, this shape is an approximately flat plane which is different from the approximately spherical plane of the focal plane 4610 shown in FIG. 46. Therefore, since the distance between a subject and the focal plane is different, the degree of blurring of the subject is different. This is not solved even if the depth of field of the right-eye camera 4002 and that of the right eye 4602 of FIG. 46 can be adjusted to each other.

For example, the distance between a black cross 4606 at which a tree exists and a tree image 4608 on the focal plane 4610 in FIG. 46 is longer than the distance between a black cross 4206 at which a tree exists and a tree image 4208 on the focal plane 4210 in FIG. 42. Therefore, even if the depth of field of the right-eye camera 4002 is equal to that of the right eye 4202 of FIG. 42, the degrees of blurring of the tree images 4608 and 4208 are different from each other. This is apparently indicated by the difference in thickness between the line of the tree image 4308 shown in FIG. 43 and the line of a tree image 4708 shown in FIG. 47. The difference in the degree of blurring also causes discomfort and eyestrain of the observer.

The third different point of the method shown in FIG. 42 from the situation shown in FIG. 46 is that the person 4303 of FIG. 43 corresponding to the black circle 4203 in the direction of the line of sight is not at the center of the frame 4313 or 4314 representing the visual field. A person 4703 of FIG. 47 corresponding to the black circle 4603 in the direction of the line of sight in FIG. 46 exists at the center of a frame 4709 or 4710 representing the visual field. This is because the visual field of a human eye moves along with the movement of the line of sight and the direction of the line of sight is always at the center of the visual field. In addition, this is because, in almost all cases except for special cases, the human eye is always adjusted to set the focus in the direction of the line of sight. To the contrary, in the case of the system shown in FIG. 42, a point other than the center of the visual field is in focus, as shown in FIG. 43, and the line of sight can be moved to the tree 4307 or 4308 which is out of focus in this state. This cases discomfort and eyestrain of the observer.

The fourth different point of the method shown in FIG. 42 from the situation shown in FIG. 46 will be described by comparing the frame 4321 of FIG. 43 with a frame 4721 of FIG. 47. As described above, the focal plane 4209 is different from the focal plane 4609, and the focal plane 4210 is different from the focal plane 4610. Thus, the positional relationship between the person 4303 and the tree 4307 or between the person 4303 and the tree 4308 in the frame 4321 is different from the positional relationship between the person 4703 and a tree 4707 or between the person 4703 and the tree 4708 in the frame 4721. Especially, a distance 4325 between the trees 4307 and 4308 in the frame 4321 is different from a distance 4725 between the trees 4707 and 4708 in the frame 4721. These distances 4325 and 4725 are important factors for determining the distance between the person and the tree in the human brain when performing the stereoscopic vision. If these distances are different from each other, the observer feels that the distance between the person and the tree is different from the actual distance, thereby causing discomfort and eyestrain. This causes discomfort that, for example, a stereoscopic image looks as if it were projected from a screen unnaturally, differently from the feeling or looks as if it were floating when viewed from the oblique direction.

Figure 48:
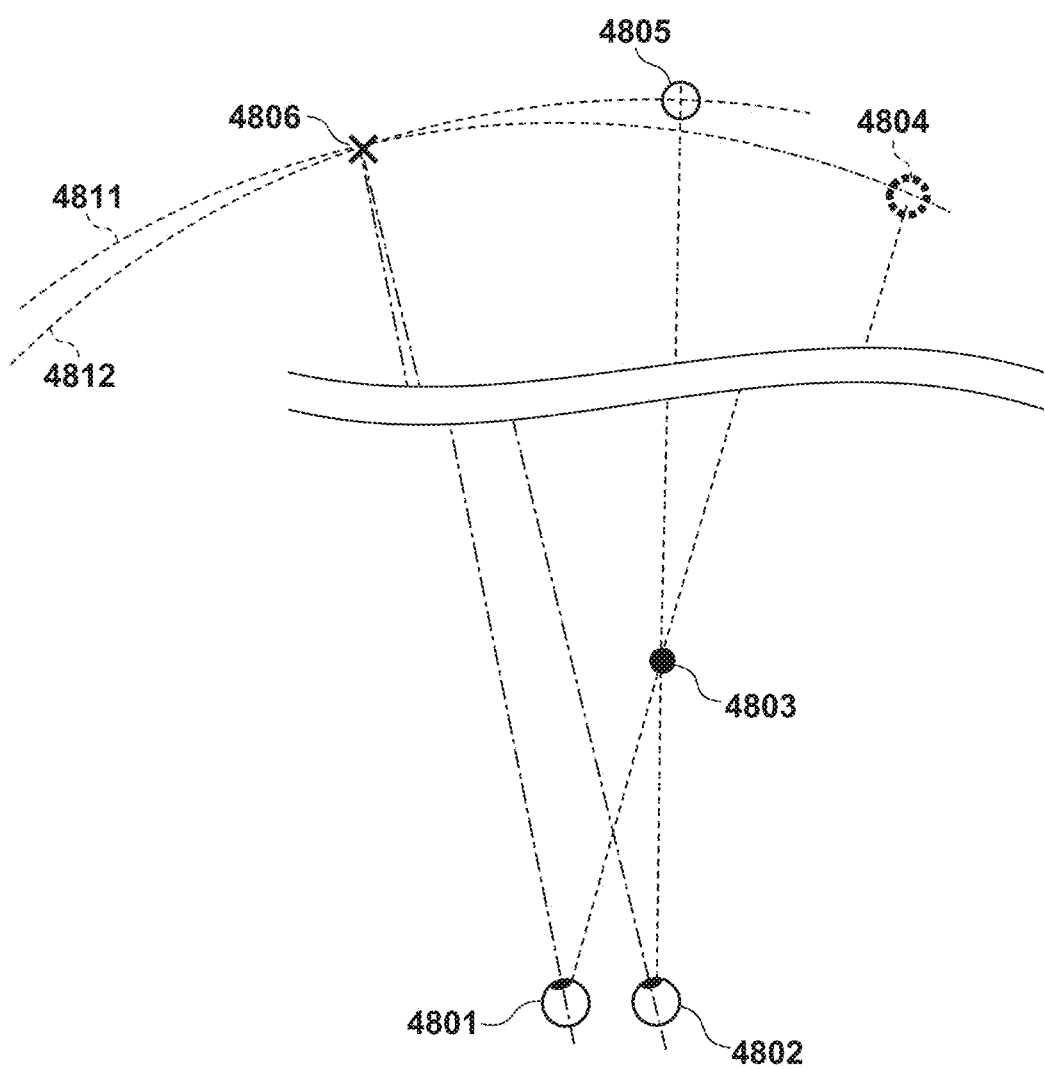
FIG. 48 is a view for explaining a problem.
Figure 49:
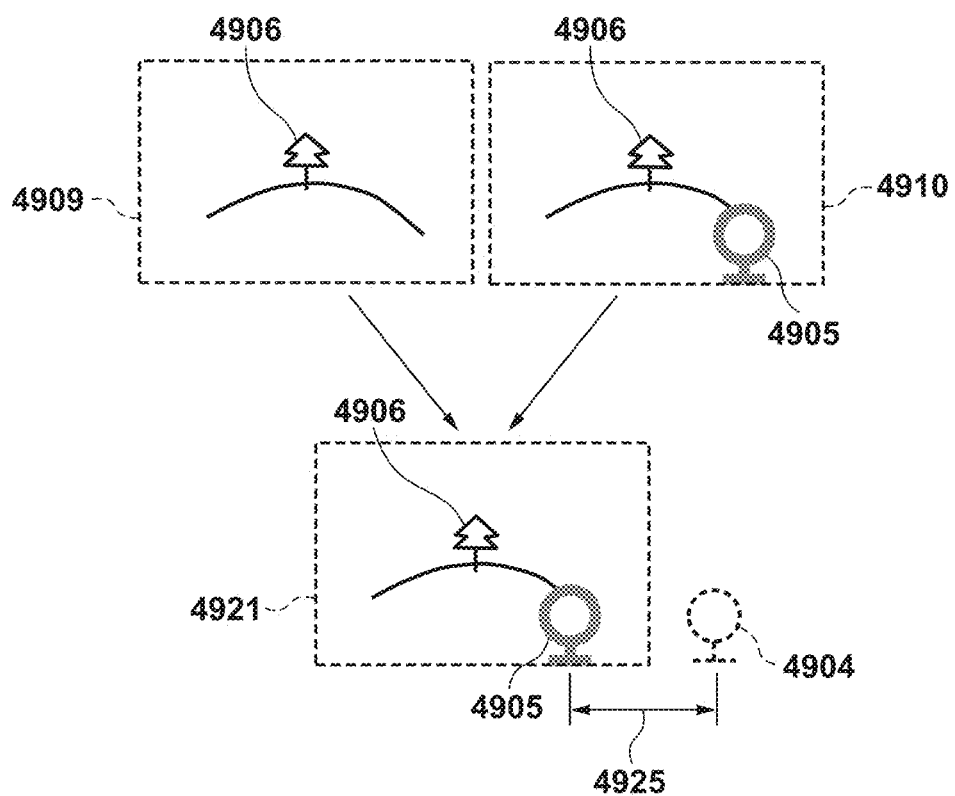
FIG. 49 is a view for explaining a problem.

The above-described first to fourth different points are similarly understood by comparing FIGS. 44 and 45 or FIGS. 48 and 49 with each other. FIGS. 48 and 49 show a situation in which the observer sees a tree on the far side. The line of sight of the left eye 4801 intersects that of the right eye 4802 at a position of a black cross 4806 where the tree exists. An arc-shaped broken line 4811 indicates the arc-shaped focal plane of the eye described with reference to FIG. 39, and is the focal plane of the left eye 4801. Therefore, the line of sight of the left eye 4801 intersects the arc-shaped focal plane 4811 at the right angle. Similarly, an arc-shaped broken line 4812 indicates the focal plane of the right eye 4802, and the line of sight of the right eye 4802 intersects the arc-shaped focal plane 4812 at the right angle.

The first different point of the method shown in FIG. 44 from the situation shown in FIG. 48 is that a focal plane 4411 is not orthogonal to the line of sight of the left eye 4401. This causes an imbalance that it is easy to focus on, on the left side of the line of sight, an object on the far side from the left eye 4401 and it is easy to focus on, on the right side of the line of sight, an object on the front side close to the left eye 4401. Similarly, since the focal plane 4411 is not orthogonal to the line of sight of the right eye 4402, this causes an imbalance that it is easy to focus on, on the left side of the line of sight, an object on the far side from the right eye 4402 and it is easy to focus on, on the right side of the line of sight, an object on the front side close to the right eye 4402.

To the contrary, since the focal plane 4811 is orthogonal to the line of sight in FIG. 48, it is easy to equally focus on the objects on the left and right sides of the line of sight with respect to the distance from the left eye 4801. This difference causes discomfort and eyestrain of the observer.

The second different point of the method shown in FIG. 44 from the situation shown in FIG. 48 depends on the shape difference of the focal plane. The shape of each of a focal plane 4410 and the focal plane 4411 shown in FIG. 44 is an approximately flat plane which is different from the approximately spherical plane of each of the focal planes 4811 and 4812 shown in FIG. 48. Therefore, since the distance between the subject and the focal plane is different between the cases in FIGS. 44 and 48, the degree of blurring of the subject is different. This is not solved even if the depth of field of the left-eye camera 4001 and that of the left eye 4801 of FIG. 48 can be adjusted to each other and the depth of field of the right-eye camera 4002 and that of the right eye 4802 of FIG. 48 can be adjusted to each other.

For example, the distance between a position of a black circle 4803 at which the person actually exists and a position of a gray circle 4805 indicating an person image on the focal plane 4812 in FIG. 48 is longer than the distance between a position of a black circle 4403 at which the person actually exists and a gray circle 4405 indicating a person image on a focal plane 4412 in FIG. 44. Therefore, the degree of blurring of the person image of the gray circle 4805 is higher than that of the person image of the gray circle 4405. This is apparently indicated by the difference in thickness between the line of the person image 4505 shown in FIG. 45 and the line of the person image 4905 shown in FIG. 49. This difference in the degree of blurring also causes discomfort and eyestrain of the observer.

The third different point of the method shown in FIG. 44 from the situation shown in FIG. 48 is that the tree 4506 of FIG. 45 corresponding to the black cross 4406 in the direction of the line of sight is not at the center of the visual field. A tree 4906 of FIG. 49 corresponding to the black cross 4806 in the direction of the line of sight in FIG. 48 exists at the center of a frame 4909 or 4910 representing the visual field. This is because the visual field of a human eye moves along with the movement of the line of sight and the direction of the line of sight is always at the center of the visual field. In addition, this is because, in almost all cases except for special cases, the human eye is always adjusted to set the focus in the direction of the line of sight. To the contrary, in the case of the system shown in FIG. 44, a point other than the center of the visual field is in focus, as shown in FIG. 45, and the line of sight can be moved to the person 4504 or 4505 which is out of focus in this state. This causes discomfort and eyestrain of the observer.

The fourth different point of the method shown in FIG. 44 from the situation shown in FIG. 48 will be described by comparing the frame 4521 of FIG. 45 with a frame 4921 of FIG. 49. As described above, the focal plane 4411 is different from the focal plane 4811, and the focal plane 4412 is different from the focal plane 4812. Thus, the positional relationship between the person 4504 and the tree 4506 or between the person 4505 and the tree 4506 in the frame 4521 is different from the positional relationship between a person 4904 and the tree 4906 or between the person 4904 and the tree 4906 in the frame 4921. Especially, a distance 4525 between the persons 4504 and 4505 in the frame 4521 is different from a distance 4925 between the persons 4904 and 4905 in the frame 4921. These distances 4525 and 4925 are important factors for determining the distance between the person and the tree in the human brain when performing the stereoscopic vision. If these distances are different from each other, the observer feels that the distance between the person and the tree is different from the actual distance, thereby causing discomfort and eyestrain. This causes discomfort that, for example, a stereoscopic image looks as if it were projected from a screen unnaturally, differently from the feeling or looks as if it were floating when viewed from the oblique direction.

Furthermore, the conventional HMD has factors of eyestrain different from that caused by the above-described four different points. In the state shown in FIG. 42, the display device 4213 is not orthogonal to the line of sight of the left eye 4201. Furthermore, the display device 4214 is not orthogonal to the line of sight of the right eye 4202. Therefore, the optical axis of the lens 4215 does not match the line of sight of the left eye 4201 and the optical axis of the lens 4216 does not match the line of sight of the right eye 4202. This means that the image in the direction of the line of sight to be seen by the observer is readily influenced by the optical aberrations of the lenses 4215 and 4216. The same applies to the state shown in FIG. 44. That is, in the conventional HMD, the optical axis of the lens matches the line of sight only when the observer sees the far side in front of him/her, and most of the remaining portion is influenced by the optical aberrations of the lens, thereby causing eyestrain. Furthermore, to suppress the influence of the aberrations, the optical system becomes complicated and large in size.

The following embodiments provide a technique advantageous in eliminating or reducing discomfort and eyestrain likely felt by an observer at the time of observation using an HMD.

The first embodiment will be described with reference to FIGS. 1 to 8. FIG. 1 shows one state of a head mounted display (to be referred to as an HMD hereinafter) according to the first embodiment. The HMD includes a display device 0113 for a left eye 0101 of an observer, and a lens (optical system) 0115 for adjusting the focal point of the left eye 0101 to the display surface of the display device 0113. Similarly, the HMD includes a display device 0114 for a right eye 0102, and a lens (optical system) 0116 for adjusting the focal point of the right eye 0102 to the display surface of the display device 0114.

The lens 0115 and the display device 0113 can be adjusted with respect to five axes so that the optical axis of the lens 0115 matches the central normal of the display device 0113. Furthermore, a distance 0126 between the lens 0115 and the display device 0113 can be adjusted to a predetermined distance with respect to the sixth axis. The lens 0115 and the display device 0113 can form one left-eye display module. As the range of the above-described 6-axis adjustment, the translation distance falls within a range of ±40 μm, and more preferably, ±4 μm, and the angle falls within a range of ±40 arc minutes, and more preferably, ±4 arc minutes. A mechanism (not shown) that can change the distance 0126 from the predetermined distance within a predetermined movable range can be provided in the left-eye display module. Furthermore, the lens 0116 and the display device 0114 can form a right-eye display module.

A line connecting the left eye 0101 and a black circle 0103 indicates the line of sight of the left eye 0101. An adjustment mechanism (not shown) for adjusting the position of the left-eye display module so that the line of sight of the left eye 0101 matches the optical axis of the lens 0115 is provided in the HMD. Furthermore, a mechanism for adjusting the position of the left-eye display module so that the distance 0126 between the display device 0113 and the left eye 0101 is set to a predetermined distance can be provided. Thus, even if the thickness of the crystalline lens of the left eye 0101 of the observer changes within a predetermined range, the distance 0126 between the display device 0113 and the lens 0115 in the left-eye display module can be adjusted accordingly. This can adjust the focal point of the left eye 0101 to the surface of the display device 0113. The position adjustment accuracy is the same as the above-described 6-axis adjustment range.

The position adjustment mechanism of the left-eye display module is used to set an angle θ formed by the line of sight of the left eye 0101 and the display surface of the display device 0113 to approximately 90° at the intersection point of the line of sight of the left eye 0101 and the display device 0113. The angle θ falls within the range of ±60 arc minutes, and more preferably, ±6 arc minutes. Similar to the above-described left-eye display module, the position adjustment mechanism of the right-eye display module can also be provided in the HMD. An angle θ formed by the line of sight of the right eye 0102 and the display surface of the display device 0114 can also be set to approximately 90° at the intersection point of the line of sight of the right eye 0102 and the display device 0114.

Figure 3:
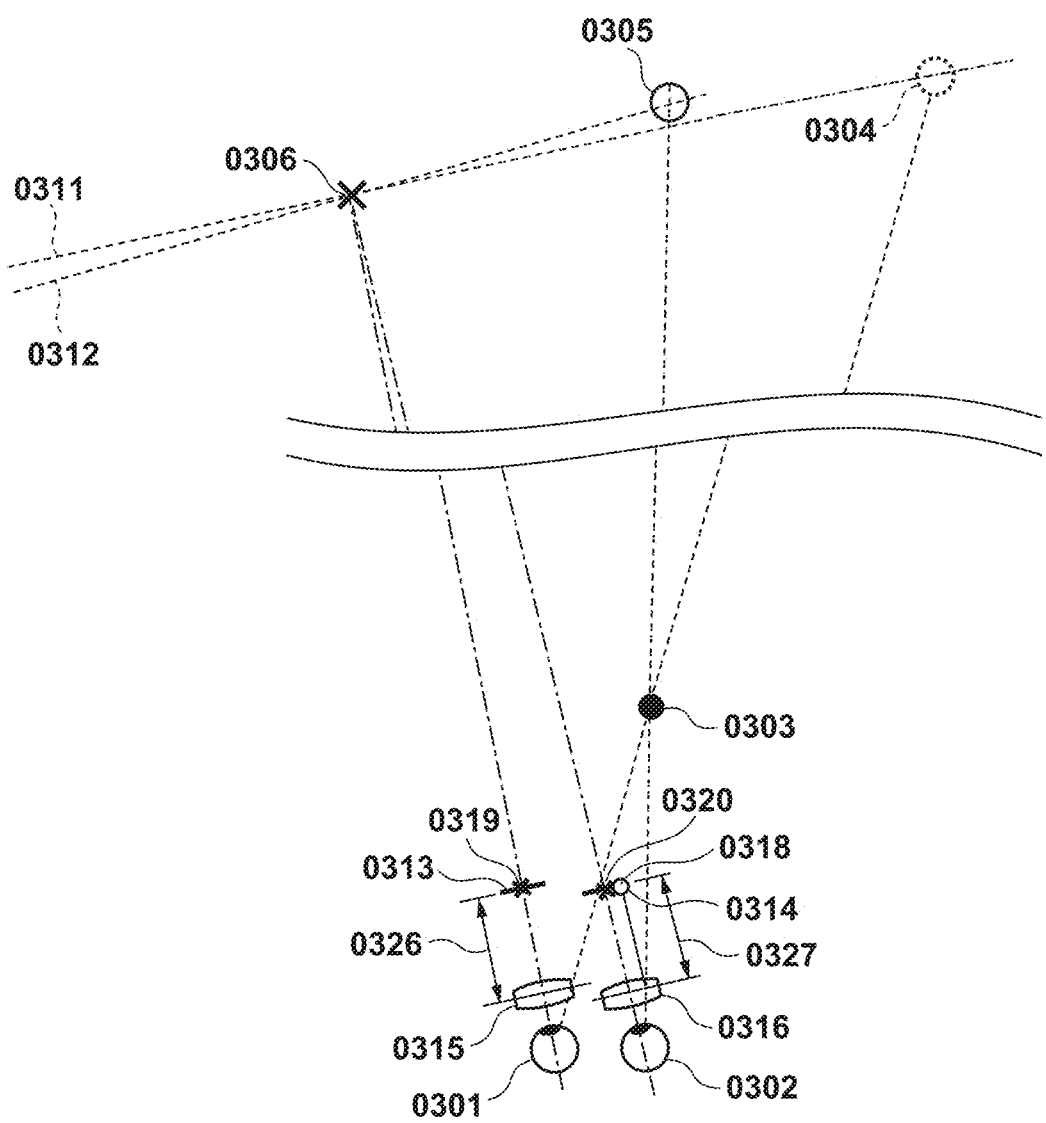
FIG. 3 is a view for explaining the first embodiment.

FIG. 3 shows another state of the HMD shown in FIG. 1 according to the first embodiment. The direction of the line of sight of a left eye 0301 is different from that of the line of sight of the left eye 0101 shown in FIG. 1. Furthermore, the direction of the line of sight of a right eye 0302 is different from that of the line of sight of the right eye 0102 shown in FIG. 1.

A line-of-sight detector (not shown) can be provided in the HMD according to the first embodiment. A mechanism (not shown) for causing the line-of-sight detector to detect the line of sight of the left eye 0301 and adjusting, based on the detection information, the position of a left-eye display module formed by a lens 0315 and a display device 0313 can be provided. With this mechanism, an angle θ formed by the line of sight of the left eye 0301 and the display surface of the display device 0313 can be maintained at approximately 90° at an intersection point 0319 of the line of sight of the left eye 0301 and the display device 0313 in FIG. 3 as well. The angle θ falls within the range of ±60 arc minutes, and more preferably, ±6 arc minutes.

Similarly, an adjuster (not shown) (corresponding to an adjuster A formed by a driving mechanism D and a controller C to be described later) for causing the line-of-sight detector to detect the line of sight of the right eye 0302 and adjusting, based on the detection information, the position of a right-eye display module formed by a lens 0316 and a display device 0314 can be provided. With this adjuster, an angle θ formed by the line of sight of the right eye 0302 and the display surface of the display device 0314 can be maintained or adjusted to approximately 90° at an intersection point 0320 of the line of sight of the right eye 0302 and the display surface of the display device 0314. In this case as well, the angle θ falls within the range of ±60 arc minutes, and more preferably, ±6 arc minutes.

Even if the line of sight faces in a direction other than the directions of the lines of sight shown in FIGS. 1 and 3, a similar adjuster can execute such control that the angle θ formed by the line of sight and the display surface of the display device is always set to approximately 90° at the intersection point of the line of sight and the display surface of the display device. By maintaining the angle θ formed by the line of sight and the display surface of the display device at 90° in this way, two of the factors of eyestrain caused by the conventional HMD are solved.

The first factor of eyestrain is the influence of optical aberrations caused when the display surface of the display device is not orthogonal to the line of sight of the eye in the conventional HMD, as in the example shown in FIG. 42 or 44, in a state other than the state in which the line of sight faces the front. This factor is solved. It is also possible to prevent the optical system from becoming complicated and large in size to suppress the influence of the aberrations.

The second factor is the third different point between the case in which observation is performed using the conventional HMD and the case in which observation with the eyes is performed on site when comparing FIGS. 42 and 46 and FIGS. 44 and 48. That is, in the conventional HMD, an object, to be seen by the observer, in the direction of the line of sight is not always at the center of the visual field, thereby causing eyestrain. In the first embodiment, since the direction of the line of sight is always held at the center of the display device, the image to be seen by the observer is always kept at the center of the visual field, thereby solving the other factor of eyestrain.

Figure 5:
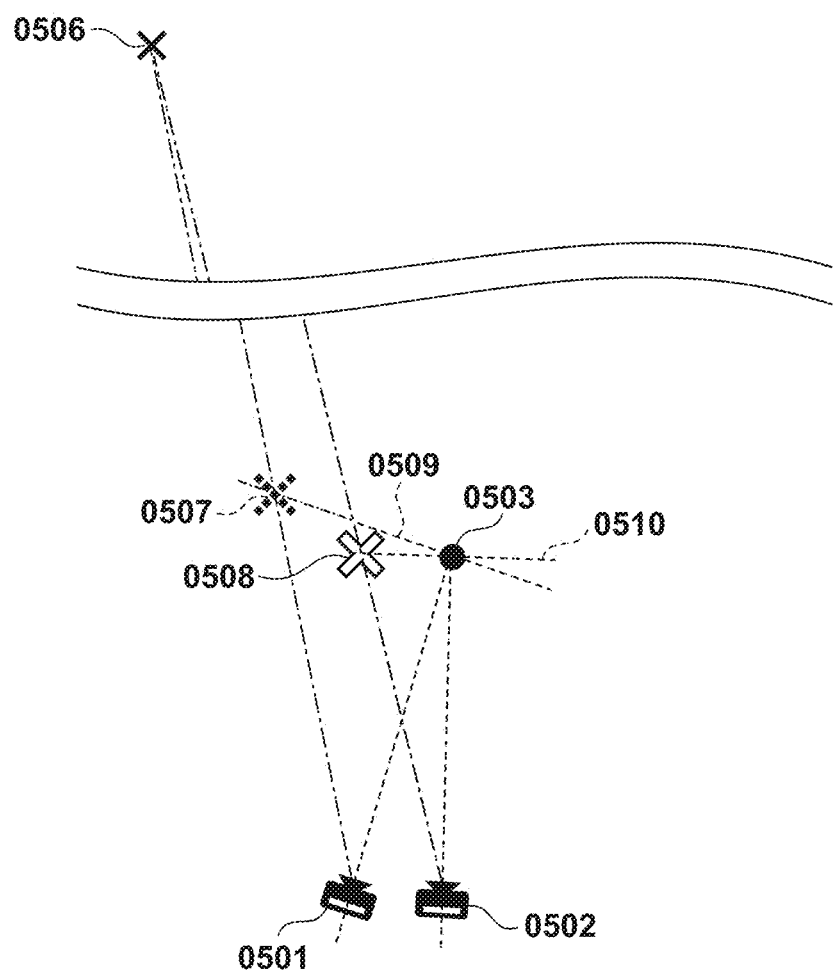
FIG. 5 is a view for explaining the second embodiment.

FIG. 5 is a view showing a state in which a left-eye camera module 0501 is used to capture an image to be displayed on the display device 0113 shown in FIG. 1, and a right-eye camera module 0502 is used to capture an image to be displayed on the display device 0114 shown in FIG. 1. An attitude controller (not shown) that receives the line-of-sight detection information of the left eye 0101 shown in FIG. 1 and controls the attitude of the left-eye camera module 0501 so that the optical axis of the camera module 0501 faces in the same direction as that of the line of sight of the left eye 0101 can be provided. Similarly, an attitude controller (not shown) that controls the attitude of the right-eye camera module 0502 so that the optical axis of the right-eye camera module 0502 matches the line of sight of the right eye 0102 can be provided.

Each of the camera modules 0501 and 0502 can incorporate a flat plate image sensor represented by a white line. Broken lines 0509 and 0510 represent the focal planes of the camera modules 0501 and 0502 on the object side, respectively. Therefore, an image of an object on the broken line 0509 is formed on the image sensor represented by the white line through the lens of the camera module 0501. Similarly, an image of an object on the broken line 0510 is formed on the image sensor represented by the white line through the lens of the camera module 0502.

Referring to FIG. 5, a person exists at a black circle 0503 at the intersection point of the optical axis of the camera module 0501 and that of the camera module 0502. In addition, a tree exists at a black cross 0506 on the left far side. The broken line 0510 has an intersection point with a one-dot dashed line connecting the camera module 0502 and the black cross 0506. Therefore, the captured image of the camera module 0502 includes the tree. This is indicated by a gray cross 0508. If the tree actually exists at the position of the gray cross 0508, the tree image in the captured image of the camera module 0502 is an in-focus image. However, since the tree actually exists at the position of the black cross 0506, the tree image is an image that blurs in proportional to the distance between the black cross 0506 and the gray cross 0508.

On the other hand, a one-dot dashed line connecting the camera module 0501 and the black cross 0506 has no intersection point with the broken line 0509, and has an intersection point with a one-dot dashed line as the extension of the broken line 0509. This is indicated by a dashed line gray cross 0507. Therefore, the captured image of the camera module 0501 includes no tree.

Figure 6:
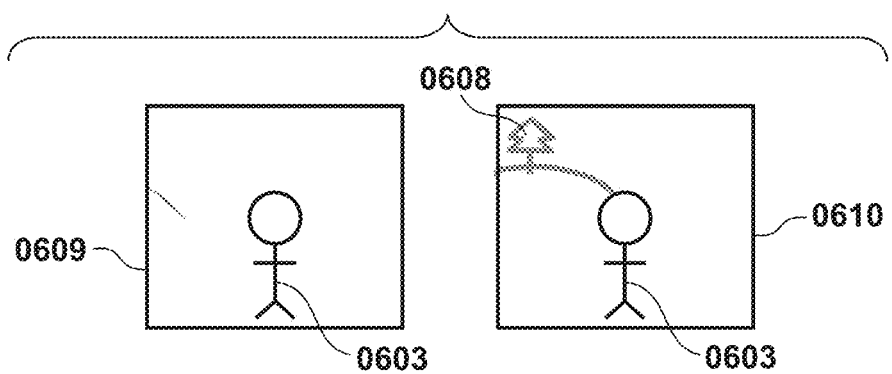
FIG. 6 is a view for explaining the first embodiment.

FIG. 6 is a view showing images captured by the camera modules shown in FIG. 5. A frame 0609 corresponds to the broken line 0509 in FIG. 5, and a frame 0610 corresponds to the broken line 0510 in FIG. 5. Since a person exists at the black circle 0503 on the optical axis of the camera module 0501 in FIG. 5, a person image 0603 is at the center of the frame 0609 in FIG. 6. Similarly, since there is also the black circle 0503 on the optical axis of the camera module 0502 and the person exists at this position, the person image 0603 is at the center of the frame 0610 in FIG. 6. Since there is a parallax of the camera modules 0501 and 0502 between the person images 0603, these images are at the centers of the frames, respectively, but are not the same. Although a tree image 0608 is included at the upper left end of the frame 0610, this image blurs due to the above-described reason. This is apparently indicated by a gray medium thick line. On the other hand, the frame 0609 includes no tree image due to the above-described reason.

Figure 2:
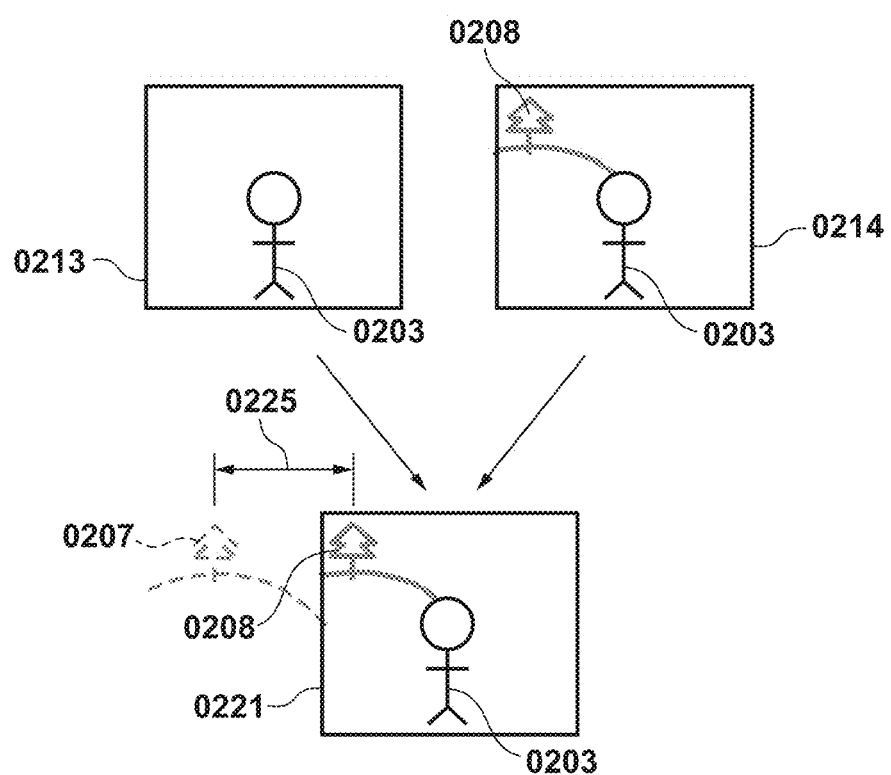
FIG. 2 is a view for explaining the first embodiment.

FIG. 2 is a view showing a state in which the captured images shown in FIG. 6 are displayed on the display devices shown in FIG. 1. The captured image of the frame 0609 in FIG. 6 is displayed on the display device 0113 shown in FIG. 1. The displayed image corresponds to a frame 0213 shown in FIG. 2. Similarly, the captured image of the frame 0610 in FIG. 6 is displayed on the display device 0114 shown in FIG. 1. The displayed image corresponds to a frame 0214 shown in FIG. 2. Since the observer sees the image of the frame 0213 with the left eye 0101 and sees the image of the frame 0214 with the right eye 0102, both the images are composited in the brain. This is represented by a frame 0221. One central person image 0203 is included but this is obtained when the person image 0203 of the frame 0213 and the person image 0203 of the frame 0214 including the parallax overlap each other, thereby perceiving the image stereoscopically. The spatial distance with respect to the person image 0203 is estimated in the brain based on the fact that a tree image 0208 is felt only by the right eye 0102 and the degree of blurring of the tree image.

Consider a case in which there are no display devices 0113 and 0114 and no lens 0115 and 0116, and the observer sees the person existing at the black circle 0103 in FIG. 1. In this case, the crystalline lens of the left eye 0101 and that of the right eye 0102 are each adjusted to a predetermined thickness to focus on the person at the black circle 0103. A person image 0117 on the actually existing display device 0113 can be formed on the retina of the left eye 0101 while keeping the predetermined thickness by adjusting the distance 0126 between the display device 0113 and the lens 0115. Similarly, a person image 0118 on the actually existing display device 0114 can be formed on the retina of the right eye 0102 while keeping the predetermined thickness by adjusting a distance 0127 between the display device 0114 and the lens 0116. When such adjustment is performed, the focal plane of the left eye 0101 felt by the observer is indicated by a broken line 0109 and the focal plane of the right eye 0102 is indicated by a broken line 0110, thereby reproducing the focal plane 0509 of the camera module 0501 and the focal plane 0510 of the camera module 0502 in FIG. 5.

Figure 7:
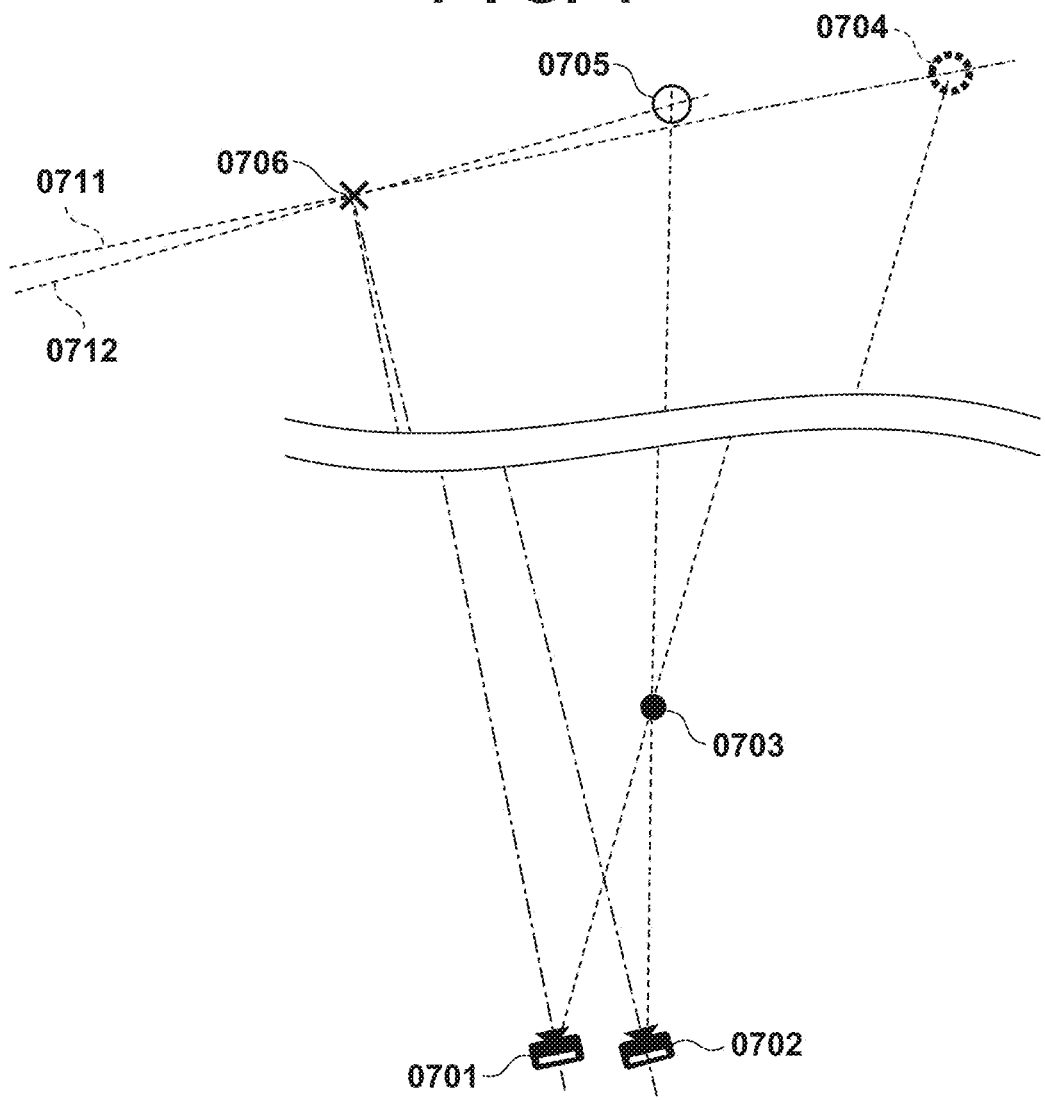
FIG. 7 is a view for explaining the first embodiment.

Next, if the awareness of the observer is moved from the person to a distant tree 0306, the line of sight of the left eye 0301 is moved to a one-dot dashed line connecting the left eye 0301 and the black cross 0306, as shown in FIG. 3. Similarly, the line of sight of the right eye 0302 is moved to a one-dot dashed line connecting the right eye 0302 and the black cross 0306. These changes of the lines of sight are detected by the above-described line-of-sight detector (not shown), and transferred to the adjusters (not shown) that control the attitudes of the camera modules 0501 and 0502, respectively. As a result, the optical axis of the camera module 0501 matches the line of sight of the left eye 0301 in FIG. 3, and the optical axis of the camera module 0502 matches the line of sight of the right eye 0302 in FIG. 3. FIG. 7 is a view showing this state.

Referring to FIG. 7, a tree exists at a black cross 0706 at the intersection point of the optical axis of a camera module 0701 and that of a camera module 0702. Furthermore, a person exists at a black circle 0703 on the right front side. A broken line 0712 has an intersection point with a broken line connecting the camera module 0702 and the black circle 0703. Therefore, a captured image of the camera module 0702 includes the person. This is indicated by a gray circle 0705. If the person actually exists at the position of the gray circle 0705, the person image in the captured image of the camera module 0702 is an in-focus image. However, since the person actually exists at the position of the black circle 0703, the person image is an image that blurs in proportional to the distance between the black circle 0703 and the gray circle 0705. On the other hand, a broken line connecting the camera module 0701 and the black circle 0703 has no intersection point with a broken line 0711, and has an intersection point with a one-dot dashed line as the extension of the broken line 0711. This is indicated by an open gray circle 0704. Therefore, the captured image of the camera module 0701 includes no person.

Figure 8:
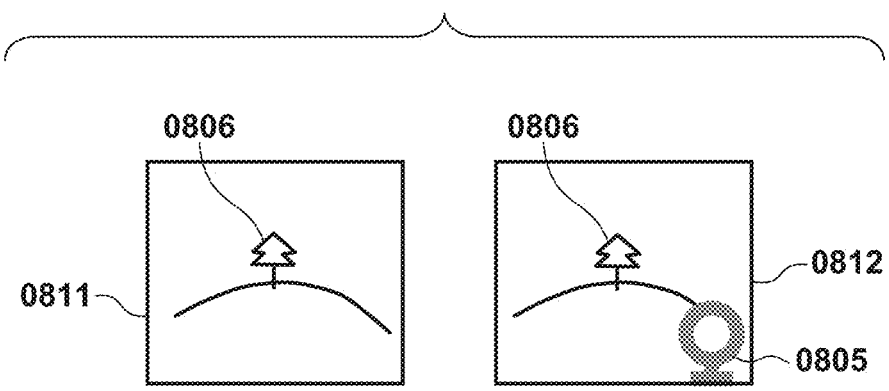
FIG. 8 is a view for explaining the first embodiment.

FIG. 8 is a view showing the images captured by the camera modules shown in FIG. 7. A frame 0811 corresponds to the broken line 0711 in FIG. 7, and a frame 0812 corresponds to the broken line 0712 in FIG. 7. Since a tree exists at the black cross 0706 on the optical axis of the camera module 0701 in FIG. 7, a tree image 0806 is at the center of the frame 0811 in FIG. 8. Similarly, since there is also the black cross 0706 on the optical axis of the camera module 0702 and the tree exists at this position, the tree image 0806 is at the center of the frame 0812 in FIG. 8. Since there is a parallax of the camera modules 0701 and 0702 between the tree images 0806, these images are at the centers of the frames, respectively, but are not the same. Although a person image 0805 is included at the lower right end of the frame 0812, this image blurs due to the above-described reason. This is apparently indicated by a gray extra thick line. On the other hand, the frame 0811 includes no person image due to the above-described reason.

Figure 4:
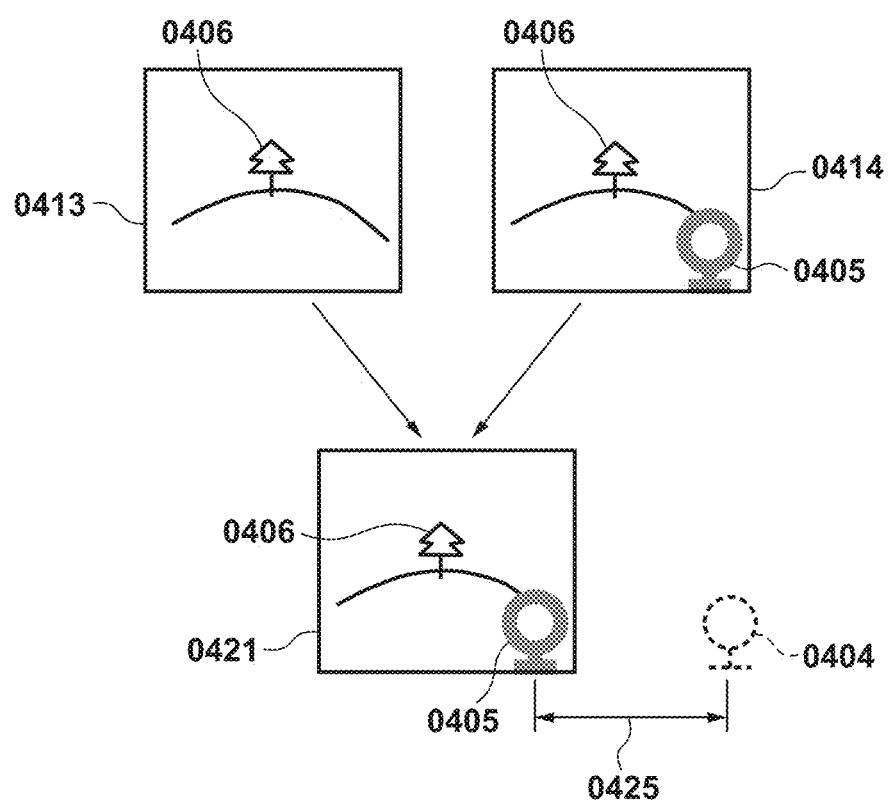
FIG. 4 is a view for explaining the first embodiment.

FIG. 4 is a view showing a state in which the captured images shown in FIG. 8 are displayed on the display devices shown in FIG. 3. The captured image of the frame 0811 in FIG. 8 is displayed on the display device 0313 shown in FIG. 3. The displayed image corresponds to a frame 0413 shown in FIG. 4. Similarly, the captured image of the frame 0812 in FIG. 8 is displayed on the display device 0314 shown in FIG. 3. The displayed image corresponds to a frame 0414 shown in FIG. 4. Since the observer sees the image of the frame 0413 with the left eye 0301 and sees the image of the frame 0414 with the right eye 0302, both the images are composited in the brain. This is represented by a frame 0421. One central tree image 0406 is included but this is obtained when the tree image 0406 of the frame 0413 and the tree image 0406 of the frame 0414 including the parallax overlap each other, thereby perceiving the image stereoscopically. The spatial distance with respect to the tree image 0406 is estimated in the brain based on the fact that a person image 0405 is felt only by the right eye 0302 and the degree of blurring of the person image.

Consider a case in which there are no display devices 0313 and 0314 and no lenses 0315 and 0316, and the observer sees the tree existing at the black cross 0306 in FIG. 3. The crystalline lens of the left eye 0301 and that of the right eye 0302 are each adjusted to a predetermined thickness to focus on the tree at the black cross 0306. The tree image 0319 on the actually existing display device 0313 can be formed on the retina of the left eye 0301 while keeping the predetermined thickness by adjusting a distance 0326 between the display device 0313 and the lens 0315. Similarly, the tree image 0320 on the actually existing display device 0314 can be formed on the retina of the right eye 0302 while keeping the predetermined thickness by adjusting a distance 0327 between the display device 0314 and the lens 0316. When such adjustment is performed, the focal plane of the left eye 0301 felt by the observer is indicated by a broken line 0311 and the focal plane of the right eye 0302 is indicated by a broken line 0312, thereby reproducing the focal plane 0711 of the camera module 0701 and the focal plane 0712 of the camera module 0702 in FIG. 7.

In a cross reality system including the HMD and the camera modules, control can be executed in real time such that the optical axes of the camera modules face in approximately the same directions as those of the lines of sight of the observer who uses the HMD. Furthermore, in the cross reality system, captured images of the camera modules are displayed on the display devices of the HMD in real time. This reduces the problem of eyestrain caused by the conventional HMD.

Note that the example of exchanging the line-of-sight information and the image sensing data between the HMD and the camera modules in real time using the camera modules in addition to the HMD has been explained. However, the camera modules may be eliminated. In this case, images to be displayed on the display devices of the HMD undergo CG processing in real time so that the focal planes 0109 and 0110 shown in FIG. 1 (or focal planes corresponding to the focal planes 0311 and 0312 shown in FIG. 3, and more preferably, focal planes corresponding to the focal planes 4609 and 4610 shown in FIG. 46 or the focal planes 4811 and 4812 shown in FIG. 48) are reproduced in front of the observer who uses the HMD, in accordance with the directions of the lines of sight of the observer. This can reduce the problem of eyestrain caused by the conventional HMD, similar to the case in which the camera modules are used.

Even if the camera modules are used, they may be located at a position far from the observer to some extent that the real time property can be held or may be incorporated in the same HMD. The camera modules may capture light of a wavelength that cannot be seen with the human eyes. Alternatively, a captured image of each camera module may undergo processing of superimposing characters or an image, and may then be displayed on the display device of the HMD.

The reason why the problem of eyestrain caused by the conventional HMD is reduced according to the first embodiment will be described below. The first factor of eyestrain caused by the conventional HMD is that the focal planes 4209 and 4210 or the focal planes 4411 and 4412 are not orthogonal to the lines of sight of the observer in the state shown in FIG. 42 or 44. This causes an imbalance in easiness of attaining focusing between the left and right sides of the line of sight, and the observer feels discomfort different from that in the case shown in FIG. 46 or 48 in which the observer actually performs observation on site. In this embodiment shown in FIG. 1 or 3, the focal planes 0109 and 0110 or the focal planes 0311 and 0312 are orthogonal to the lines of sight, similar to the case shown in FIG. 46 or 48, and thus such discomfort is eliminated. The same applies to the case in which the lines of sight face in directions other than those shown in FIGS. 1 and 3.

The third factor of eyestrain caused by the conventional HMD is that the directions of the lines of sight are not at the center of the visual field. The fact that the subject to be seen in the directions of the lines of sight is not at the center of the visual field in FIG. 42 or 44 is different from the case in which the subject to be seen is at the center of the visual field, as shown in FIG. 46 or 48 in which the observer actually performs observation on site, and the observer thus feels discomfort and eyestrain. In the case shown in FIG. 1 or 3 according to the first embodiment, the directions of the lines of sight are at the center of the visual field, and thus such discomfort is eliminated. The same applies to a case in which the lines of sight face in directions other than those shown in FIGS. 1 and 3.

The fourth factor of eyestrain caused by the conventional HMD is that with respect to an object which exists farther or closer than an object of interest in the directions of the lines of sight and has a parallax generated between positions seen with the left and right eyes, the degree of the parallax is different from that in a case in which the observer actually performs observation on site. For example, since the parallax 4325 between the distant trees 4307 and 4308 is small in FIG. 43, the frame 4321 includes both the trees. However, since the parallax 4725 between the distant trees 4707 and 4708 is large in FIG. 47 showing a case in which the observer actually performs observation on site, the frame 4721 includes only one tree. Referring to FIG. 2 according to the first embodiment, since a parallax 0225 between a distant tree 0207 and the distant tree 0208 is large, the frame 0221 includes only one tree, similar to FIG. 47.

The same applies to FIG. 45. Since the parallax 4525 between the nearby persons 4504 and 4505 is small, the frame 4521 includes both the persons. On the other hand, since the parallax 4925 between the nearby persons 4904 and 4905 is large in FIG. 49 showing a case in which the observer actually performs observation on site, the frame 4921 includes only one person. Referring to FIG. 4 according to the first embodiment, since a parallax 0425 between the nearby person 0405 and a nearby person 0404 is large, the frame 0421 includes only one person, similar to FIG. 49.

Therefore, the distance feeling of the observer between the person and the tree in the first embodiment is close to that when the observer actually performs observation on site. This reduces discomfort and eyestrain caused by the conventional HMD.

The first embodiment will additionally be described. Referring to FIG. 1, the distance between the left eye 0101 and the display device 0113 is equal to the distance between the right eye 0102 and the display device 0114. The distance 0126 between the display device 0113 and the lens 0115 is decided so that the focal point of the left eye 0101 is adjusted to the surface of the display device 0113, and the distance 0127 between the display device 0114 and the lens 0116 is decided so that the focal point of the right eye 0102 is adjusted to the surface of the display device 0114. Such focal point adjustment method is easily implemented but the positional relationship is not limited to this. That is, the distance between the eye and the lens may be constant and the focal point may be set by adjusting the distance between the eye and the display device, or both the distance between the eye and the lens and the distance between the eye and the display device may be adjusted. Referring to FIG. 1, one left-eye lens and one right-eye lens are provided. However, a plurality of left-eye lenses and a plurality of right-eye lenses may be provided to correct optical aberrations or a transmissive plate member that transmits only a constant waveform may be provided.

Figure 9:
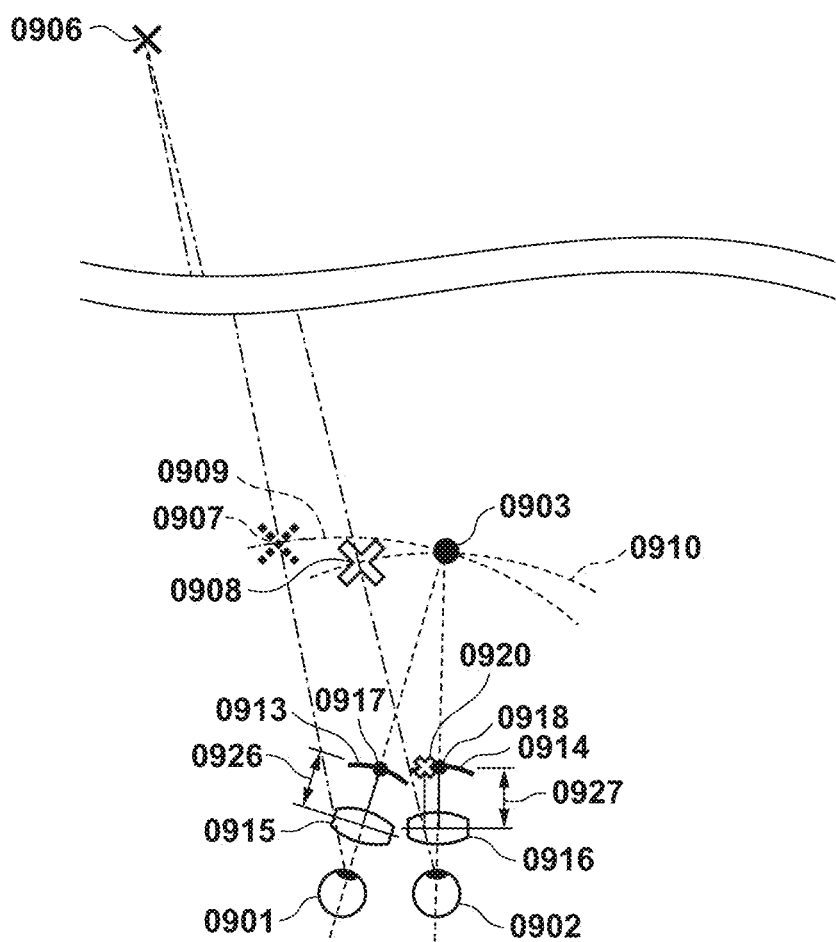
FIG. 9 is a view for explaining the second embodiment.

FIG. 9 shows one state of a head mounted display (to be referred to as an HMD hereinafter) according to the second embodiment. The second embodiment is different from the first embodiment in that each of a left-eye display device 0913 and a right-eye display device 0914 has not a flat surface but a curved surface. By using the curved surface display devices as in the second embodiment, it is possible to reduce the size of the HMD. The distance between the display device 0913 and a left eye 0901 in FIG. 9 is shorter than the distance between the display device 0113 and the left eye 0101 in FIG. 1. Similarly, the distance between the display device 0914 and a right eye 0902 is shorter than the distance between the display device 0114 and the right eye 0102.

Figure 17:
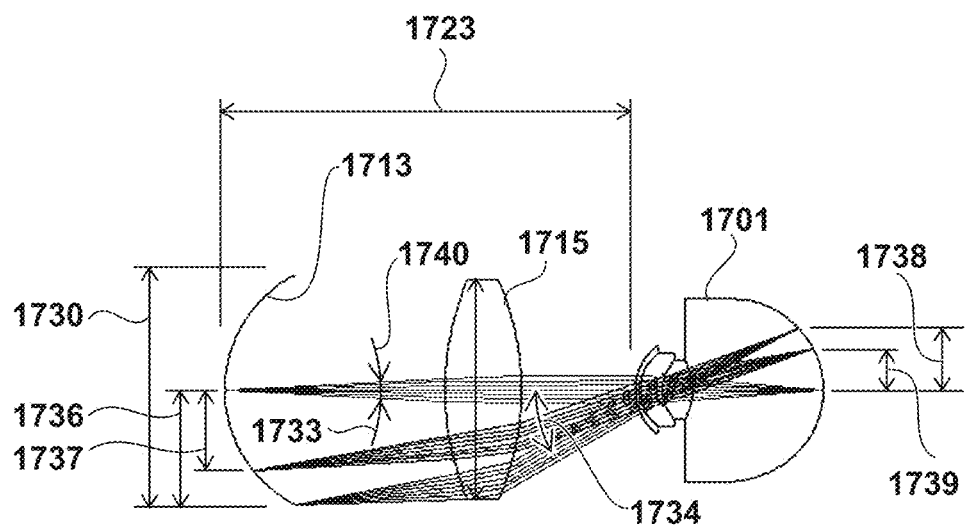
FIG. 17 is a view for explaining the second embodiment.
Figure 18:
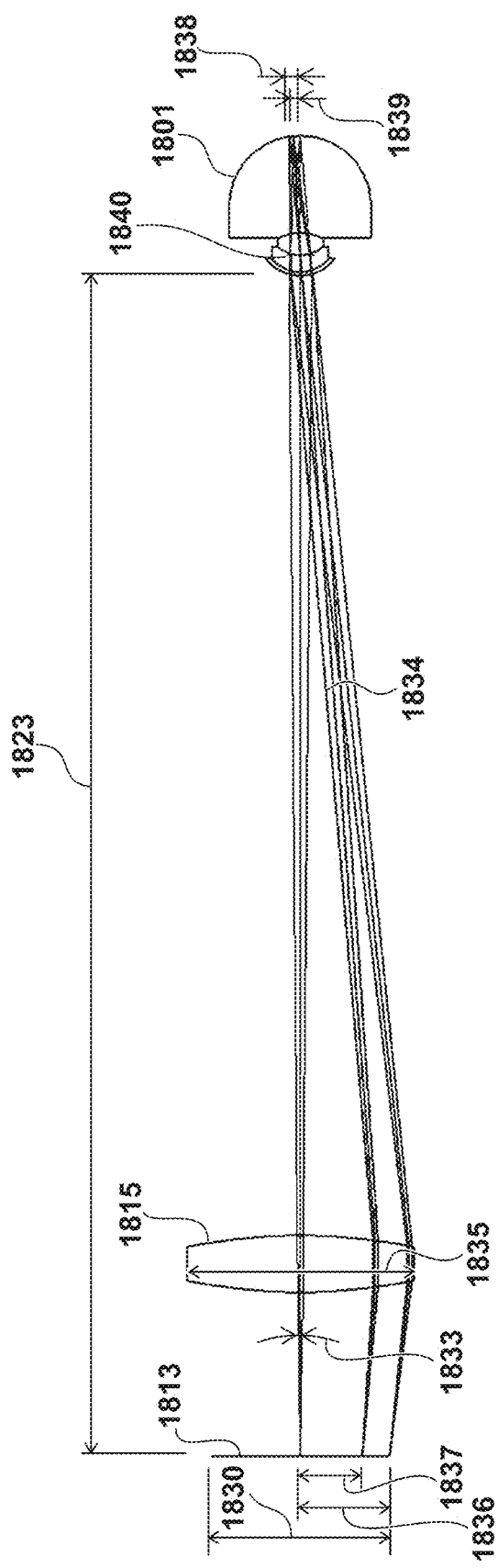
FIG. 18 is a view for explaining the first embodiment.

FIGS. 17 and 18 are views for comparing a case of a flat surface display device with a case of a curved surface display device. Referring to FIG. 17, the display surface of a display device 1713 is a curved surface, and this curved surface is a hemispherical surface or part of a spherical surface. The shape and position of a lens (optical system) 1715 are designed so that an image of light emitted from the display device 1713 is formed on the retina of an eye 1701. A state in which light exiting from the center of the display device 1713 and entering at an angle 1733 enters the eye 1701 without being blocked by a pupil 1740 and an image of the light is formed on the fovea on the retina is shown as a result of light tracking calculation. Similarly, parts of light beams exiting from positions distances 1737 and 1736 away from the center of the display device also enter the eye 1701 without being blocked by the pupil 1740, and images of the light beams are formed at positions distances 1739 and 1738 away from the fovea on the retina, respectively.

On the other hand, referring to FIG. 18, a display device 1813 is a plate. The shape and position of a lens 1815 are designed so that an image of light emitted from the display device 1813 is formed on the retina of an eye 1801. A state in which light exiting from the center of the display device 1813 and entering at an angle 1833 enters the eye 1801 without being blocked by a pupil 1840 and an image of the light is formed on the fovea on the retina is shown as a result of light tracking calculation. Similarly, parts of light beams exiting from positions distances 1837 and 1836 away from the center of the display device also enter the eye 1801 without being blocked by the pupil 1840, and images of the light beams are formed at positions distances 1839 and 1838 away from the fovea on the retina, respectively.

A plane size 1730 of the display device 1713 in FIG. 17 is equal to a plane size 1830 of the display device 1813 in FIG. 18. However, an HMD size 1723 in FIG. 17 is smaller than an HMD size 1823 in FIG. 18. Furthermore, the diameter of the lens 1715 is smaller than that of the lens 1815. As described above, FIG. 17 in which the curved surface display device is used is more advantageous in reducing the size of the HMD.

Since the angle 1733 is larger than the angle 1833, even if the display devices 1713 and 1813 have the same brightness, the HMD shown in FIG. 17 allows the observer to observe a brighter image. In addition, since an angle 1734 is larger than an angle 1834, the HMD shown in FIG. 17 can provide a wider visual field. As described above, FIG. 17 in which the curved surface display device is used is more advantageous in increasing the brightness of the HMD and providing a wide visual field.

Each of FIGS. 17 and 18 shows an example of a simple optical system formed by one lens. However, even if a lens system obtained by combining a plurality of lenses for the purpose of reducing the optical aberrations such as chromatic aberrations is used, the same effect is obtained.

Figure 19:
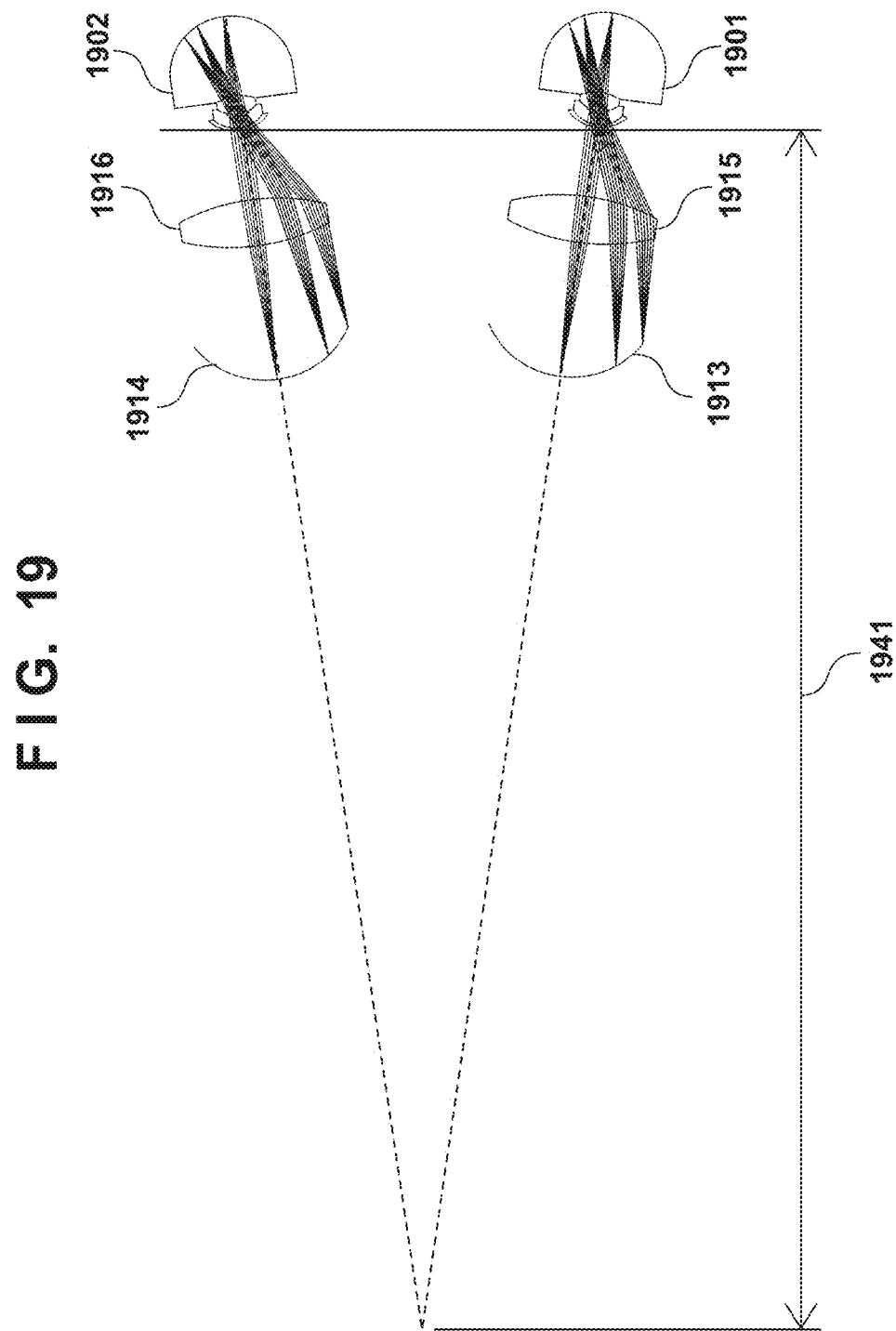
FIG. 19 is a view for explaining the second embodiment.
Figure 20:
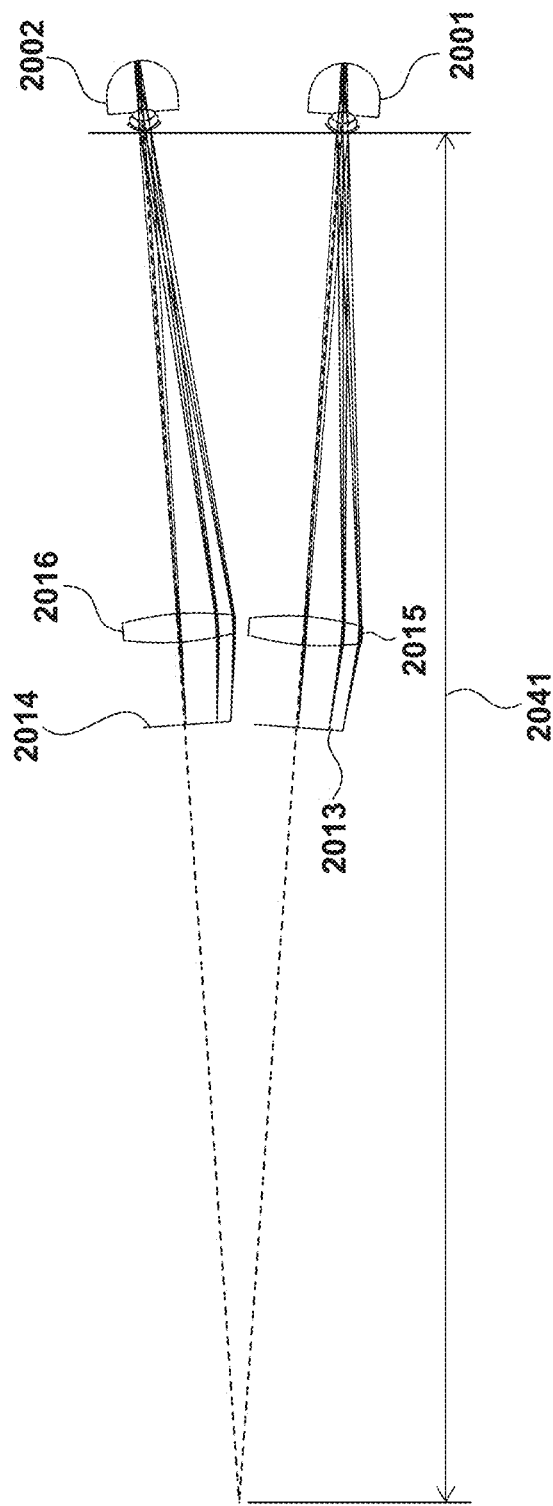
FIG. 20 is a view for explaining the first embodiment.

When the observer who uses the HMD observes a nearby object, the curved surface display devices are used more advantageously, as shown in FIG. 19 or 20. Consider a case in which the observer observes an object existing at a distance 1941, as shown in FIG. 19. In this case, if the observer observes the object using an HMD including a curved surface display device for a left eye 1901, a lens 1915, a curved surface display device for a right eye 1902, and a lens 1916, display devices 1913 and 1914 do not collide with each other. Therefore, the observer can observe the object. However, as shown in FIG. 20, if the observer attempts to observe the object using an HMD including a flat surface display device 2013 for a left eye 2001, a lens 2015, a flat surface display device 2014 for a right eye 2002, and a lens 2016, the display devices 2013 and 2014 collide with each other. Therefore, the observer can observe only an object at a distance 2041 longer than the distance 1941.

The display device and the lens can be adjusted with respect to six axes in FIG. 9, similar to the first embodiment. Furthermore, similar to the first embodiment, a line-of-sight detector (not shown) that detects a line of sight may be provided, and a mechanism that adjusts the position of a display module in accordance with the detected direction of the line of sight of the observer can also be provided. In addition, similar to the first embodiment, a mechanism that adjusts the position of the display module so that the line of sight of the observer matches the optical axis of the lens can also be provided. Therefore, similar to the first embodiment, an angle θ formed by the line of sight and the display surface of the display device (an angle between the line of sight and the display surface) is an approximately right angle. The angle θ falls within the range of ±60 arc minutes, and more preferably, ±6 arc minutes.

As described above, even the second embodiment has effects of solving or reducing the conventional problem, similar to the first embodiment. That is, the first effect is an effect of eliminating eyestrain caused by the influence of optical aberrations since the line of sight of the observer is not orthogonal to the display device in the conventional HMD. The second effect is an effect of eliminating eyestrain caused by the fact that an image to be seen by the observer is not kept at the center of the visual field in the conventional HMD.

Figure 13:
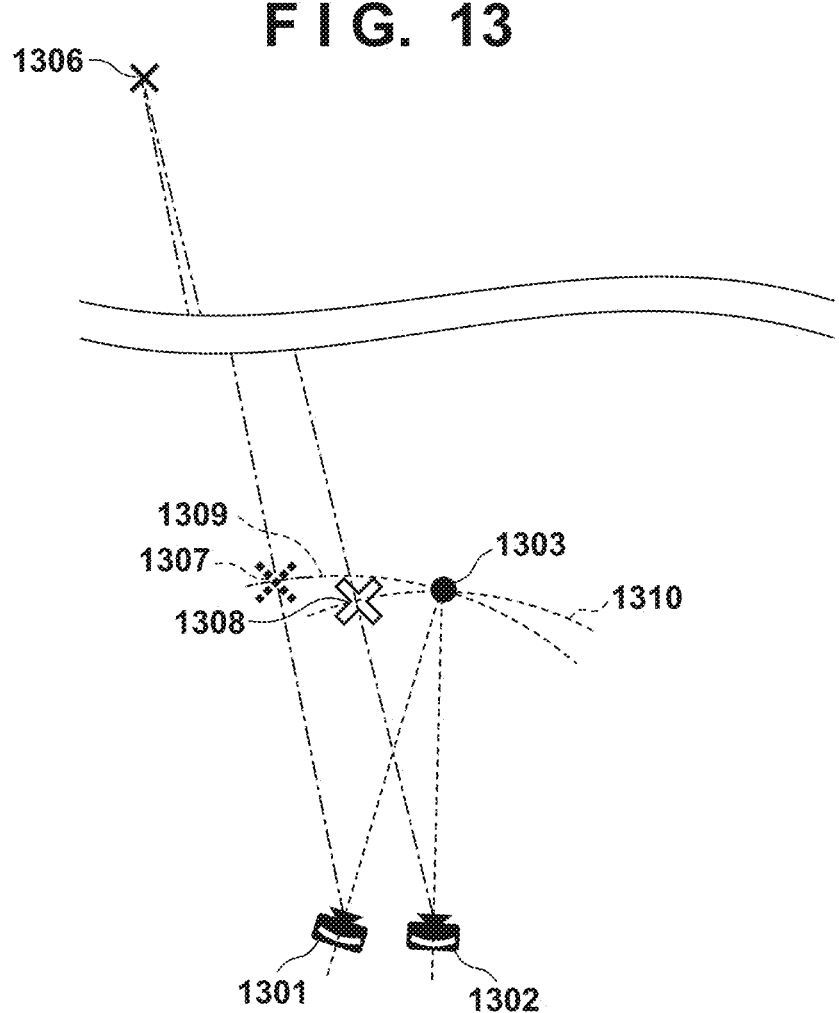
FIG. 13 is a view for explaining the second embodiment.
Figure 21:
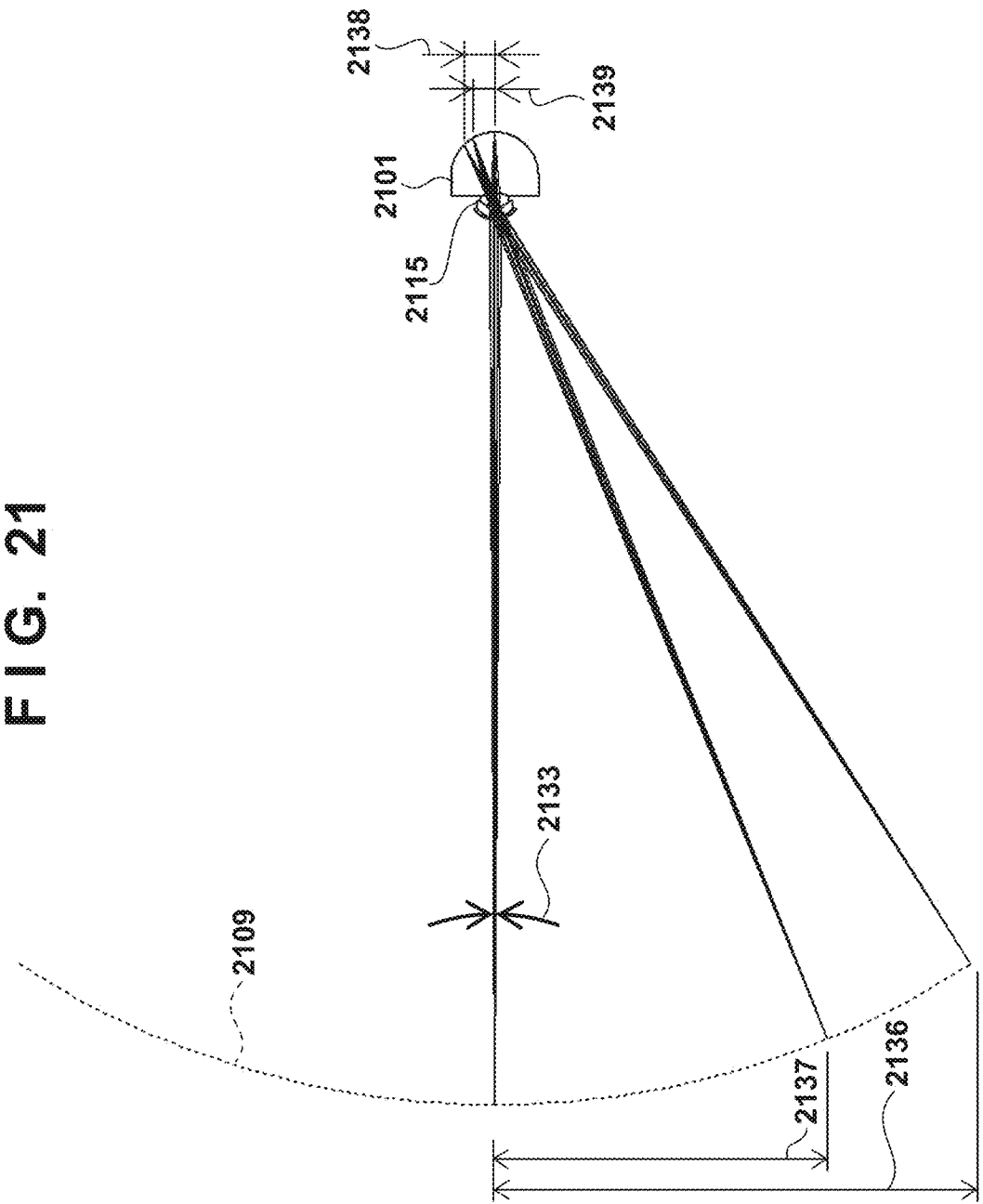
FIG. 21 is a view for explaining the second embodiment.

FIG. 13 corresponds to FIG. 5 described in the first embodiment. The difference between FIGS. 13 and 5 is that each of camera modules 1301 and 1302 incorporates a curved surface image sensor represented by a white line. FIG. 21 shows a state in which a camera module 2101 incorporating a curved surface image sensor is used to capture an object on a focal plane 2109 at a distance of 250 mm ahead. The image sensing surface of the image sensor incorporated in the camera module 2101 is a curved surface, and this curved surface is a hemispherical surface or part of a spherical surface. The shape and position of a lens 2115 are designed so that an image of light exiting from the focal plane 2109 is formed on the image sensing surface of the curved surface image sensor. Light exiting from the center of the focal plane 2109 and entering at an angle 2133 enters the camera module 2101 without being blocked by the aperture of the lens 2115. This forms an image at the center of the image sensing surface of the curved surface image sensor. Similarly, parts of light beams exiting from positions distances 2137 and 2136 away from the center of the focal plane 2109 also enter the camera module 2101 without being blocked by the aperture of the lens 2115, respectively. This forms images at positions distances 2139 and 2138 away from the center of the image sensing surface of the curved surface image sensor, respectively.

Then, image information received by the curved surface image sensor shown in FIG. 21 is transferred to the display device 1713 shown in FIG. 17 by a transfer apparatus (not shown), inverted in the vertical and horizontal directions, and displayed. The relationship among the display positions is as follows. Pixel information of the center point of the image sensor in FIG. 21 is displayed by the center pixel of the display device in FIG. 17. Information of a pixel arranged at the distance 2139 from the center point of the image sensor in FIG. 21 is displayed by a pixel arranged at the distance 1737 from the center pixel of the display device in FIG. 17. Similarly, information of a pixel arranged at the distance 2138 is displayed by a pixel arranged at the distance 1736.

As a result, an image formed on the retina of the eye 1701 of the observer who uses the HMD in FIG. 17 is the same as that when the observer performs observation on site. That is, if FIG. 21 is regarded as a view showing a state in which the observer observes an object 250 mm ahead on site, an image formed on the retina of the eye 2101 is the same as an image formed on the retina of the eye 1701 of the observer who uses the HMD shown in FIG. 17. Thus, the observer who uses the HMD shown in FIG. 17 feels as if he/she observed an object 250 mm ahead on site, as shown in FIG. 21.

The case in which the object 250 mm ahead is captured and the image is observed using the HMD has been explained. The same applies to a distance other than 250 mm. For example, even if the focal plane 2109 exists at infinity in FIG. 21, if the lens 2115 is shifted toward the image sensor, an image of light emitted from each point on the focal plane 2109 can be formed on the curved surface image sensor. In this state, if image information received by the curved surface image sensor is inverted and displayed on the curved surface display device 1713 shown in FIG. 17, and the lens 1715 is shifted toward the eye 1701 at the time of observation using the HMD, the observer feels as if he/she observed an infinite point on site.

FIG. 13 is a view showing a state in which an image to be displayed on the display device 0913 shown in FIG. 9 is captured using the left-eye camera module 1301, and an image to be displayed on the display device 0914 shown in FIG. 9 is captured using the right-eye camera module 1302. A mechanism (not shown) that receives the line-of-sight detection information of the left eye 0901 shown in FIG. 9 and controls the attitude of the left-eye camera module 1301 so that the optical axis of the camera module 1301 faces in the same direction as that of the line of sight of the left eye 0901 can be provided. Similarly, a mechanism (not shown) that controls the attitude of the right-eye camera module 1302 so that the optical axis of the right-eye camera module 1302 matches the line of sight of the right eye 0902 can be provided.

Broken lines 1309 and 1310 represent the focal planes of the camera modules 1301 and 1302 on the object side, respectively. Therefore, an image of an object on the broken line 1309 is formed on the image sensing surface of the image sensor represented by the white line through the lens of the camera module 1301. Similarly, an image of an object on the broken line 1310 is formed on the image sensing surface of the image sensor represented by the white line through the lens of the camera module 1302.

Referring to FIG. 13, a person exists at a black circle 1303 at the intersection point of the optical axis of the camera module 1301 and that of the camera module 1302. In addition, a tree exists at a black cross 1306 on the left far side. There is the intersection point of the broken line 1310 and a one-dot dashed line connecting the camera module 1302 and the black cross 1306. Therefore, the captured image of the camera module 1302 includes the tree. This is indicated by a gray cross 1308. If the tree actually exists at the position of the gray cross 1308, the tree image in the captured image of the camera module 1302 is an in-focus image. However, since the tree actually exists at the position of the black cross 1306, the tree image is an image that blurs in proportional to the distance between the black cross 1306 and the gray cross 1308. On the other hand, a one-dot dashed line connecting the camera module 1301 and the black cross 1306 has no intersection point with the broken line 1309, and has an intersection point with a one-dot dashed line as the extension of the broken line 1309. This is indicated by a dotted line gray cross 1307. Therefore, the captured image of the camera module 1301 includes no tree.

Figure 14:
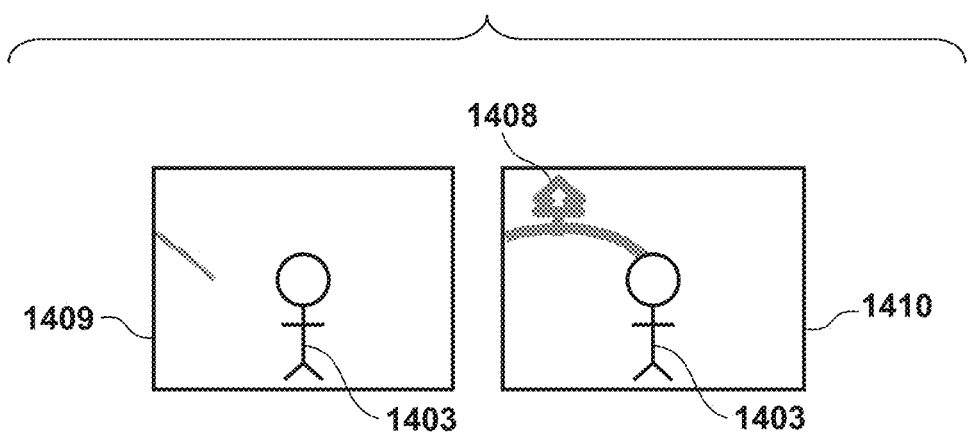
FIG. 14 is a view for explaining the second embodiment.

FIG. 14 is a view showing images captured by the camera modules shown in FIG. 13. A frame 1409 corresponds to the broken line 1309 in FIG. 13, and a frame 1410 corresponds to the broken line 1310 in FIG. 13. Since a person exists at the black circle 1303 on the optical axis of the camera module 1301 in FIG. 13, a person image 1403 is at the center of the frame 1409 in FIG. 14. Similarly, since there is also the black circle 1303 on the optical axis of the camera module 1302 and the person exists at this position, the person image 1403 is at the center of the frame 1410 in FIG. 14. Since there is a parallax of the camera modules 1301 and 1302 between the person images 1403, these images are at the centers of the frames, respectively, but are not the same. Although a tree image 1408 is included at the upper left end of the frame 1410, this image blurs due to the above-described reason. This is apparently indicated by a gray medium thick line. On the other hand, the frame 1409 includes no tree image due to the above-described reason.

Figure 10:
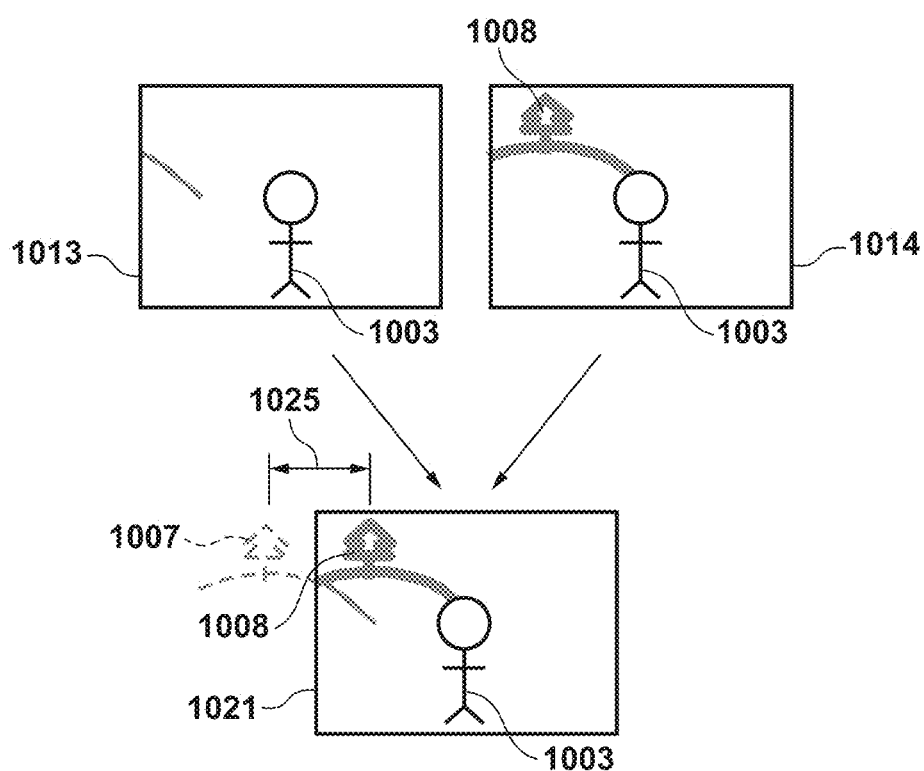
FIG. 10 is a view for explaining the second embodiment.

FIG. 10 is a view showing a state in which the captured images shown in FIG. 14 are displayed on the display devices shown in FIG. 9. The captured image of the frame 1409 in FIG. 14 is displayed on the display device 0913 shown in FIG. 9. The displayed image corresponds to a frame 1013 shown in FIG. 10. Similarly, the captured image of the frame 1410 in FIG. 14 is displayed on the display device 0914 shown in FIG. 9. The displayed image corresponds to a frame 1014 shown in FIG. 10. Since the observer sees the image of the frame 1013 with the left eye 0901 and sees the image of the frame 1014 with the right eye 0902, both the images are composited in the brain. This is represented by a frame 1021. One central person image 1003 is included but this is obtained when the person image 1003 of the frame 1013 and the person image 1003 of the frame 1014 including the parallax overlap each other, thereby perceiving the image stereoscopically. The spatial distance with respect to the person image 1003 is estimated in the brain based on the fact that a tree image 1008 is felt only by the right eye 0902 and the degree of blurring of the tree image.

Consider a case in which there are no display devices 0913 and 0914 and no lens 0915 and 0916, and the observer sees the person existing at a black circle 0903 in FIG. 9. In this case, the crystalline lens of the left eye 0901 and that of the right eye 0902 are each adjusted to a predetermined thickness to focus on the person at the black circle 0903. A person image 0917 on the actually existing display device 0913 can be formed on the retina of the left eye 0901 while keeping the predetermined thickness by adjusting a distance 0926 between the display device 0913 and the lens 0915. Similarly, a person image 0918 on the actually existing display device 0914 can be formed on the retina of the right eye 0902 while keeping the predetermined thickness by adjusting a distance 0927 between the display device 0914 and the lens 0916. When such adjustment is performed, the focal plane of the left eye 0901 felt by the observer is indicated by a broken line 0909 and the focal plane of the right eye 0902 is indicated by a broken line 0910, thereby reproducing the focal plane 1309 of the camera module 1301 and the focal plane 1310 of the camera module 1302 in FIG. 13.

Figure 11:
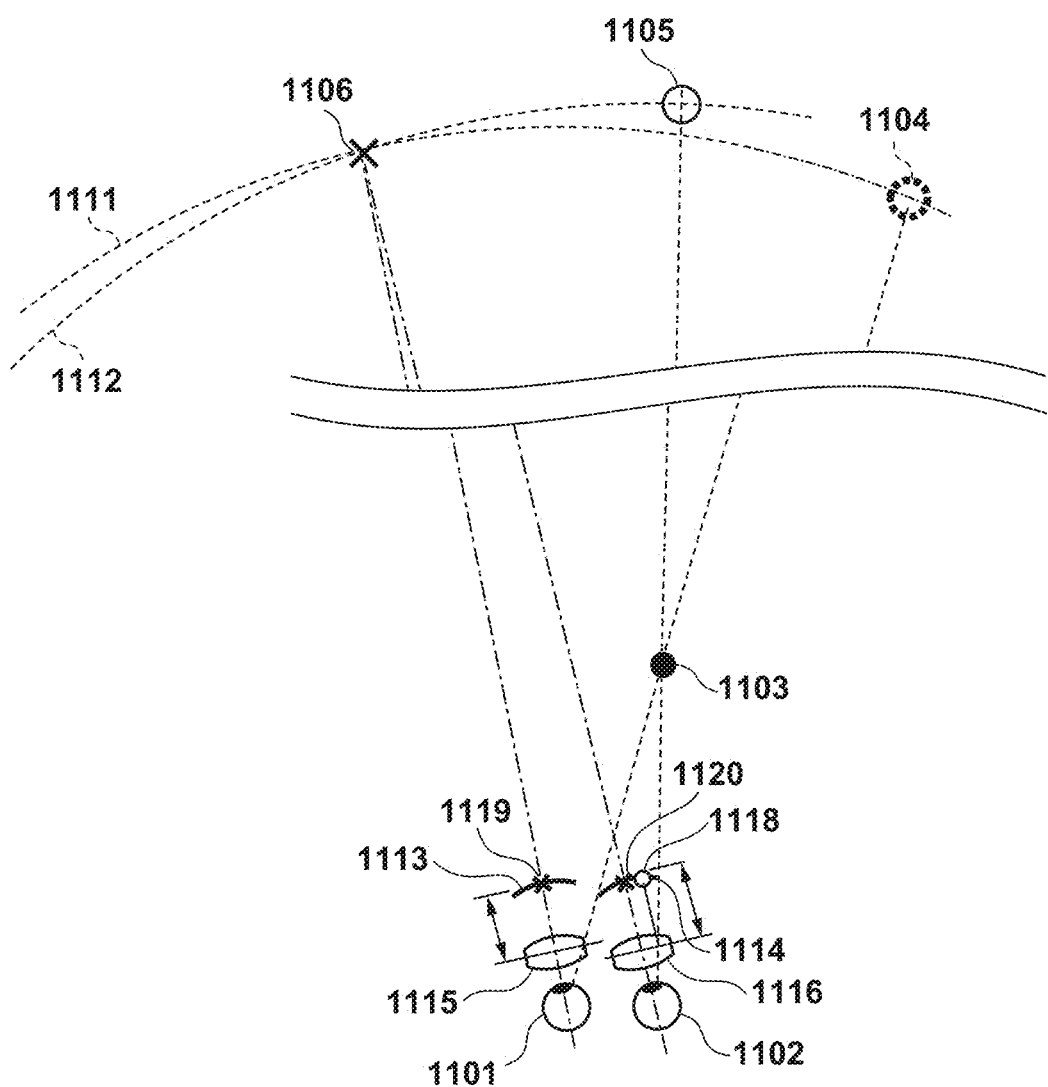
FIG. 11 is a view for explaining the second embodiment.
Figure 15:
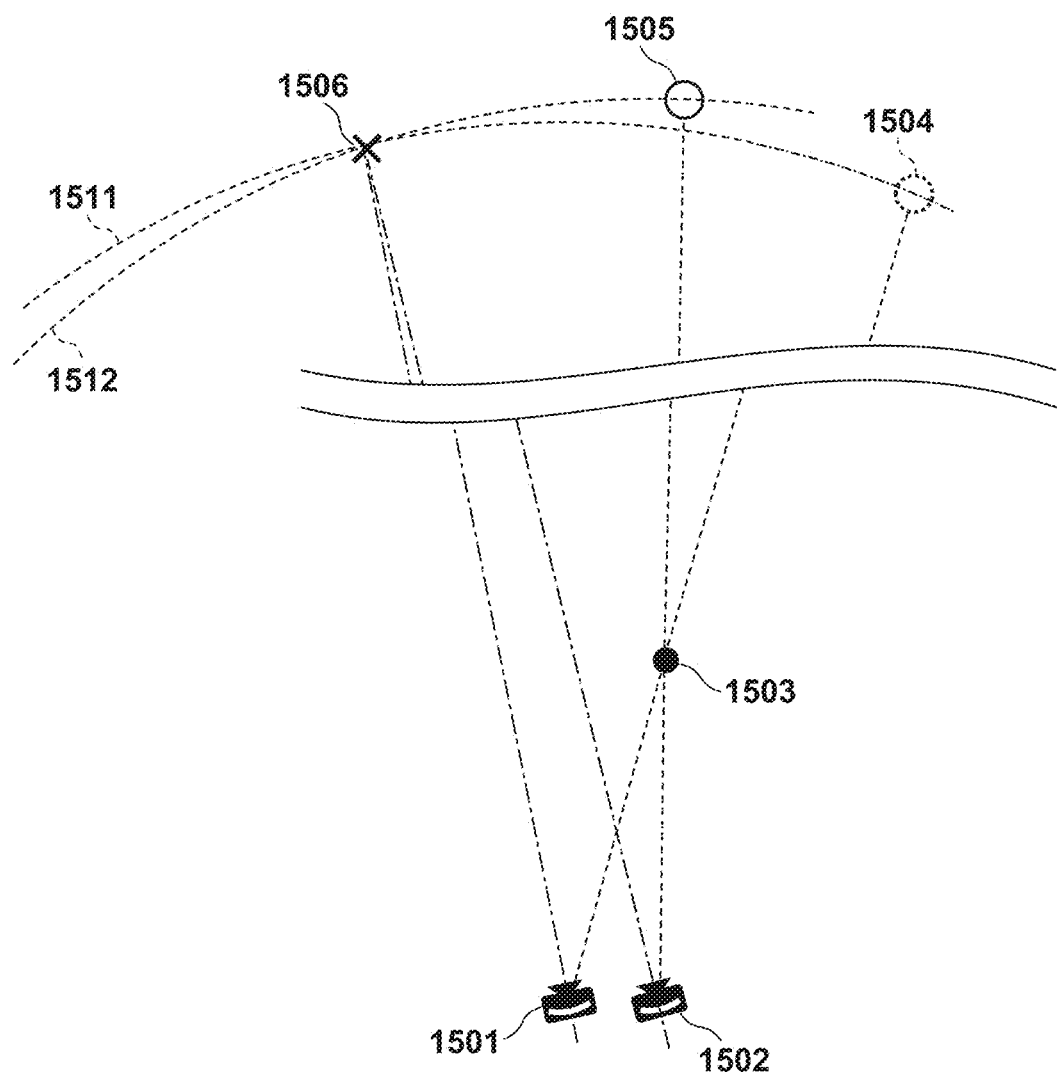
FIG. 15 is a view for explaining the second embodiment.

Next, if the awareness of the observer is moved from the person to a distant tree 1106, the line of sight of a left eye 1101 is moved to a one-dot dashed line connecting the left eye 1101 and the black cross 1106, as shown in FIG. 11. Similarly, the line of sight of a right eye 1102 is moved to a one-dot dashed line connecting the right eye 1102 and the black cross 1106. These changes of the lines of sight can be detected by the above-described line-of-sight detector (not shown), and transferred to a mechanism (not shown) that controls the attitudes of the camera modules 1301 and 1302. FIG. 15 is a view showing a state in which, as a result, the optical axis of the camera module 1301 matches the line of sight of the left eye 1101 in FIG. 11, and the optical axis of the camera module 1302 matches the line of sight of the right eye 1102 in FIG. 11.

Referring to FIG. 15, a tree exists at a black cross 1506 at the intersection point of the optical axis of a camera module 1501 and that of a camera module 1502. Furthermore, a person exists at a black circle 1503 on the right front side. There is an intersection point of a broken line 1512 and a broken line connecting the camera module 1502 and the black circle 1503. Therefore, a captured image of the camera module 1502 includes the person. This is indicated by a gray circle 1505. If the person actually exists at the position of the gray circle 1505, the person image in the captured image of the camera module 1502 is an in-focus image. However, since the person actually exists at the position of the black circle 1503, the person image is an image that blurs in proportional to the distance between the black circle 1503 and the gray circle 1505. On the other hand, a broken line connecting the camera module 1501 and the black circle 1503 has no intersection point with a broken line 1511, and has an intersection point with a one-dot dashed line as the extension of the broken line 1511. This is indicated by an open gray circle 1504. Therefore, the captured image of the camera module 1501 includes no person.

Figure 16:
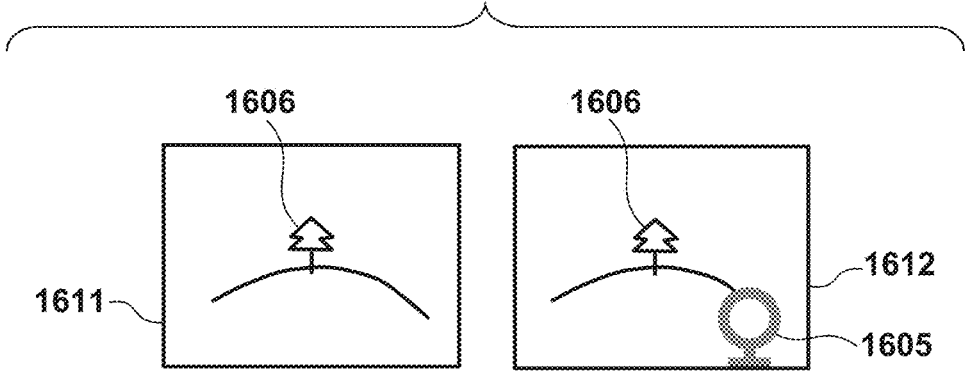
FIG. 16 is a view for explaining the second embodiment.

FIG. 16 is a view showing the images captured by the camera modules shown in FIG. 15. A frame 1611 corresponds to the broken line 1511 in FIG. 15, and a frame 1612 corresponds to the broken line 1512 in FIG. 15. Since a tree exists at the black cross 1506 on the optical axis of the camera module 1501 shown in FIG. 15, a tree image 1606 is at the center of the frame 1611 in FIG. 16. Similarly, since there is also the black cross 1506 on the optical axis of the camera module 1502 and the tree exists at this position, the tree image 1606 is at the center of the frame 1612 in FIG. 16. Since there is a parallax of the camera modules 1501 and 1502 between the tree images 1606, these images are at the centers of the frames, respectively, but are not the same. Although a person image 1605 is included at the lower right end of the frame 1612, this image blurs due to the above-described reason. This is apparently indicated by a gray extra thick line. On the other hand, the frame 1611 includes no person image due to the above-described reason.

Figure 12:
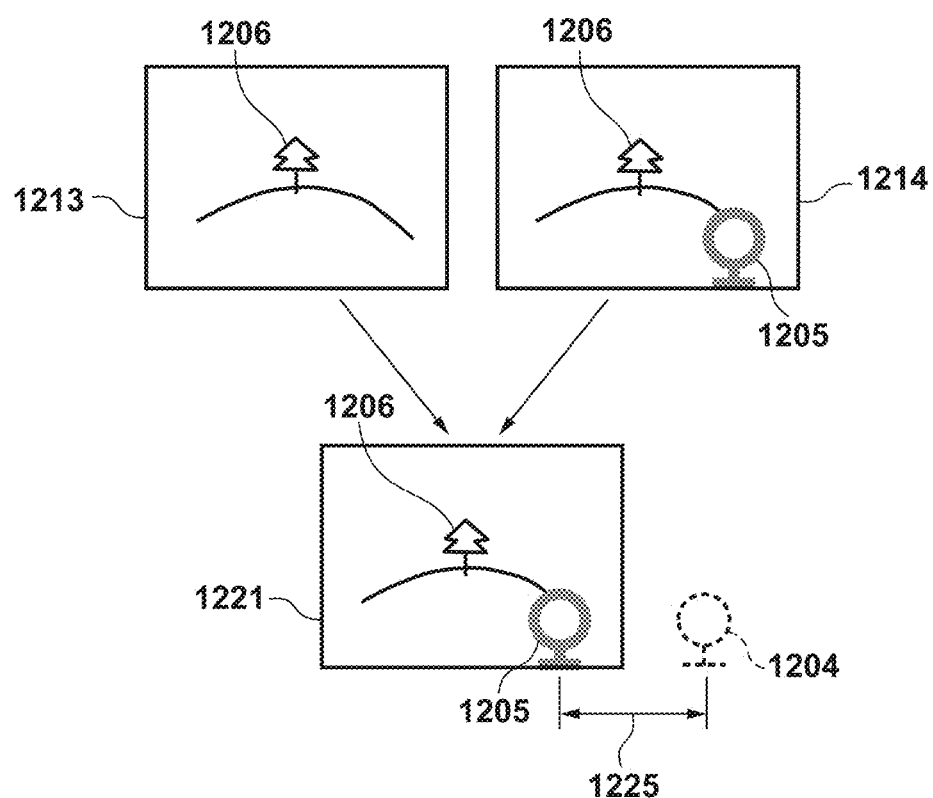
FIG. 12 is a view for explaining the second embodiment.

FIG. 12 is a view showing a state in which the captured images shown in FIG. 16 are displayed on the display devices shown in FIG. 11. The captured image of the frame 1611 in FIG. 16 is displayed on a display device 1113 shown in FIG. 11. The displayed image corresponds to a frame 1213 shown in FIG. 12. Similarly, the captured image of the frame 1612 in FIG. 16 is displayed on a display device 1114 shown in FIG. 11. The displayed image corresponds to a frame 1214 shown in FIG. 12. Since the observer sees the image of the frame 1213 with the left eye 1101 and sees the image of the frame 1214 with the right eye 1102, both the images are composited in the brain. This is represented by a frame 1221. One central tree image 1206 is included but this is obtained when the tree image 1206 of the frame 1213 and the tree image 1206 of the frame 1214 including the parallax overlap each other, thereby perceiving the image stereoscopically. The spatial distance with respect to the tree image 1206 is estimated in the brain based on the fact that a person image 1205 is felt only by the right eye 1102 and the degree of blurring of the person image.

Consider a case in which there are no display devices 1113 and 1114 and no lenses 1115 and 1116, and the observer sees the tree existing at the black cross 1106 in FIG. 11. In this case, the crystalline lens of the left eye 1101 and that of the right eye 1102 are each adjusted to a predetermined thickness to focus on the tree at the black cross 1106. A tree image 1119 on the actually existing display device 1113 can be formed on the retina of the left eye 1101 while keeping the predetermined thickness by adjusting a distance 1126 between the display device 1113 and the lens 1115. Similarly, a tree image 1120 on the actually existing display device 1114 can be formed on the retina of the right eye 1102 while keeping the predetermined thickness by adjusting a distance 1127 between the display device 1114 and the lens 1116. When such adjustment is performed, the focal plane of the left eye 1101 felt by the observer is indicated by a broken line 1111 and the focal plane of the right eye 1102 is indicated by a broken line 1112, thereby reproducing the focal plane 1311 of the camera module 1301 and the focal plane 1312 of the camera module 1302 in FIG. 13.

In a cross reality system including the HMD and the camera modules, control can be executed in real time such that the optical axes of the camera modules face in approximately the same directions as those of the lines of sight of the observer who uses the HMD. Furthermore, in the system, images captured by the camera modules are displayed on the display devices of the HMD in real time. This reduces the problem of eyestrain caused by the conventional HMD.

Note that the example of exchanging the line-of-sight information and the image sensing data between the HMD and the camera modules in real time using the camera modules in addition to the HMD has been explained. However, the camera modules may be eliminated. In this case, images to be displayed on the display devices of the HMD undergo CG processing in real time so that the focal planes 0909 and 0910 shown in FIG. 9 (or focal planes corresponding to the focal planes 1111 and 1112 shown in FIG. 11, and more preferably, focal planes corresponding to the focal planes 4609 and 4610 shown in FIG. 46 or the focal planes 4811 and 4812 shown in FIG. 48) are reproduced in front of the observer who uses the HMD, in accordance with the directions of the lines of sight of the observer. This can reduce the problem of eyestrain caused by the conventional HMD, similar to the case in which the camera modules are used.

Even if the camera modules are used, they may be located at a position far from the observer to some extent that the real time property can be held or may be incorporated in the same HMD. The camera modules may capture light of a wavelength that cannot been seen with the human eyes. Alternatively, a captured image of each camera module may undergo processing of superimposing characters or an image, and may then be displayed on the display device of the HMD.

The reason why the problem of eyestrain caused by the conventional HMD is reduced according to the second embodiment will be described below. The first factor of eyestrain caused by the conventional HMD is that the focal planes 4209 and 4210 or the focal planes 4411 and 4412 are not orthogonal to the lines of sight of the observer in the state shown in FIG. 42 or 44. This causes an imbalance in easiness of attaining focusing between the left and right sides of the line of sight, and the observer feels discomfort different from that in the case shown in FIG. 46 or 48 in which the observer actually performs observation on site. In this embodiment shown in FIG. 9 or 11, the focal planes 0909 and 0910 or the focal planes 1111 and 1112 are orthogonal to the lines of sight, similar to the case shown in FIG. 46 or 48, and thus such discomfort is eliminated. The same applies to the case in which the lines of sight face in directions other than those shown in FIGS. 9 and 11.

The third factor of eyestrain caused by the conventional HMD is that the directions of the lines of sight are not at the center of the visual field. The fact that a subject to be seen in the directions of the lines of sight is not at the center of the visual field in FIG. 42 or 44 is different from the case in which the subject to be seen is at the center of the visual field, as shown in FIG. 46 or 48 in which the observer actually performs observation on site, and the observer thus feels discomfort and eyestrain. In the case shown in FIG. 9 or 11 according to the second embodiment, the directions of the lines of sight are at the center of the visual field, and thus such discomfort is eliminated. This applies to a case in which the lines of sight face in directions other than those in FIGS. 9 and 11.

The fourth factor of eyestrain caused by the conventional HMD is that with respect to an object which exists farther or closer than an object of interest in the directions of the lines of sight and in which a parallax is generated between positions seen with the left and right eyes, the degree of the parallax is different from a case in which the observer actually performs observation on site. For example, since the parallax 4325 between the distant trees 4307 and 4308 is small in FIG. 43, the frame 4321 includes both the trees. However, since the parallax 4725 between the distant trees 4707 and 4708 is large in FIG. 47 showing a case in which the observer actually performs observation on site, the frame 4721 includes only one tree. Referring to FIG. 10 according to the second embodiment, since a parallax 1025 between a distant tree 1007 and the distant tree 1008 is large, the frame 1021 includes only one tree, similar to FIG. 47.

The same applies to FIG. 45. Since the parallax 4525 between the nearby persons 4504 and 4505 is small, the frame 4521 includes both the persons. On the other hand, since the parallax 4925 between the nearby persons 4904 and 4905 is large in FIG. 49 showing a case in which the observer actually performs observation on site, the frame 4921 includes only one person. Referring to FIG. 12 according to the second embodiment, since a parallax 1225 between the nearby persons 1205 and a nearby person 1204 is large, the frame 1221 includes only one person, similar to FIG. 49.

Therefore, the distance feeling of the observer between the person and the tree in the second embodiment is close to that when the observer actually performs observation on site. This reduces discomfort and eyestrain caused by the conventional HMD.

According to the second embodiment, the second factor of eyestrain caused by the conventional HMD is also solved. The second factor depends on the shape difference between the focal plane when the observer actually performs observation on site and the focal plane felt by the observer at the time of experiencing the HMD. However, in the second embodiment, the situation in FIG. 9 showing a case in which the observer performs observation using the HMD matches the situation in FIG. 46 showing a case in which the observer actually performs observation on site.

That is, the distance between a black cross 0906 at which a tree exists and a tree image 0908 on the focal plane 0910 in FIG. 9 is equal to the distance between the black cross 4606 at which the tree exists and the tree image 4608 on the focal plane 4610 in FIG. 46. Thus, if the depth of field of the right-eye camera 1302 is approximately equal to that of the eye 4602 of the observer, the degree of blurring of the tree image 0908 is equal to that of the tree image 4608. This is apparently indicated by the fact that the thicknesses of the line of the tree image 1008 in FIG. 10 is the same as that of the line of the tree image 4708 in FIG. 47.

The same applies when comparing the case of FIG. 11 with that of FIG. 48. That is, the distance between a black circle 1103 at which a person exists and a person image 1105 on the focal plane 1112 in FIG. 11 is equal to the distance between the black circle 4803 at which the person exists and the person image 4805 on the focal plane 4812 in FIG. 48. Therefore, if the depth of field of the right-eye camera 1502 is approximately equal to that of the eye 4802 of the observer, the degree of blurring of the person image 1105 is equal to that of the person image 4805. This is apparently indicated by the fact that the thickness of the line of the person image 1205 in FIG. 12 is the same as that of the line of the person image 4905 in FIG. 49.

As described above, since the second factor of eyestrain caused by the conventional HMD is also solved, the second embodiment is more preferable than the first embodiment.

Figure 22:
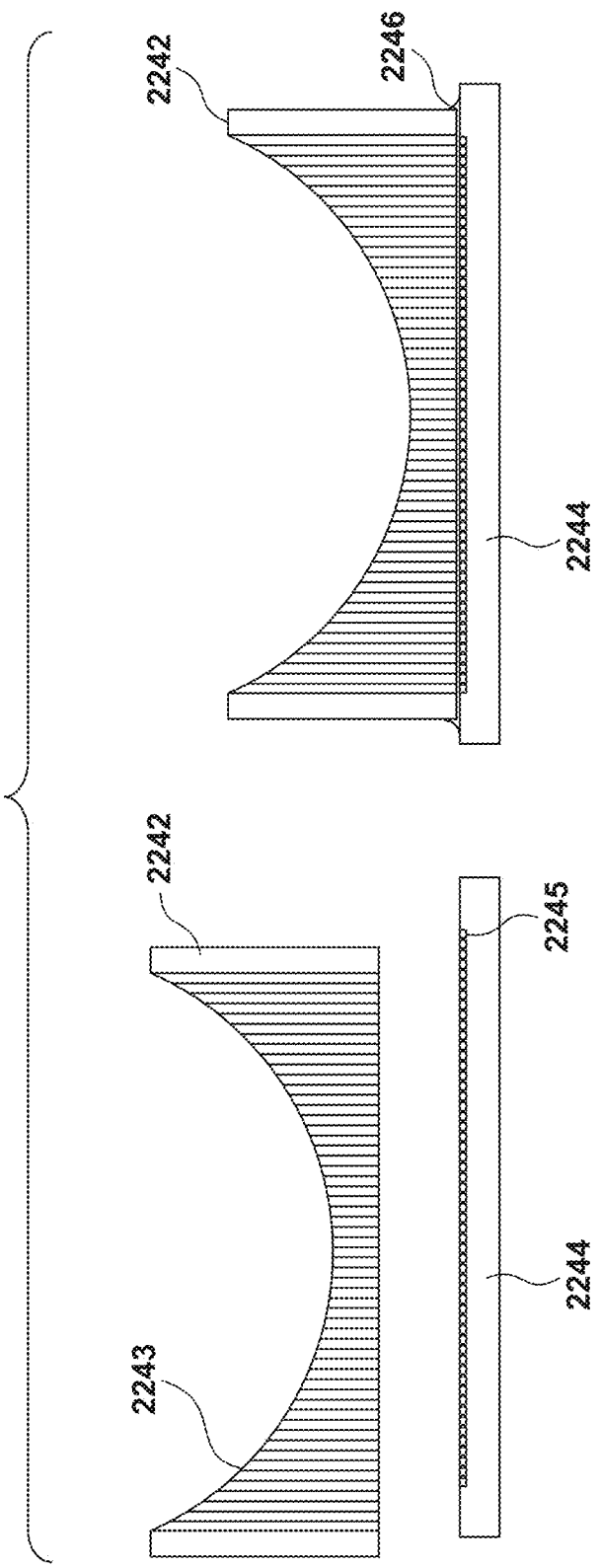
FIG. 22 is a view for explaining Example 1.

A detailed example of the second embodiment will be described as Example 1 below. FIG. 22 shows a method of manufacturing a curved surface display device and a curved surface image sensor according to Example 1. Pixels 2245 can be arranged, at a constant pitch, on the surface of a flat surface device 2244 as a flat surface display device or flat surface image sensor. In one example, the planar shape of the pixel is a hexagon, thereby obtaining a plane filling structure like a honeycomb. In one example, the pixel size is 3 μm. As the flat surface display device, for example, a liquid crystal display or an organic EL display can be used. As the flat surface image sensor, for example, a CMOS image sensor, a CCD sensor, or a SPAD sensor can be used.

A fiber optic plate (to be referred to as an FOP hereinafter), more specifically, an FOP 2242 having a flat surface and a spherical surface is prepared. Fibers 2243 forming the FOP can have, for example, a diameter of 3 μm. As shown in a right view of FIG. 22, the curved surface device as the curved surface display device or curved surface image sensor can be completed by pasting the FOP 2242 and the flat surface device 2244 by an adhesive 2246. To paste them, for example, a known high precision die bonder can be used, thereby matching the center of the pixel 2245 and the center of the fiber 2243. In one example, the pasting accuracy can be ±0.3 μm.

Figure 23:
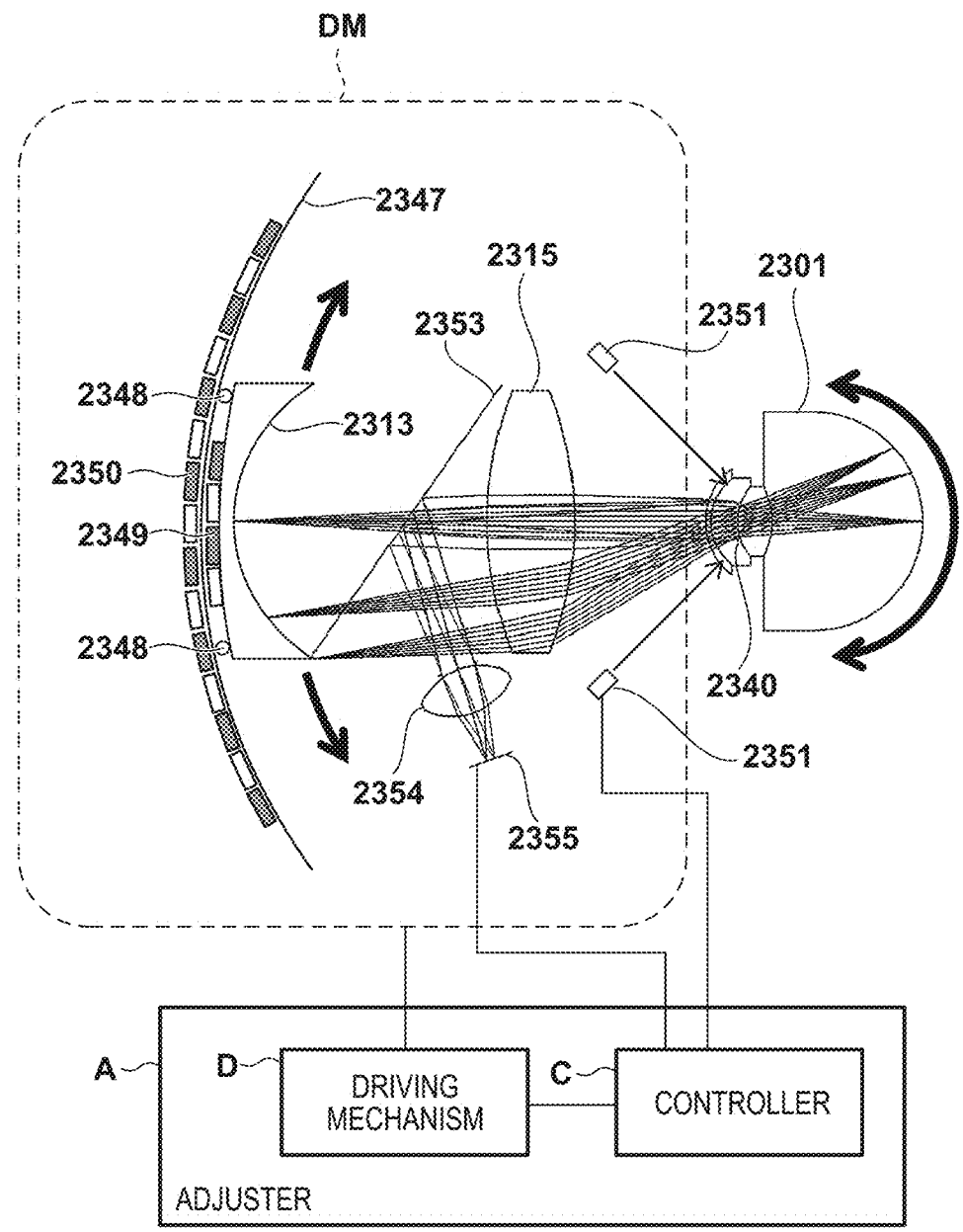
FIG. 23 is a view for explaining Example 1.

FIG. 23 is a view for explaining the line-of-sight detector that detects the line of sight of the observer and the driving mechanism that drives the optical axis of the display module in accordance with the detected line of sight in the HMD of this example. The HMD of this example includes a support 2347 having a support surface formed by part of the spherical surface, and the center of the spherical surface can be positioned to approximately match the rotation center of an eye 2301 (the rotation center of the movement of the line of sight) of the observer. The expression "approximately match" means a range of ±1 mm, and more preferably, a range of 0.1 mm with respect to the rotation center of the eye 2301.

A curved surface display device 2313 can have a display surface and a rear surface on the opposite side of the display surface, which have a spherical shape with a curvature slightly smaller than the curvature of the spherical surface of the support 2347. A Halbach array 2349 of permanent magnets can be fixed to the rear surface of the display device 2313. On the other hand, an electromagnet array 2350 can be provided on the support surface of the support 2347. The display device 2313 can always be attracted to the support 2347 by controlling the electromagnet array 2350 to always attract the Halbach array 2349. On the other hand, bearings 2348 can be provided to repel a force for attracting the display device 2313. The bearings 2348 allow the display device 2313 to move along the support surface of the support 2347. A magnetic field generated by the electromagnet array 2350 to move the display device 2313 is controlled. This drives the display device 2313 in the vertical and horizontal directions along the spherical surface of the support 2347.

The Halbach array 2349 and the electromagnet array 2350 may be exchanged. That is, the Halbach array 2349 is provided in the display device 2313 and the electromagnet array 2350 may be provided in the support 2347.

In the state in which the optical axis of the display device 2313 matches that of a lens (optical axis) 2315, the lens 2315 can be driven by a driving system (not shown) along the optical axis of the lens 2315. As the 5-axis adjustment accuracy for matching the optical axis of the display device 2313 with the optical axis of the lens 2315, for example, the translation distance can be set within a range of ±4 μm, and the angle can be set within a range of ±4 arc minutes.

An infrared mirror (half mirror) 2353 intersecting the optical axis at 45° can be provided between the display device 2313 and the lens 2315. The infrared mirror 2353 can be formed by providing an optical filter on the surface of a transmissive member so as to transmit visible light and reflect infrared light. Furthermore, an infrared LED (irradiator) 2351 that irradiates the pupil of the eye 2301 with infrared light can be provided. Of the infrared light emitted to the pupil by the infrared LED 2351, light reflected by the pupil in the direction of the lens 2315 can be condensed by the lens 2315 to some extent, and reflected by the infrared mirror 2353. The infrared light reflected by the infrared mirror 2353 can pass through an infrared lens 2354 to form a pupil image of the eye 2301 on the image sensing surface of an infrared image sensor 2355. The infrared image sensor 2355 can form the line-of-sight detector that detects the line of sight of the observer. The infrared lens 2354 can be driven by a driving system (not shown) along the optical axis of the infrared image sensor 2355. The driving system can be controlled such that a pupil image is always formed on the infrared image sensor 2355 even if the lens 2315 moves.

The Halbach array 2349, the bearings 2348, the display device 2313, the lens 2315, the infrared LED 2351, the infrared mirror 2353, the infrared lens 2354, the infrared image sensor 2355, and the like can form an integrated display module DM. The module DM can be driven by a driving mechanism D so as to rotate about approximately the same center point as the rotation center of the eye 2301. The rotation of the eye 2301, that is, the change of the line of sight appears as movement of a pupil image on the image sensing surface of the infrared image sensor 2355. Thus, a controller C can detect the movement of the line of sight of the observer by detecting the speed and direction of the movement of the pupil image on the image sensing surface of the infrared image sensor 2355 based on the output from the infrared image sensor 2355. The controller C can control the driving mechanism D such that the module DM tracks the movement of the line of sight of the observer. This can keep, at approximately 90°, the angle θ formed by the line of sight and the display surface of the display device 2313 at the intersection point of the line of sight of the observer and the display surface of the display device 2313. In other words, the controller C can control, based on the output from the infrared image sensor 2355 (line-of-sight detector), the driving mechanism D such that the angle formed by the line of sight of the observer and the display surface of the display device 2313 falls within a preset allowable range with respect to 90°. The allowable range can arbitrarily be decided in accordance with the required specification. The allowable range may be, for example, the range of ±60 arc minutes with respect to 90°, and is preferably the range of ±6 arc minutes with respect to 90°.

Figure 24:
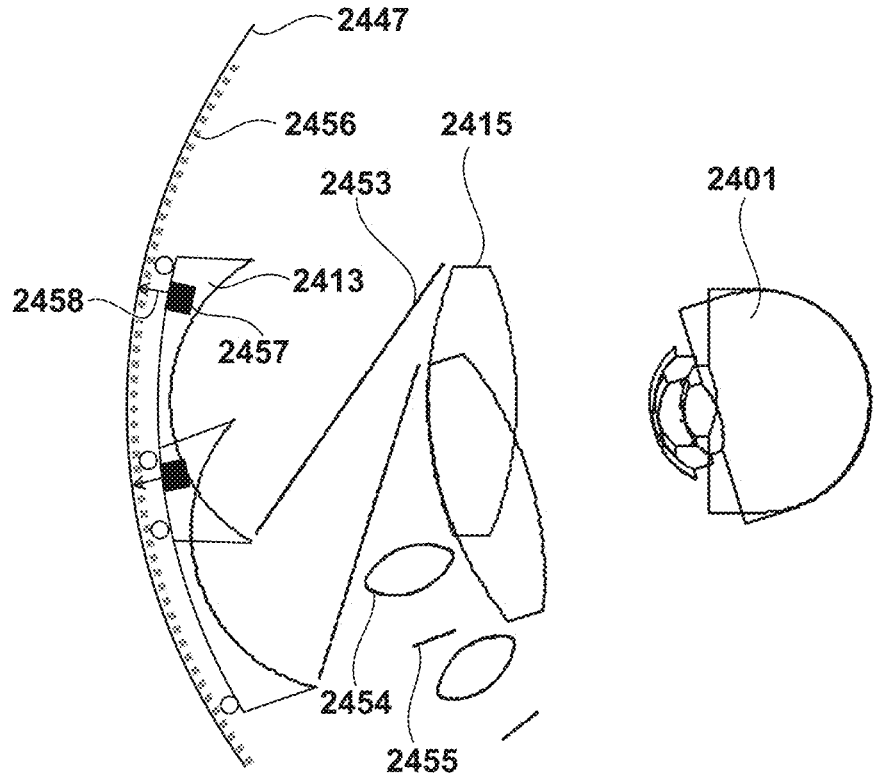
FIG. 24 is a view for explaining Example 1.

FIG. 24 is a view for explaining a mechanism for converting the direction of the line of sight of the observer into a numerical value and obtaining information for controlling the attitude of the camera module. A two-dimensional pattern 2456 having a contrast usable as a scale by a two-dimensional encoder can be provided on the spherical surface of a support 2447. An encoder sensor 2457 can include an infrared LED and an infrared sensor array (none are shown). The infrared LED of the encoder sensor 2457 emits infrared rays 2458 to the two-dimensional pattern 2456, and the infrared sensor array of the encoder sensor 2457 can detect reflected infrared light from the two-dimensional pattern 2456.

The module DM including the encoder sensor 2457, a display device 2413, a lens 2415, an infrared mirror 2453, an infrared lens 2454, and an infrared image sensor 2455 can rotate around approximately the same center point as the rotation center of an eye 2401, as shown in FIG. 24. The rotation center of the eye 2401 can be said as the rotation center of the movement of the line of sight. The controller C can detect the angle of the line of sight by counting the change of the reflected infrared light from the two-dimensional pattern 2456 by the encoder sensor 2457. The direction of the detected line of sight is fed back to control of the attitude of the camera module, thereby constructing the real time cross reality system. Next, the operation of the real time cross reality system will be described.

FIG. 25 shows a state in which the observer observes a view at infinity using the HMD according to this example. The line of sight of a left eye 2501 and that of a right eye 2502 are parallel to each other, and the optical axis of a display module formed from a display device 2513 and a lens 2515 matches the line of sight of the left eye 2501. Similarly, the optical axis of a display module formed from a display device 2514 and a lens 2516 also matches the line of sight.

FIG. 26 shows a state in which the awareness of the observer is moved to an object at a position of 7° to the right and 250 mm ahead. At this time, the line of sight of a left eye 2601 and that of a right eye 2602 each face inward by 8.6° from the parallel state shown in FIG. 25, resulting in crossed eyes. The change of the line of sight of the observer is detected using the above-described line-of-sight detector, and the above-described driving mechanism D is used to make the optical axis of a module including a display device 2613 and a lens 2615 match the line of sight of the left eye 2601. Similarly, the optical axis of a display module including a display device 2614 and a lens 2616 also matches the line of sight of the right eye 2602. At this time, a rotation angle of 7° of the head of the observer can be measured by a gyro sensor (not shown). The angle of the line of sight of the left eye 2601 and the angle of the line of sight of the right eye 2602 can be measured by a mechanism using the above-described encoder sensor.

Figure 27:
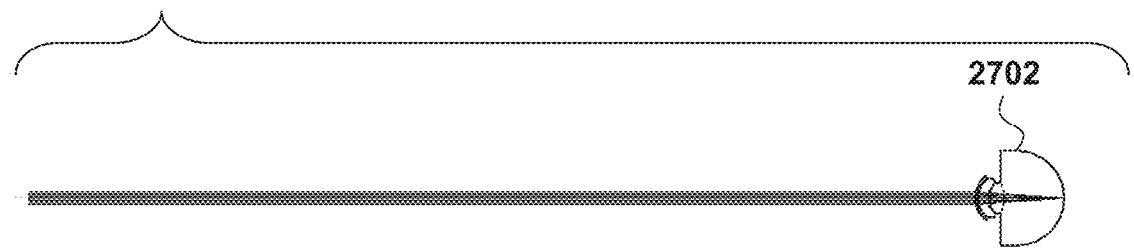
FIG. 27 is a view for explaining Example 1.

FIG. 27 shows a camera module system that captures images seen by the observer in FIG. 25 and to be displayed on the display devices 2513 and 2514. A captured image of a left-eye camera module 2701 is displayed on the display device 2513 shown in FIG. 25 and a captured image of a right-eye camera module 2702 is displayed on the display device 2514 shown in FIG. 25. At this time, the optical axis direction of the left-eye camera module 2701 matches the direction of the line of sight of the left eye 2501 shown in FIG. 25, and the optical axis direction of the right-eye camera module 2702 matches the direction of the line of sight of the right eye 2502 shown in FIG. 25. The direction of the head of the observer in FIG. 25 matches the direction of the overall camera module system in FIG. 27 in the horizontal left direction in FIGS. 25 and 27.

When the state of the observer shifts from FIG. 25 to FIG. 26, the above-described rotation angle of the head of the observer and the changes in angles of the lines of sight of the left and right eyes are transmitted to the camera module system in the state shown in FIG. 27 by a transmission apparatus (not shown), thereby controlling the directions of the camera modules. Therefore, the state of the camera module system shifts from the state shown in FIG. 27 to the state shown in FIG. 28. That is, the overall camera module system rotates rightward by 7°, and the optical axis direction of the left-eye camera module 2701 and that of the right-eye camera module 2702 each face inward by 8.6°. Thus, the direction of the line of sight of the left eye 2601 of the observer matches the optical axis direction of a left-eye camera module 2801, and the direction of the line of sight of the right eye 2602 matches the optical axis direction of a right-eye camera module 2802.

Figure 28:
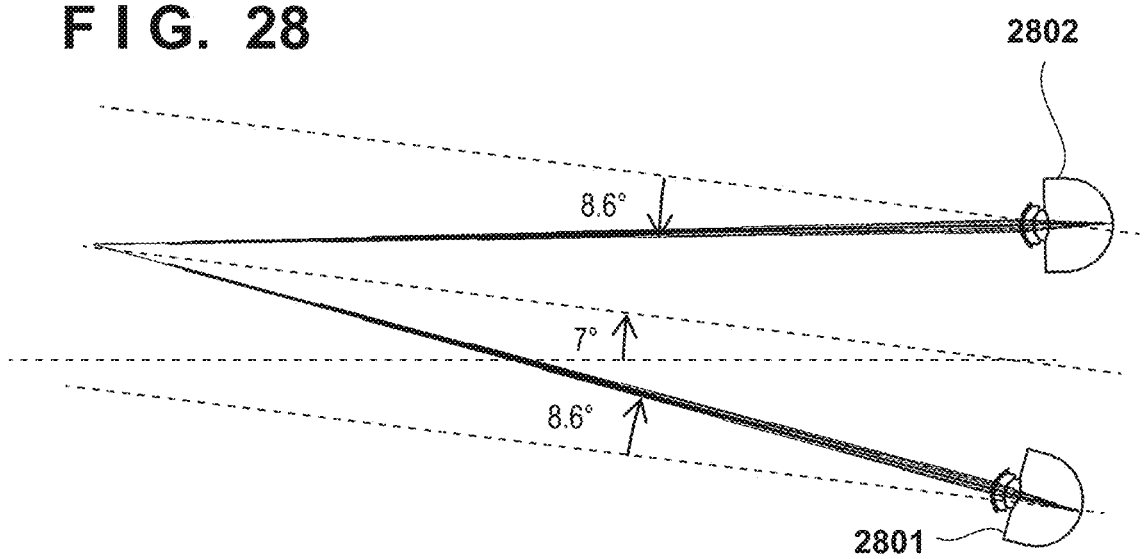
FIG. 28 is a view for explaining Example 1.
Figure 29:
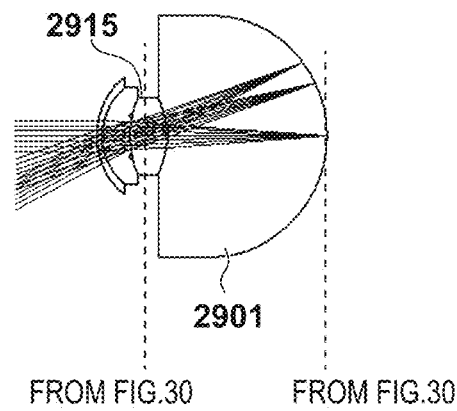
FIG. 29 is a view for explaining Example 1.
Figure 30:
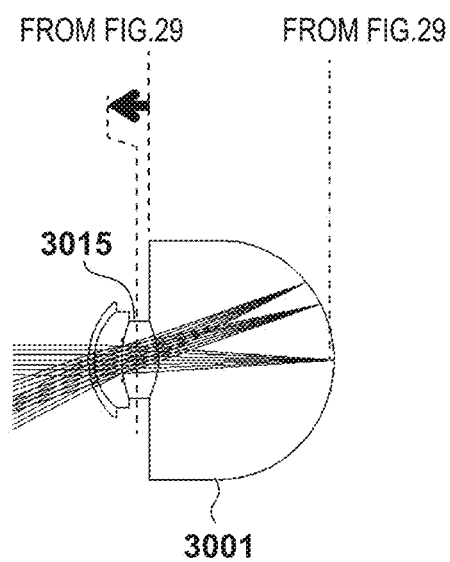
FIG. 30 is a view for explaining Example 1.

Next, control of the lens system of the real time cross reality system according to this example will be described. FIG. 29 is an enlarged view of the camera module in the state in which the focal plane is at infinity, as shown in FIG. 27. FIG. 29 shows, as a result of ray calculation, a state in which parallel rays coming from infinity are focused on the curved surface image sensor through a lens 2915. FIG. 30 is an enlarged view of the camera module in the state in which the focal plane is as close as 250 mm, as shown in FIG. 28. FIG. 30 shows, as a result of ray calculation, a state in which diffused light emitted from an arc-shaped focal plane (not shown) as far as 250 mm is focused on the curved surface image sensor through a lens 3015. The state shifts from the state shown in FIG. 29 to that shown in FIG. 30 by shifting, using a known auto focus mechanism, the lens 2915 from the position of the lens 2915 to that of the lens 3015. Alternatively, a distance L between the observation object and the observer may be calculated from an angle η formed by the lines of sight of the left and right eyes detected by the HMD, thereby deciding the shift amount of the lens 2915.

Figure 31:
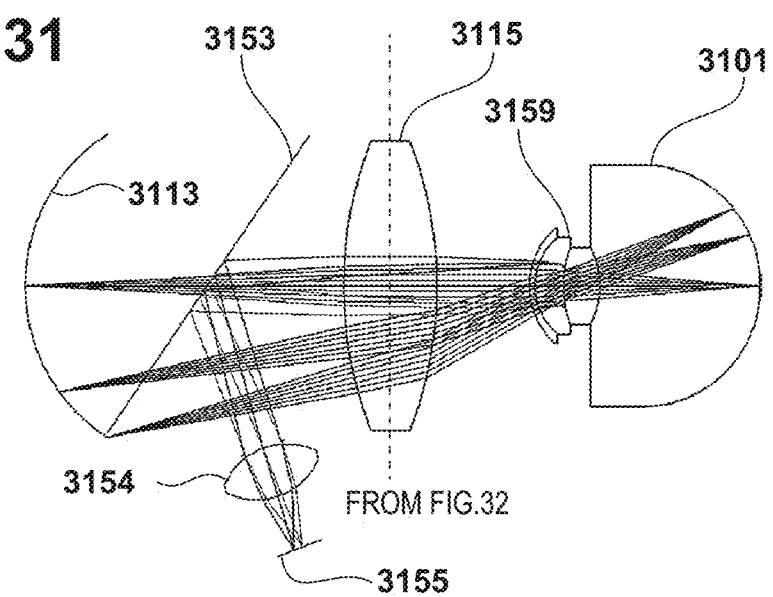
FIG. 31 is a view for explaining Example 1.

FIG. 31 is an enlarged view of the display module in the state in which the observer observes a view at infinity, as shown in FIG. 25. An image captured by a camera module 2901 shown in FIG. 29 is displayed on a display device 3113 in real time. FIG. 31 shows, as a result of ray calculation, a state in which diffused light emitted from the surface of the display device 3113 is focused on the retina of an eye 3101 through a lens 3115 and a crystalline lens 3159. At this time, the position of the lens 3115 is controlled so that the thickness of the crystalline lens 3159 is equal to the thickness when the observer actually observes the view at infinity. Furthermore, the position of an infrared lens 3154 is adjusted in accordance with the position of the lens 3115, and a pupil image of the eye 3101 is formed on an infrared image sensor 3155. That is, a controller (not shown) can adjust the lens 3115 based on the angle of convergence of the eye of the observer so that the thickness of the crystalline lens of the eye seeing the display surface of the display device 3213 is equal to the thickness of the crystalline lens of the eye when the observer sees the object existing at a convergence distance corresponding to the angle of convergence.

Figure 32:
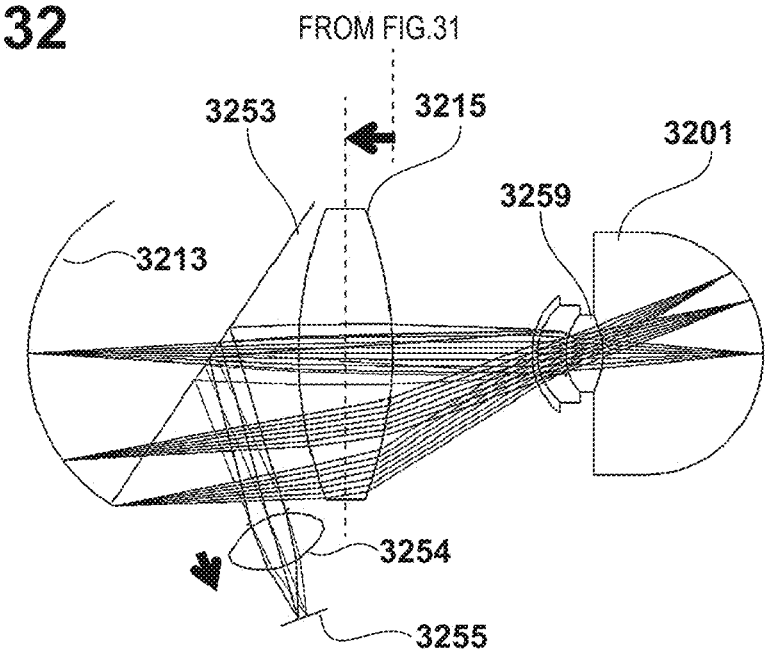
FIG. 32 is a view for explaining Example 1.

FIG. 32 is an enlarged view of the display module in the state in which the observer observes the object as close as 250 mm, as shown in FIG. 26. The shift amount of the lens 2915 when the camera module shifts from the state shown in FIG. 29 to that shown in FIG. 30 is transmitted to the system of the HMD shown in FIG. 31, and fed back to control of the position of the lens 3115 in real time. Alternatively, the distance L between the observation object and the observer may be calculated from the angle η formed by the lines of sight of the left and right eyes of the observer detected by the HMD, and then fed back to control of the position of the lens 3115. In accordance with the feedback, the position of the lens 3115 is shifted from the position of the lens 3115 to the position of a lens 3215 when shifting from the state shown in FIG. 31 to that shown in FIG. 32.

As a result, when diffused light emitted from the surface of the display device 3213 enters an eye 3201 through the lens 3215, control is executed to increase the thickness of the crystalline lens 3159 of the eye 3101 of the observer. This is done because an image of the diffused light is not formed on the retina otherwise. The thickness of a crystalline lens 3259 shown in FIG. 32 is necessary for the observer to see an object as close as 250 mm Conversely, the shift amount from the position of the lens 3115 to that of the lens 3215 is calculated and decided so that the thickness of the crystalline lens 3259 becomes the thickness shown in FIG. 32. The position of the infrared lens 3154 is also shifted to the position of an infrared lens 3254 in accordance with the shift of the lens 3115 so a pupil image on an infrared image sensor 3255 is not out of focus.

By executing the above-described control, the observer can observe display in a state in which he/she hardly feels eyestrain as in the case in which the observer actually performs observation on site.

Figure 33:
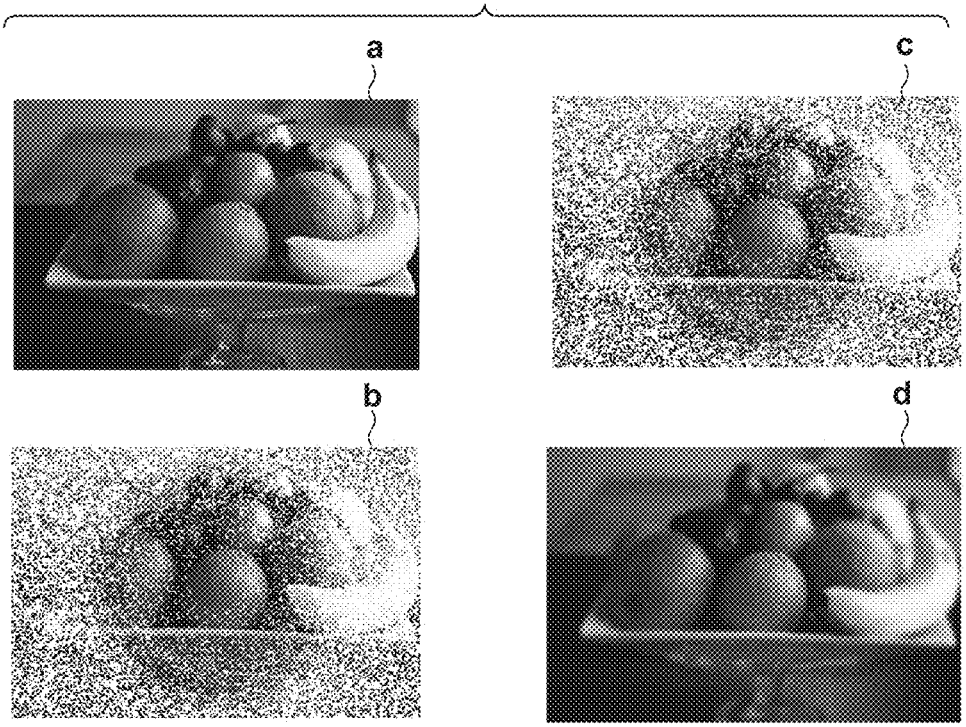
FIG. 33 is a view for explaining Example 1.

Image transfer from the camera module of FIG. 27 to the display device of FIG. 28 or from the camera module of FIG. 28 to the display device of FIG. 26 has no problem when the distance between the camera module and the observer is short. However, in the case of a remote site, it takes time to transfer the image, and thus the real time property may degrade. To cope with this, in this example, as shown in FIG. 33, reproduction processing may be performed by thinning and transfer of pixel information and rendering by AI. That is, in FIG. 33, a shows an image captured by the camera module, and b shows an image obtained by thinning information of surround pixels by an image signal processor near the camera module. In this state, if transfer is performed from the camera module to the display device, the information amount is small, and it is thus possible to reduce the transfer time. That is, it is possible to reduce the transfer time by transferring, from the camera module to the display device, an image in which the peripheral portion of the image obtained using the image sensor of the camera module is made coarser than the central portion of the image. Furthermore, since the more important portion observed at the fovea of the eye remains unchanged, it is possible to suppress the influence of the thinning. In FIG. 33, c shows image information received by an AI processor near the display device, and d shows an image obtained by interpolating, by the AI processor, pixel information thinned by the AI processing and displayed on the display device. To implement the cross reality system for experiencing an image at a remote site, it is more preferable to construct a system that performs such processing.

Figure 34:
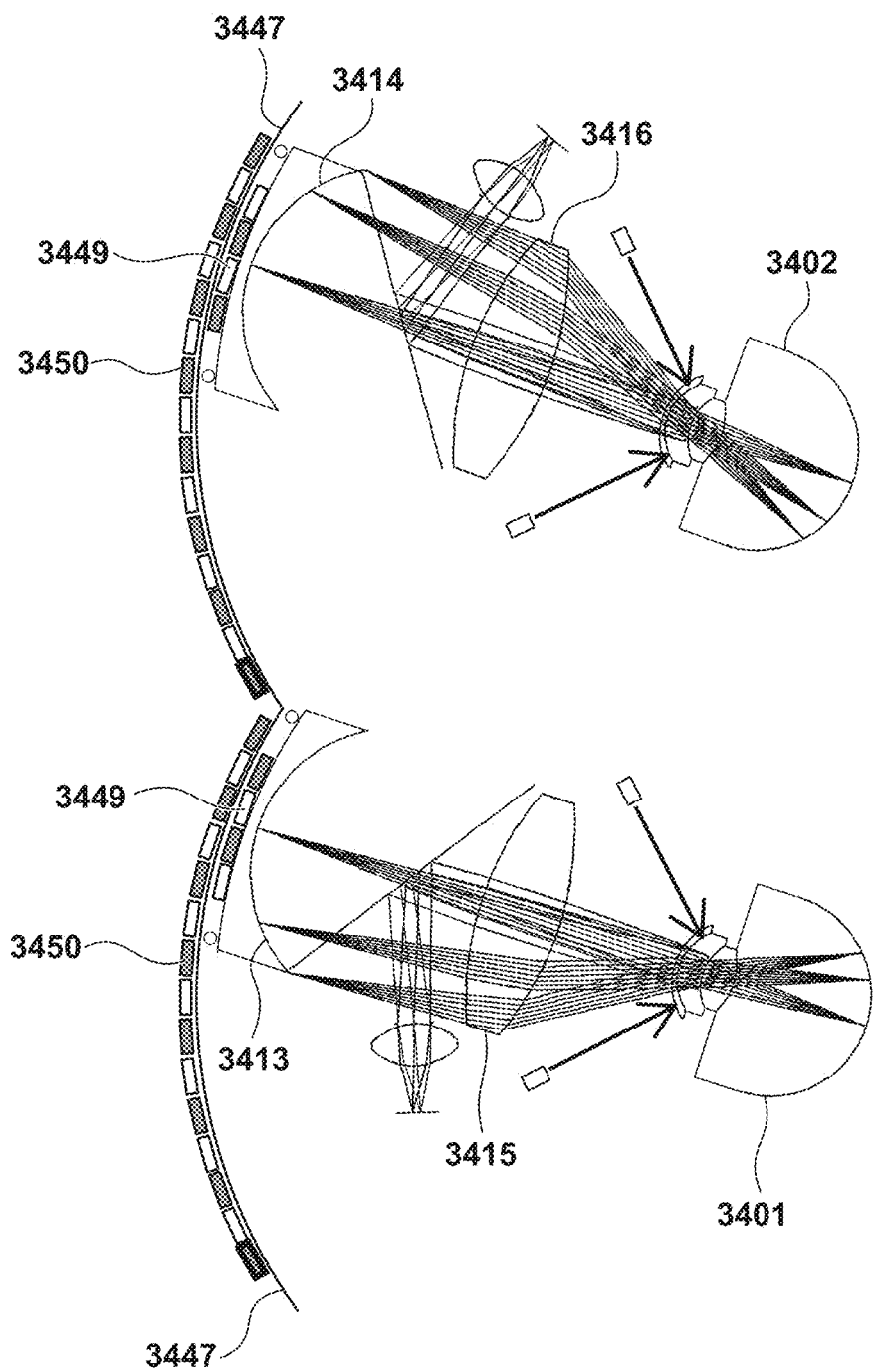
FIG. 34 is a view for explaining Example 1.

Example 2 will be described below. In Example 2, the difference from Example 1 will be described with reference to FIGS. 34 and 35. FIG. 34 is a view showing the HMD according to Example 1. Halbach arrays 3449 exist in the directions of the lines of sight of a left eye 3401 and a right eye 3402, respectively, and are configured not to project from supports 3447, respectively. Therefore, in Example 1, the rotation angle of each of the left eye 3401 and the right eye 3402 is limited to ±18°.

Figure 35:
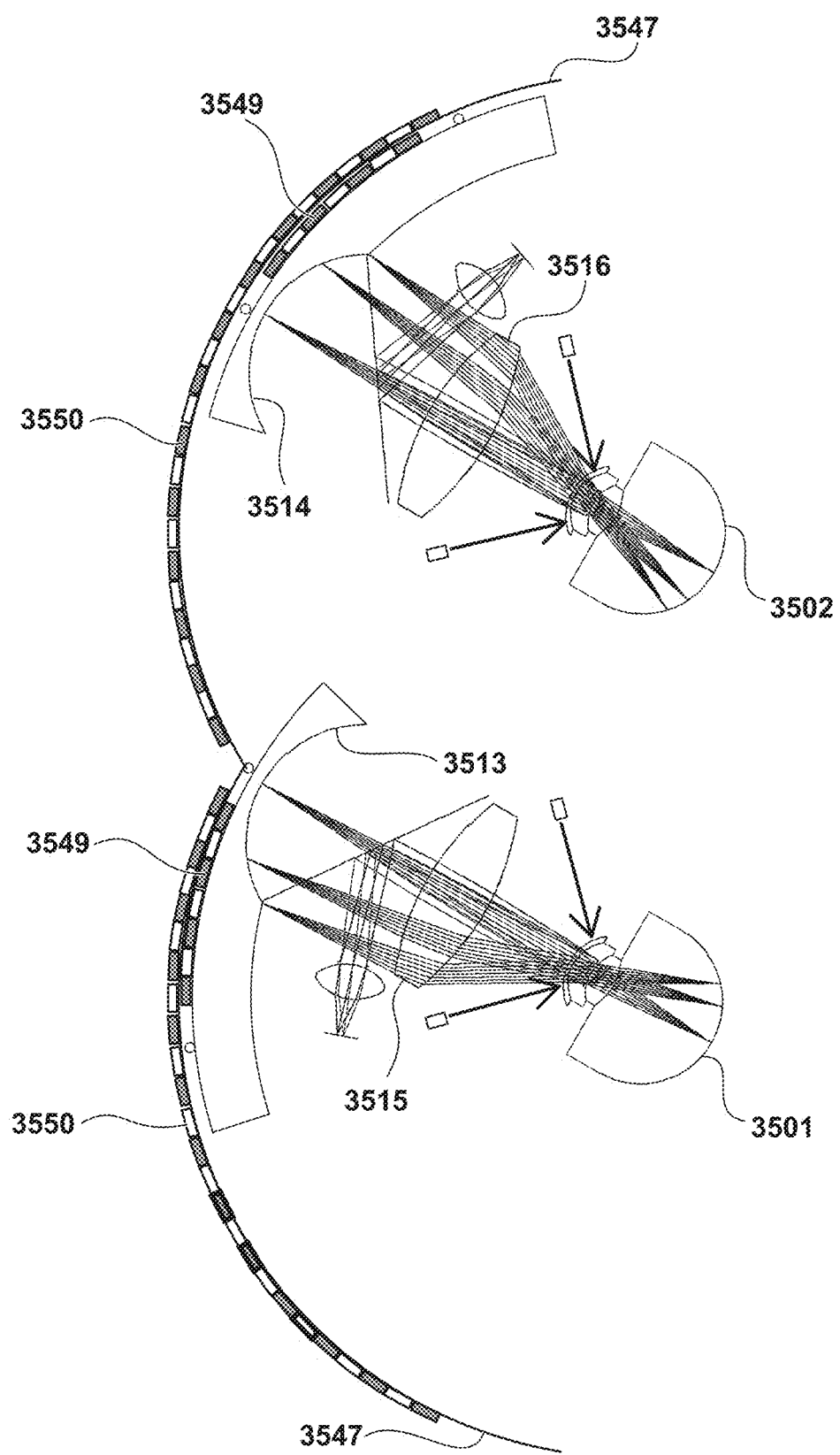
FIG. 35 is a view for explaining Example 2.

On the other hand, FIG. 35 is a view showing an HMD according to Example 2. There are no Halbach arrays 3549 in the directions of lines of sight of a left eye 3501 and a right eye 3502 and offsets are provided. Therefore, like a display device 3513 shown in FIG. 35, the Halbach array 3549 can project outward from the right end of a left-eye support 3547. From another viewpoint, the movable range of the display device 3513 includes a region outside the region of the support surface (Halbach array 3549) that supports the display device. Therefore, in Example 2, the rotation angle of each of the left eye 3501 and the right eye 3502 is allowed to fall within the range of ±30°. It is possible to widen the allowable range of the rotation angle by adjusting the offset amount, thereby obtaining the effect of widening the visual field of the HMD by adopting the arrangement according to Example 2.

Figure 36A:
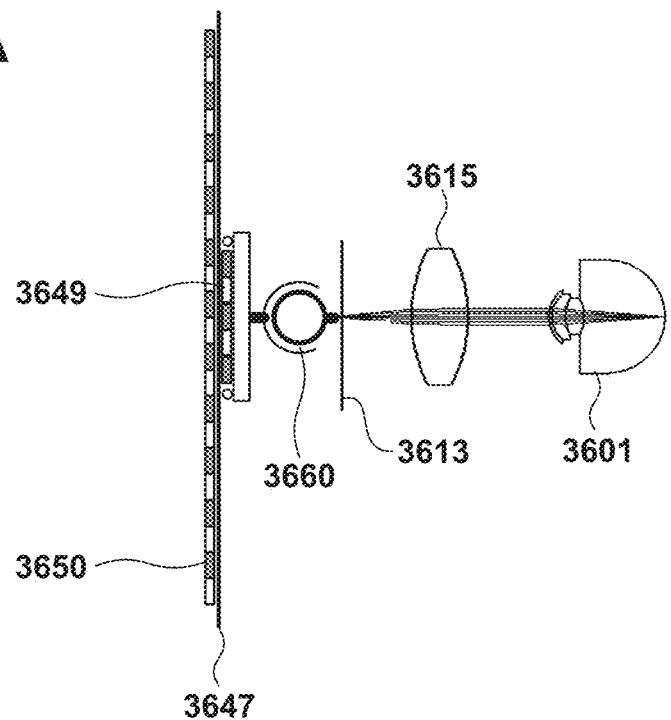
FIGS. 36A and 36B show a view for explaining Example 3.
Figure 36B:
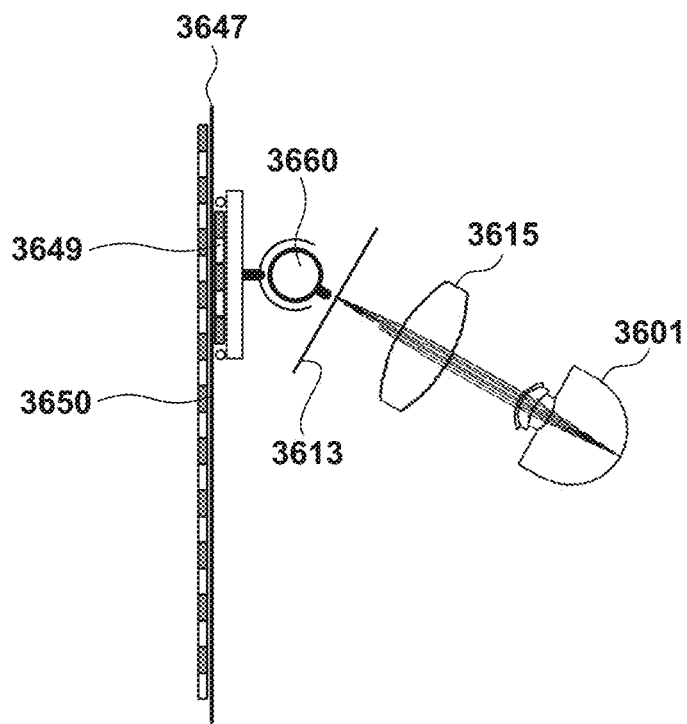

Example 3 will be described below. Example 3 is different from Example 1 in that a support used by a driving system of a display device using a Halbach array is a support 3647 having a support surface formed by a flat surface unlike the support 3447 having a support surface formed by part of a spherical surface. An arrangement according to Example 3 will be described with reference to FIGS. 36A and 36B. An angle control mechanism 3660 can be provided to keep the angle θ formed by the line of sight of the observer and the display surface of the display device at the right angle. In accordance with the position of the support 3647 in a Halbach array 3649, the angle control mechanism 3660 controls the display device 3613 so that the angle θ formed by the line of sight of an eye 3601 and the display surface of a display device 3613 is set to the right angle at the intersection point of the line of sight and the display surface of the display device 3613. At this time, unlike Example 1, since the distance between the eye 3601 and the display surface of the display device 3613 changes, focus adjustment is performed by, for example, moving a lens 3615 in the direction of the line of sight.

Figure 37A:
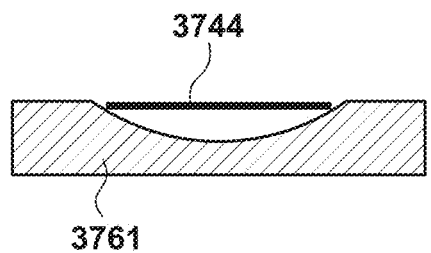
FIGS. 37A and 37B show views for explaining Example 4.
Figure 37B:
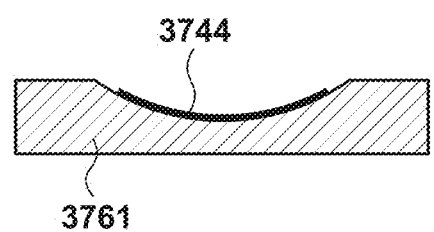

Example 4 will be described below. Example 4 is different from Example 1 in terms of only a method of manufacturing a curved surface sensor and a curved surface display device. The method will be described with reference to FIGS. 37A and 37B. As a wafer process for manufacturing a curved surface sensor and a display device according to Example 4, a flat wafer process can be adopted. A wafer having undergone the wafer process is thinned to, for example, 50 µm, and is diced to obtain each sensor and each device. Next, a mold 3761 having a curved surface with a radius of curvature of 400 mm is prepared, and an image sensor or a display device 3744 diced, as shown in a of FIG. 37, can be placed in a curved surface portion of the mold 3761. In this state, by deaerating the closed space formed by the mold 3761 and the image sensor or display device 3744, the image sensor or display device 3744 can be bent into a curved shape, as shown in b of FIG. 37. In this state, by pasting the image sensor or display device 3744 to the mold 3761 by an adhesive (not shown), the curved shape can be fixed.

Figure 38:
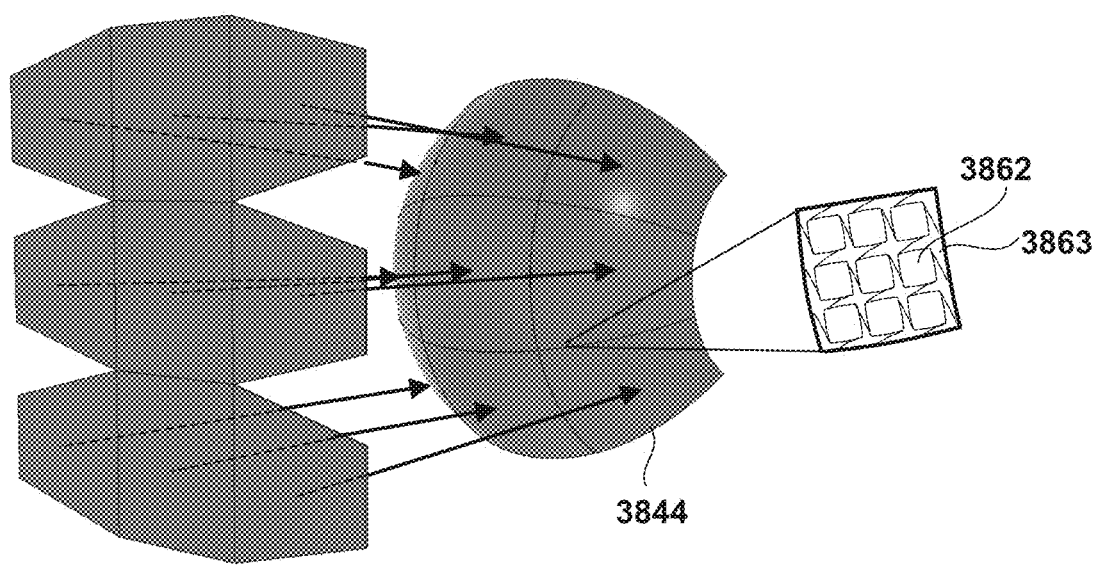
FIG. 38 is a view for explaining Example 5.

Example 5 will be described below. Example 5 is different from Example 4 in terms of the following points. In Example 4, the radius of curvature of the curved surface is, for example, 400 mm. In Example 5, the radium of curvature is set to, for example, 10 mm Therefore, as shown in FIG. 38, flat surface image sensors or display devices of three squares and six trapezoids can be bent and connected to form one curved surface image sensor or display device 3844. At this time, each image sensor or display device can be formed by surface elements 3862 and spring bridges 3863 each connecting the surface elements 3862.

The thickness of each image sensor or display device can be set to 10 µm. At this time, a known SOI (Silicon On Insulator) wafer can be used to perform thinning First, the entire thickness of an Si layer on an oxide film (insulator) can be patterned by deep etching to form the surface elements 3862 and the spring bridges 3863. After that, thinning can be completed by separating, from the Si substrate, a portion above the oxide film by etching using XeF2 gas. Each surface element 3862 has a size of, for example, 100-µm square, and a structure in which 3-µm square pixels are spread over each surface element can be adopted.

Therefore, it is possible to obtain an image sensor or display device having a radius of curvature smaller than that in Example 4.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157239, filed Sep. 27, 2021, which is hereby incorporated by reference herein in its entirety.

What is claimed is:

1. A head mounted display comprising:
   a display device having a display surface;
   an optical system configured to adjust a focal point of an eye of an observer to the display device;
   a driving mechanism configured to drive the display device;
   a line-of-sight detector configured to detect a line of sight of the observer; and
   a controller configured to control, based on an output from the line-of-sight detector, the driving mechanism so that the line of sight matches a normal of the display surface at an intersection point of the line of sight and the display surface, with an accuracy of ±60 arc minutes in any plane containing the line of sight.

2. The display according to claim 1, further comprising a support having a support surface formed by part of a spherical surface,
   wherein the display device is supported by the support surface.

3. The display according to claim 2, wherein the driving mechanism is configured to drive the display device along the support surface.

4. The display according to claim 3, wherein the driving mechanism includes a Halbach array.

5. The display according to claim 3, wherein a movable range of the display device includes a region outside a region of the support surface.

6. The display according to claim 2, wherein the display surface is formed by part of a spherical surface.

7. The display according to claim 2, wherein the support surface is configured so that a center of the spherical surface forming the support surface approximately matches a rotation center of movement of the line of sight.

8. The display according to claim 1, wherein the controller adjusts, based on an angle of convergence of eyes of the observer, the optical system so that thicknesses of crystalline lenses of the eyes seeing the display surface match thicknesses of the crystalline lenses of the eyes when the observer sees an object existing at a convergence distance corresponding to the angle of convergence.

9. The display according to claim 8, wherein the controller decides the angle of convergence based on a line of sight of the left eye of the observer and a line of sight of the right eye of the observer, which are detected based on the output from the line-of-sight detector.

10. The display according to claim 1, wherein the line-of-sight detector includes an irradiator configured to irradiate the eye of the observer with infrared light, a half mirror arranged between the display device and the eye and configured to reflect the infrared light reflected by the eye and transmit visible light, and an image sensor configured to detect the infrared light reflected by the half mirror.

11. A cross reality system comprising:
a head mounted display including (1) a display device having a display surface, (2) an optical system configured to adjust a focal point of an eye of an observer to the display device, (3) a driving mechanism configured to drive the display device, (4) a line-of-sight detector configured to detect a line of sight of the observer, and (5) a controller configured to control, based on an output from the line-of-sight detector, the driving mechanism so that the line of sight matches a normal of the display surface at an intersection point of the line of sight and the display surface, with an accuracy of ±60 arc minutes in any plane containing the line of sight;
a camera module; and
an attitude controller configured to control an attitude of the camera module so as to adjust an optical axis of the camera module in accordance with a direction of the line of sight.

12. The system according to claim 11, wherein the camera module includes an image sensor having an image sensing surface formed by a curved surface.

13. The system according to claim 12, wherein an image in which a peripheral portion of an image obtained using the image sensor of the camera module is made coarser than a central portion of the image is transferred from the camera module to the display device.

14. The display according to claim 1, wherein the controller controls, based on an output from the line-of-sight detector, the driving mechanism so that the line of sight matches a normal of the display surface at an intersection point of the line of sight and the display surface, with an accuracy of ±6 arc minutes in any plane containing the line of sight.

15. The system according to claim 11, wherein the controller controls, based on an output from the line-of-sight detector, the driving mechanism so that the line of sight matches a normal of the display surface at an intersection point of the line of sight and the display surface, with an accuracy of ±6 arc minutes in any plane containing the line of sight.

* * * * *